(12) United States Patent
Bertoldi et al.

(10) Patent No.: US 11,781,307 B2
(45) Date of Patent: Oct. 10, 2023

(54) STRUCTURAL DESIGN PRINCIPLES FOR DIAGONAL BRACINGS IN TRUSS AND BEAM SUPPORT SYSTEMS

(71) Applicant: President and Fellows of Harvard College, Cambridge, MA (US)

(72) Inventors: Katia Bertoldi, Cambridge, MA (US); Matheus C. Fernandes, Arlington, MA (US); James C. Weaver, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 201 days.

(21) Appl. No.: 17/309,475

(22) PCT Filed: Nov. 27, 2019

(86) PCT No.: PCT/US2019/063794
§ 371 (c)(1),
(2) Date: May 28, 2021

(87) PCT Pub. No.: WO2020/113133
PCT Pub. Date: Jun. 4, 2020

(65) Prior Publication Data
US 2022/0042295 A1    Feb. 10, 2022

Related U.S. Application Data

(60) Provisional application No. 62/772,174, filed on Nov. 28, 2018.

(51) Int. Cl.
*E04B 1/19* (2006.01)
*E04C 3/08* (2006.01)
(Continued)

(52) U.S. Cl.
CPC .................. *E04B 1/19* (2013.01); *E04C 3/08* (2013.01); *E04C 3/083* (2013.01); *E04C 5/06* (2013.01); *E04C 2003/026* (2013.01)

(58) Field of Classification Search
CPC ............... E04B 1/19; E04C 3/083; E04C 5/06
(Continued)

(56) References Cited

U.S. PATENT DOCUMENTS 877,734 A * 1/1908 Reuther .................. E04B 1/185
52/649.6
1,010,408 A * 12/1911 Bates ...................... E04H 12/10
52/651.02
(Continued)

FOREIGN PATENT DOCUMENTS

CN        201321674 Y  * 10/2009
CN        201326244 Y  * 10/2009
(Continued)

OTHER PUBLICATIONS

International Search Report and Written Opinion in International Application No. PCT/US2019/063794, dated Jan. 29, 2020 (7 pages).
(Continued)

*Primary Examiner* — Brian D Mattei
*Assistant Examiner* — Joseph J. Sadlon
(74) *Attorney, Agent, or Firm* — NIXON PEABODY LLP

(57) ABSTRACT

A structural lattice includes a rectangular base defined by four periphery beams, and two non-diagonal beams that divide the rectangular base in four quadrants. The structural lattice further includes a diagonal reinforcement strut system overlaid on the rectangular base and having at least two intersecting sets of diagonal beams forming an open-and-closed cell architecture.

14 Claims, 49 Drawing Sheets

(51) Int. Cl.
    *E04C 5/06* (2006.01)
    *E04C 3/02* (2006.01)
(58) Field of Classification Search
    USPC .......................................................... 52/646
    See application file for complete search history.

(56) References Cited

U.S. PATENT DOCUMENTS

| | | | | |
|---|---|---|---|---|
| 2,389,238 A * | 11/1945 | Phillips | .................... | F41H 5/045 |
| | | | | 52/649.1 |
| 2,730,388 A * | 1/1956 | Roberton | ............... | A47B 13/02 |
| | | | | 403/207 |
| 3,400,508 A * | 9/1968 | Dietner | .................... | E04C 5/065 |
| | | | | 52/691 |
| 3,474,588 A * | 10/1969 | Frei | ........................... | E04B 7/00 |
| | | | | 52/690 |
| 3,559,355 A * | 2/1971 | Day, Jr. | .................... | E04G 9/065 |
| | | | | 52/645 |
| 3,640,798 A * | 2/1972 | Deeds | ....................... | E04C 2/365 |
| | | | | 428/117 |
| 3,930,349 A * | 1/1976 | Wellershaus | ............. | E04C 5/065 |
| | | | | 52/694 |
| 4,087,302 A * | 5/1978 | Wootten | ................... | B29C 51/22 |
| | | | | 156/227 |
| 4,494,349 A * | 1/1985 | Clements | ................... | E04B 5/38 |
| | | | | 52/650.1 |
| 4,584,810 A | 4/1986 | Hill | | |
| 4,715,503 A * | 12/1987 | Johnson | ............... | A47B 73/006 |
| | | | | 403/219 |
| 4,761,929 A * | 8/1988 | Zeigler | .................... | E04H 15/34 |
| | | | | 52/81.3 |
| 4,982,549 A * | 1/1991 | Beck | ........................ | E04B 1/215 |
| | | | | 405/231 |
| 6,187,401 B1 * | 2/2001 | Heisel | ........................ | E04C 2/36 |
| | | | | 428/116 |
| 6,219,974 B1 * | 4/2001 | Hoberman | ............... | A63F 9/088 |
| | | | | 52/80.1 |
| 6,295,770 B1 * | 10/2001 | Sheu | ......................... | E04C 5/04 |
| | | | | 52/649.3 |
| 6,443,432 B1 * | 9/2002 | Manno | ....................... | B32B 3/28 |
| | | | | 47/33 |
| 7,716,897 B2 * | 5/2010 | Merrifield | ............... | B64G 1/222 |
| | | | | 52/645 |
| 9,162,416 B1 * | 10/2015 | Eckel | .................... | G02B 6/1221 |
| 9,528,229 B2 * | 12/2016 | Gazzola | .................... | E04B 1/19 |
| 9,566,758 B2 * | 2/2017 | Cheung | ...................... | E04C 3/02 |
| 10,074,449 B2 * | 9/2018 | White | .................... | H05K 9/0001 |
| 10,106,973 B1 * | 10/2018 | Sarda | ....................... | E04B 5/043 |
| 10,543,617 B2 * | 1/2020 | Grivetti | ..................... | E04B 1/35 |
| 10,696,009 B2 * | 6/2020 | Berger | .................... | E04B 1/185 |
| | | | | 52/649.6 |
| 10,715,078 B2 * | 7/2020 | Jeon | ........................ | F16M 11/38 |
| 10,895,071 B2 * | 1/2021 | Rutledge | .................. | E04B 5/043 |
| 10,974,770 B2 * | 4/2021 | Sumi | ....................... | B32B 5/024 |
| 11,529,751 B2 * | 12/2022 | Asprone | .............. | G02B 6/1221 |
| 2005/0144884 A1 * | 7/2005 | Moriya | ..................... | E04B 1/19 |
| | | | | 52/633 |
| 2006/0032178 A1 * | 2/2006 | Jensen | ..................... | B29C 70/50 |
| | | | | 52/633 |
| 2013/0284858 A1 * | 10/2013 | Kang | ........................ | B21F 3/02 |
| | | | | 245/2 |
| 2016/0027425 A1 | 1/2016 | Cook | | |
| 2016/0076699 A1 * | 3/2016 | Ramaska | ................... | E04C 3/02 |
| 2020/0031088 A1 * | 1/2020 | Li | .......................... | B32B 5/024 |

FOREIGN PATENT DOCUMENTS

| | | | | |
|---|---|---|---|---|
| CN | 201924450 U | * | 8/2011 | |
| CN | 206070735 U | * | 4/2017 | |
| DE | 2436628 A1 | * | 4/1976 | ............... E04B 1/19 |
| EP | 1188547 A1 | * | 3/2002 | ............... B32B 3/12 |
| JP | 2012140825 A | * | 7/2012 | |
| KR | 101584008 B1 | * | 1/2016 | |
| KR | 20170040447 A | * | 4/2017 | |
| WO | WO-8701150 A1 | * | 2/1987 | ............... E04B 1/19 |
| WO | WO 90/010762 A1 | | 9/1990 | |
| WO | WO-9010762 A | * | 9/1990 | ............... E04B 1/19 |

OTHER PUBLICATIONS

Adams, C. L. et al., "Indications of relationships between porifera classes using full-length 18s rRNA gene sequences," Mem. Queensl. Mus. 44, 33-43 (1999).

Aizenberg, J. et al., "Skeleton of *euplectella* sp.: structural hierarchy from the nanoscale to the macroscale," Science, 309(5732):275-278 (2005).

Ashby, M. F., "The properties of foams and lattices," Philosophical Transactions of the Royal Society of London: a Mathematical, Physical and Engineering Sciences, 364(1838):15-30 (2006).

Beaulieu, S. E., "Colonization of habitat islands in the deep sea: Recruitment to lass spone stalks," Deep-Sea Res. Pt. I, 48:1121-1137 (2001a).

Beaulieu, S. E., "Life on glass houses: Sponge stalk communities in the deep sea," Mar. Biol. 138:803-817 (2001b).

Bergquist, P. R., "Poriferan Relationships. In: the origins and relationships of lower invertebrates (Morris, S. C. et al.)," Clarendon Press, Oxford, 14-27 (1978).

Bertoldi, K. & Boyce, M. C., "Mechanically triggered transformations of phononic band gaps in periodic elastomeric structures," Phys. Rev. B, 77:052105 (2008).

Bhattacharyya, P. & Volcani, B. E., "Isolation of silicate ionophore(s) from the apochlorotic diatom Nitzschia alba," Biochem. Biophys. Res. Commun. 114: 365-372 (1983).

Borchiellini, C. et al., "Sponge paraphyly and the origin of Metazoa," J. Evol. Biol., 14:171-179 (2001).

Borojevic. R., "Différentiationcellulaire dans l'embroyogénèse et morphogénèse chez les Spongiaires. In: the biology of the porifera (Fry, W. G., editor)," London: Academic Press, 467-490 (1970).

Brasier, M. et al., "Ediacarian sponge spicule clusters from southwestern Mongolia and the origin of the Cambirian fauna," Geology, 25:303-306 (1997).

Brott, L. L. et al., "Ultrafast holographic nanopatterning of biocatalytically formed silica," Natrure, 413:291-293 (2001).

Carbonelli, S. et al., "Sphinxolides E-G and Reidispongiolide C: Four new cytotoxic macrolides from the New Caledonian lithistida sponges N. superstes and R. coerulea," Tetrahedron, 55:14665-14674 (1999).

Carnelli, A. L. et al., "Biogenic silica production in selected alpine plant species and plant communities," Ann. Bot-London, 87:425-434 (2001).

Carter, P. & Wells, J. A., "Dissecting the catalytic triad of a serine protease," Nature, 332:564-568 (1988).

Cattaneo-Vietti, R. et al., "Optical fibres in an Antarctic sponge," Nature, 383:397-398 (1996).

Cavalier-Smith, T. et al., "Sponge phylogeny, animal monophyly, and the origin of the nervous system: 18s rRNA evidence," Can. J. Zool., 74:2031-2045 (1996).

Cha, J. N. et al., "Silicatein filaments and subunits from a marine sponge direct the polymerization of silica and silicones in vitro," Proc. Natl. Acad. Sci. USA, 96:361-365 (1999).

Cha, J. N. et al., "Biomimetic synthesis of ordered silica structures mediated by block peptides," Nature, 403:289-292 (2000).

Cha, J. N., "Lessons from nature: Novel routes to biomimetic synthesis of silica based materials," Ph.D. Dissertation, UCSB (2001).

Chai, H. & Lawn, B. R., "Cracking in brittle laminates from concentrated loads," Acta Mater., 50:2613-2625 (2002).

Chisholm, S. W. et al., "Silicic acid incorporation in marine diatoms on light:dark cycles: use as an assay for phased cell division," Limnol. Oceanogr., 23:518-529 (1978).

Crawford, S. A., et al., "Nanostructure of the diatom frustule as revealed by atomic force and scanning electron microscopy," J. Phycol., 37:543-554 (2001).

(56) References Cited

OTHER PUBLICATIONS

Croce, G. et al., "Structural characterization of siliceous spicules from marine sponges," Biophys. J., 86:526-534 (2004).
Danielsson, M. et al., "Three-dimensional micromechanical modeling of voided polymeric materials," Journal of Mechanics Physics of Solids, 50:351-379 (2002).
Darnell, M. C. et al., "Performance and biocompatibility of extremely tough alginate/polyacrylamide hydrogels," Biomaterials (2013).
Deming, T. J., "Facile synthesis of block copolypeptides of defined architecture," Nature, 390:36-389 (1997).
Deshpande, V. S. et al., "Foam topology: bending versus stretching dominated architectures," Acta Materialia, 49(6):1035-1040 (2001).
Egerton-Warburton, L. M. et al., "A new technique for preparing biominerals for atomic-force microscopy," Protoplasma, 204:34-37 (1998).
Engelhardt, G. & Michel, D., "High-resolution solid-state NMR of silicates and zeolites," Wiley, Chihcester (1987).
Evans, A. G. et al., "Multifunctionality of cellular metal systems," Progress in materials science, 43(3):171-221 (1998).
Evans, A.G. et al., "The topological design of multifunctional cellular metals," Progress in Materials Science, 46(3):309-327 (2001).
Evans, D. F. et al., "Nuclear-Magnetic-Resonance studies of silicon (IV) complexes in aqueous solution, I. Tris-catecholato complexes," Polyhedron, 9:813-823 (1990).
Fernandes, M. C. et al., "Harnessing Design Principles from Glass Sponges for Structurally Robust Lattices," MRS Fall Meeting PM01.06.12 (2018).
Fernandez, J. G. & Ingber, D. E., "Manufacturing of Large-Scale Functional Objects Using Biodegradable Chitosan Bioplastic," Macromolecular Materials and Engineering (2014).
Garrone, R. et al., "Ultrastructure and deposition of silica in sponges, in: 'Silicon and siliceous structures in biological systems (Simpson, T. L. & Volcani, B. E. (Eds.)),'" Springer-Verlag, New York, 495-525 (1981).
Gehling, J. G. & Rigby, J. K., "Long expected sponges from the Neoproterozoic ediacara fauna of South Australia," J. Paleontol., 2:185-195 (1996).
Gibson, L. J. & Ashby, M. F., "Cellular solids: structure and properties," Cambridge University Press (1999).
Gray, J. E., "Annals and Magazine of Natural History," ser. 4, vol. IX, 442-461 (1872).
Hansen, N. et al., "Reducing the time complexity of the derandomized evolution strategy with covariance matrix adaptation (cma-es)," Evolutionary Computation, 11(1):1-18 (2003).
Harrison, C. C. & Loton, N., "Novel routes to designer silicas—studies of the deposition of (M(+))(2)[Si(C6H4O2)3]•XH2O—Importance of M(+) identity of the kinetics of oligomerization and the structural characterization of the silicas produced," J. Chem. Soc. Faraday Trans., 91:4287-4297 (1995).
Harrison, C. C., Evidence for intramineral macromolecules containing protein from plant silicas, Phytochemistry, 41:37-42 (1996).
Hartman, W. D., "Form and distribution of silica in sponges, in: 'Silicon and siliceous structures in biological systems (Simpson, T. L. & Volcani, B. E. (Eds.)),'" Springer-Verlag, New York, 453-493 (1981).
Hazelaar, S. et al., "Monitoring rapid valve formation in the pennate diatom Navicula salinarum (Bavillariophyceae)," J. Phycol., 41:354-358 (2005).
Hecky, R. E. et al., "Amino-acid and sugar composition of diatom cell-walls," Mar. Biol., 19:323-331 (1973).
Janussen, D. et al., "Deep-sea Hexactinellida (Porifera) of the Weddell Sea," Deep-Sea Res. Pt. II, 51:1857-1882 (2004).
Jones, W. C., "The microstructure and genesis of sponge biominerals, in: 'Biologie des Spongiaires (Levi, C. & Boury-Esnault, N. (eds.)),'" Colloq. Internat. C.N.R.S., Paris, 291:425-477 (1979).
Kelly, M., "Description of a new lithistid sponge from northeastern New Zealand, and consideration of the phylogenetic affinities of families Corallistidae and Neopeltidae," Zoosystema, 22(2):265-283 (2000).

Kelly-Borges, M. et al., "Species differentiation in the marine sponge genus *Discodermia* (Demospongiae, Lithistida): the utility of secondary metabolites as species-specific markers," Biochemical Systematics and Ecology, 22:353-365 (1994).
Kinrade, S. D. et al., "Stable five- and six-coordinated silicate anions in aqueous solution," Science, 385:1542-1545 (1999a).
Kinrade, S. D. et al., "Silicon-29 NMR evidence of alkoxy substituted aqueous silicate anions," J. Chem. Soc., Dalton Trans., 3149-3150 (1999b).
Kinrade, S. D. et al., "Silicon-29 NMR evidence of a transient hexavalent silicon coplex oin the diatom Navicula pelliculosa," Journal of the Chemical Society-Dalton Transactions, 3:307-309 (2002).
Kisailus. D. et al., "Enzymatic synthesis and nanostructural control of gallium oxide at low temperature," Adv. Mater., 17:314-318 (2005a).
Kisailus, D. et al., "Functionalized gold nanoparticles mimic catalytic activity of a polysiloxane-synthesizing enzyme," Adv. Mater., 17:1234-1239 (2005b).
Kisailus, D. et al., "Self-assembled bifunctional surface mimics an enzymatic and templating protein for the synthesis of a metal oxide semiconductor," Proc. Natl. Acad. Sci. USA, 103(15):5652-5657 (2006).
Krasko. A. et al., "Expression of silicatein and collagen genes in the marine sponge Suberites domuncula is controlled by silicate and myotrophin," Eur. J. Biochem., 267:1-11 (2000).
Krasko, A. et al., "Iron induces proliferation and morphogenesis in primmorphs from the marine sponge Suberites domuncula," DNA Cell Biol. 21, 67-80 (2002).
Kröger, N. et al., "Polycationic peptides from diatom basilica that direct silica nanosphere formation," Science, 286:1129-1132 (1999).
Kröger, N. et al., "Species-specific polyamines from diatoms control silica morphology," Proc. Natl. Acad. Sci. USA, 97:14133,14138 (2000).
Kröger, N. et al., "Self-assembly of highly phosphorylated silaffins and their function in biosilica morphogenesis," Science, 298:584-586 (2002).
Kruse, M. et al., "Phylogenetic position of the hexactinellida within the phylum porifera based on the amino acid sequence of the protein kinase C from Rhabdocalyptus dawsoni," J. Mol. Evol., 46:721-728 (1998).
Levi, C. et al., "A remarkably strong natural glassy rod—the anchoring spicule of the Monorhapis sponge," J. Mater. Sci. Lett., 8:337-339 (1989).
Levi, C., "Lithisid sponges from the Norfolk Rise. Recent and Mesozoic Genera. In: Fossil and Recent Sponges," Springer-Verlag, Berlin (1991).
Levitrus, http://ingrid.ldgo.columbia.edu/SOURCES/.LEVITUS94 (1994).
Leys, S. P. & Lauzon, N. R. J., "Hexactinellid sponge ecology: growth rates and seasonality in deep water sponges," J. Exp. Mar. Biol. Ecol., 230:111-129 (1998).
Leys, S. P., "Comparative study of spiculogenesis in demosponge and hexactinellid larvae," Microsc. Res. Techniq., 62:300-311 (2003).
Leys, S. P. et al., "Embryogenesis in the glass sponge Oopsacas minuta: Formation of syncytia by fusion of blastomeres," Integrative and Comparative Biology, 46(2):104-117 (2006).
Lichtenegger, H. et al., "Variation of cellulose Microfibril angles in softwoods and hardwoods—a possible strategy of mechanical optimization," J. Struct. Biol., 128:257-269 (1999).
Lobel, K. D. et al., "Computational model for protein-mediated biomineralization of the diatom frustule," Marine Bio., 126:353-360 (1996).
Lu, T. J. et al., "Heat transfer in open-cell metal foams," Acta Materialia, 46(10):3619-3635 (1998).
Ma, K. Y. et al., "Controlled Flight of a Biologically Inspired, Insect-Scale Robot," Science (2013).
Mackie, G. O. & Singla, C. L., "Studies on hexactinellid sponges. I. Histology of Rhabdocalyputus dawsoni (Lambe, 1873)," Phil. Trans. R. Soc. Lond., 301:365-400 (1983).
Maldonado, M. & Yound, C. M., "Bathymetric patterns of sponge distribution on the Bahamian slope," Deep Sea Research 1., 43(6):897-915 (1996).

(56) References Cited

OTHER PUBLICATIONS

Maldonado, M. & Uriz, M. J., "An experimental approach to the ecological significance of microhabitat-scale movement in an encrusting sponge," Mar. Ecol.-Prog. Ser., 185:239-255 (1999).
Maldonado, M. et al., "Decline in Mesozoic reef-building sponges explained by silicon limitation," Nature, 401:785-788 (1999).
Maldonado, M. et al., "First record of the genera Crambe and Discorhabdella from the eastern Pacific, with description of three new species," Journal of Natural History, 35:1261-1276 (2001).
Manna, L. et al., "Controlled growth of tetrapod-branched inorganic nanocrystals," Nat. Mater., 2:382-385 (2003).
McInerey, J. O. et al., "Phylogenic resolution potential of 18s and 28s rRNA genes within the lithisid Astrophorida, in: 'Proceedings of the 5th International Sponge Symposium (Hooper, J. N. A. (ed.)),'" Memoirs of the Queensland Museum, 44:343-352 (1999).
Milliron, D. J. et al., "Collodial nanocrystal heterostructures with linear and branched topology," Nature, 430(6996):190-195 (2004).
Minchin, E. A., "Sponge-spicules. A Summary of present knowledge," Ergeb. Fortschr Zool., 2:171-274 (1901).
Miserez, A. et al., "Effects of laminate architecture on fracture resistance of sponge biosilica: lessons from nature," Advanced Functional Materials, 18(8):1241-1248 (2008).
Mizutani, T. et al., "Silicic acid polymerization catalyzed by amines and polyamines," Bull. Chem. Soc. Jpn., 71:2017-2022 (1998).
Monn, M. A. et al., "New functional insights into the internal architecture of the laminated anchor spicules of euplectella aspergillum," Proceedings of the National Academy of Sciences, 112(16):4976-4981 (2015).
Morse, D. E., "Silicon biotechnology: Harnessing biological silica production to construct new materials," Trends Biotechnol., 17:230-232 (1999).
Morse, D. E., "Silicon biotechnology; Proteins, genes and molecular mechanisms controlling biosilica nanofabrication offer new routes to polysiloxane synthesis," Organosilicon Chemistry IV: From Molecules to Materials, pp. 5-16, Wiley VCH, New York, USA, (2000).
Morse, D. E., "Biotechnology reveals new routes to synthesis and structural control of silica and polysilsesquioxanes," the chemistry of organic silicon compounds, vol. 3, pp. 805-819, John Wiley and Sons, New York, USA (2001).
Muller, W. E. G., "Molecular Phylogeny of Eumetazoa: Genes in sponges (Porifera) give evidence for monoplyly of animals," Progr. Molec. Subcell. Biol. 19, pp. 89-132 (1998).
Muller, W. E. G. et al., "Establishment of a primary cell culture from a sponge: Primmorphs from Suberites domuncula," Mar. Ecol.-Prog. Ser. 178, pp. 205-219 (1999).
Muller, W. E. G. & Muller, I. M., "The hypothetical ancestral animal the Urmetazoa:Telomerase activity in sponges (Porifera)," J. Serb. Chem. Soc. 68, pp. 257-268 (2003).
Muller, W. E. G. et al., "Formation of siliceous spicules in the marine demosponge Suberites domuncula," Cell Tissue Res. 321, pp. 285-297 (2005).
Murr, M. M. & Morse, D. E., "Fractal intermediates in the self-assembly of silicatein filaments," Proc. Natl. Acad. Sci. USA 102, pp. 11657-11662 (2005).
Noll, F. et al., "Nanostructure of diatom silica surfaces and biomimetic analogues," Nano Lett. 2, pp. 91-95 (2002).
Parkinson, J. & Gordon, R., "Beyond micromachining: the potential of diatoms," Trends Biotechnol. 17, pp. 190-196 (1999).
Perry, C. C. & Yun, L. J., "Preparation of silicas from silicon complexes—role of cellulose in polymerization and aggregation control," J. Chem. Soc., Faraday Trans. 88, pp. 2915-2921 (1992).
Phani, A. S. et al., "Wave propagation in two-dimensional periodic lattices," The Journal of the Acoustical Society of America, 119(4):1995-2005 (2006).
Pozzolini, M. et al., "Molecular cloning of silicatein gene from marine sponge Petrosia ficiformis (Porifera, Demospongiac) and development of primmorphs as a model for biosilification studies," Mar. Biotechnol. 6, pp. 594-603 (2004).

Qureshi, A. et al., "Microsclerodermins F-I, Antitumor and Anitfungal Cyclic Peptides from the lithistid sponge Microscleroderma sp.," Tetrahedron 56, pp. 3579-3685 (2000).
Reiswig, H. M., "Axial symmetry of sponge spicules and its phylogenetic significance," Can. Biol. Mat. 12, pp. 505-514 (1971).
Reiswig, H. M. & Mackie, G. O., "Studies on Hexactinellid sponges. III. The taxonomic status of Hexactinellida within the porifera," Phil. Trans. R. Soc. Lond. 301, pp. 419-428 (1983).
Roth, K. M. et al., "Bifunctional small molecules are biomimetic catalysts for silica synthesis at neutral pH," J. Am. Chem. Soc. 127, pp. 325-330 (2005).
Rutzler, K. & Smith, K. P., "The genus Terpios (Suberitidae) and new species in the 'Lobiceps' complex," in: Uriz, M. J. & Rutzler, K. (Eds.), "Recent advances in ecology and systematics of sponges," Scientia Marina, Barcelona, Spain, pp. 381-393 (1993).
Saito, T. et al., Skeletal growth of the deep-sea hexactinelid sponge Euplectella oweni, and host selection by the symbiotic shrimp Spongicola japonica (Crustacea: Decapoda: Spongicolidae),: J. Zool. Lond. 258, pp. 521-529 (2002).
Sandhage, K. H., "Novel, bioclastic route to self-assembled, 3D, chemically tailored meso/nanostructures: Shape-preserving reactive conversion of biosilica (diatom) microshells," Adv. Mater. 14, pp. 429-433 (2002).
Sarikaya, M. et al., "Biomimetic model of a sponge-spicular optical fiber—mechanical properties and structure," J. Mater. Res. 16, pp. 1420-1428 (2001).
Schaedler, T. A. et al., "Ultralight metallic microlattices," Science, 334(6058):962-965 (2011).
Schmidt, E. W., et al., "Identification of the antifungal peptide-containing symbiont of the marine sponge Theonella swinhoei as a novel delta-proteobacterium, 'Candidatus Entotheonella palauensis'," Marine Biology 136, pp. 969-977 (2000).
Schonberg, C. H. L., "New mechanisms in deposponge spicule formation," J. Mar. Biol. Assoc. UK 81, pp. 345-346 (2001).
Schroder, H. C. et al., "Silica transport in the demosponge Suberites domuncula: Fluorescence emission analysis using the PDMPO probe and cloning of a potential transporter," Biochem. J. 381, pp. 665-673 (2004).
Schroder, H. C. et al., "Co-expression and functional interaction of silicatein with galectin: Matrix-guided formation of siliceous spicules in the marine demosponge Suberites domuncula, " J. Bio. Chem., 281(17):12001-12009 (2006).
Schulze, F. E., "On the structure and arrangement of the soft parts in Euplectella aspergillum," Trans. R. Soc. Edinburgh 29, pp. 661-673 (1880).
Schwab, D. W. & Shore, R. E., "Fine structure and composition of a siliceous sponge spicule," Biol. Bull. 140, pp. 125-136 (1971a).
Schwab, D. W. & Shore, R. E., "Mechanism of internal stratification of siliceous sponge spicules," Nature 232, pp. 501-502 (1971b).
Schwenzer, B. et al., "Kinetically controlled vapor-diffusion synthesis of novel nano-structured metal hydroxide and phosphate films using no organic reagents," J. Mater. Chem. 16, pp. 401-407 (2006).
Seshadri, M. et al., "Mechanical response of cracked laminated plates," Acta Mater. 50, pp. 4477-4490 (2002).
Shimizu, K. et al., "Silicatein α: cathepsin L-like protein in sponge biosilica," Proc. Natl. Acad. Sci. USA 95, pp. 6234-6238 (1998).
Shimizu, K. et al., "A novel fluorescent silica tracer for biological silification studies," Chem. Biol. 8, pp. 1051-1060 (2001).
Shore, R. E., "Axial filament of siliceous sponge spicules, its organic components and synthesis, " Biol. Bull. 143, pp. 125-136 (1972).
Simpson, T. L. & Vaccaro, C. A., "an ultrastructural study of silica deposition in the freshwater sponge Spongilla lacustris," J. Ultrastruc. Res. 47, pp. 296-309 (1974).
Simpson, T. L. & Volcani, B. E., "Silicon and siliceous structures ion biological systems," Springer-Verlag, New York (1981).
Simpson, T. L. et al., "Silica spicules and axial filaments of the marine sponge Stelletta grubii (Porifera, Demospongiae)," Zoomorphology 105, pp. 3750382 (1985).
Sullivan, C. W., "Silification in diatoms," in: Silicon biochemistry. John Wiley and Sons, New York (1986).
Sumerel, J. L. & Morse, D. E., "Biotechnological advances in biosilification," in: Muller, W. E. (Ed.), Prog. Molec. Subcellular

(56) References Cited

OTHER PUBLICATIONS

Biol. 33: "Silicon biomineralization: Biology—Biochemistry—Molecular Biology—Biotechnology," Springer-Verlag, Berlin, pp. 225-247 (2003).
Sumerel, J. L. et al., "Biocatalytically template synthesis of titanium dioxide," Chem. NMat. 15(25):4804-4809 (2003).
Sumper, M., "A phase separation model for the nanopatterning of diatom biosilica," Science 295(5564):2430-2433 (2002).
Sundar, V. C. et al., "Fibre-optical features of a glass sponge—some superior technological secrets have come to light from a deep-sea organism," Nature 424, pp. 899-900 (2003).
Theunissen, J. D., "A method for isolating and preparing silica bodies in grasses for scanning electron microscopy," Biotech. Histochem. 69, pp. 291-294 (1994).
Travis, D. et al., "Comparative studies of the organic matrices of invertebrate mineralized tissues," J. Ultrastruc. Res. 18, pp. 519-550 (1967).
Uriz, M. J. et al., "Siklica deposition in Demosponges: spiculogenesis in *Crambe crambe*," Cell Tiss. Res. 301, pp. 299-309 (2000).
Van Valkenburg, S. D. & Norris, R.E., "The growth and morphology of the silicoflagellate *Dictyocha speculum* Ehrenberg in culture," J. Phycol. 6, pp. 48-54 (1970).
Volcani, B. E. In: Simpson, T. L., Volcani, B. E. (Eds.), "Silicon and siliceous structures in biological systems," Springer-Verlag, New York, pp. 157-201 (1981).
Vrieling, E. G. et al., "Diatom silicon biomineralization as an inspirational source of new approaches to silica production," J. Biotechnol. 70, pp. 39-51 (1999).
Weaver, J. C. & Morse, D. E., "Molecular biology of demosponge axial filaments and their roles in biosilification," Microsc, Res. Techniq. 62, pp. 356-367 (2003).
Weaver, J.C. et al., "Nanostructural features of demosponge biosilica," J. Struct. Biol. 144, pp. 271-281 (2003).
Weaver, J. C., "Structure-Function Relationships in Biomineralized Composites: Analysis of the Architectural Complexities of Sponge Skeletal Systems." Dissertation submitted to University of California, Santa Barbara in partial satisfaction of the requirements for the degree of Doctor of Philosophy (2006).
Weaver, J. C. et al., "Hierarchical assembly of the siliceous skeletal lattice of the hexactinellid sponge euplectella aspergillum," Journal of structural biology, 158(1):93-106 (2007).
Weaver, J. C. et al., Unifying design strategies in demosponge and hexactinellid skeletal systems, The Journal of Adhesion, 86(1):72-95 (2010).
Weissenfels, N. & Landschoff, H. W., "Bau und Funktion des Süßwasserschwamms *Ephydatia fluvatilis* L. (Porifera). IV. Die Entwicklung der Monaxialen $SiO_2$ Nadeln in Sandwich-Kulturen," Zool. Jb. Anat. Bd. 98, pp. 355-371 (1977).
Wetherbee, R. et al., "The nanostructure and development of diatom biosilica," in: E. Bacuerlein (ed.), "Biomineralization: from Biology to Biotechnology and Medical Application," Wiley-VCH, Weinheim, pp. 189-206 (2000).
Wilkinson, C. R. & Garrone, R., "Ultrastructure of spicules and microsclerocytes in the marine sponge *Neofiubularia irata* n. sp.," J. Morphol. 166, pp. 51-64 (1980).
Woesz, A. et al., "Micromechanical properties of biological silica in skeletons of deep sea sponges," Journal of Materials Research, 21(8):2068-2078 (2006).
Wong. T. S. et al., "Bioinspired self-repairing slippery surfaces with pressure-stable omniphobicity," Nature (2011).
Zampella, A. et al., "Calliopeltosides B and C, two novel cytotoxic glycoside macrolides from the marine lithistida sponge *Callipelta* sp.," Tetrahedron 53, pp. 3243-3248 (1997).
Zhou, Y. et al., "Efficient catalysis of polysiloxane synthesis by silicatein alpha requires specific hydroxyl and imidazole functionalities," Agnew. Chem. Int. Ed. 38, pp. 780-782 (1999).
Ziherl, P. & Kamien, R. D., "Soap Froths and Crystal Structures," Phys. Rev. Lett. 85, pp. 3528-3531 (2000).

\* cited by examiner

|  | Design A | Design B | Design C | Design D | Optimal Design |
|---|---|---|---|---|---|
| Total Length (Test Dir.) [mm] | 93.29 | 93.45 | 93.47 | 93.25 | 93.27 |
| Total length (non-test Dir.) [mm] | 93.52 | 93.31 | 93.55 | 93.19 | 93.54 |
| Depth [mm] | 39.98 | 40.06 | 40.19 | 40.10 | 40.25 |
| Top L [mm] | 14.7 | 14.95 | 14.93 | 14.96 | 15.02 |
| Top Tnd [mm] | 1.48 | 1.56 | 1.51 | 2.68 | 1.11 |
| Top Td [mm] | 0.86 | 1.53 | 0.78 | N/A | 1.07 |
| Bottom L [mm] | 15.04 | 15.01 | 15.01 | 14.96 | 15.05 |
| Bottom Tnd [mm] | 1.55 | 1.57 | 1.57 | 2.69 | 1.11 |
| Bottom Td [mm] | 0.85 | 1.61 | 0.86 | N/A | 1.08 |
| Weight [g] | 145.2 | 148.4 | 150.8 | 143.36 | 146.36 |

FIG. 8

|  | Design A | Design B | Design C | Design D | Optimal Design |
|---|---|---|---|---|---|
| Total length (test Dir.) [mm] | 93 | 93 | 93 | 93 | 93 |
| Total length (non-test Dir.) [mm] | 93 | 93 | 93 | 93 | 93 |
| Depth [mm] | 40 | 40 | 40 | 40 | 40 |
| Top L [mm] | 15 | 15 | 15 | 15 | 15 |
| Top Tnd [mm] | 1.5 | 1.5 | 1.5 | 2.56 | 1.03 |
| Top Td [mm] | 0.75 | 1.5 | 0.75 | N/A | 1.08 |
| Bottom L [mm] | 15 | 15 | 15 | 15 | 15 |
| Bottom Tnd [mm] | 1.5 | 1.5 | 1.5 | 2.56 | 1.03 |
| Bottom Td [mm] | 0.75 | 1.5 | 0.75 | N/A | 1.08 |

FIG. 9

Design A

Design B

|  | λ | $S_1$ | $S_2$ | $S_3$ | $S_4$ |
|---|---|---|---|---|---|
| N = 1 | 3.1890 | 0 | | | |
| N = 2 | 0.6778 | 0.1800 | | | |
| N = 3 | 0.8028 | 0 | 0.3044 | | |
| N = 4 | 0.7640 | 0.1912 | 0.3720 | | |
| N = 5 | 0.3874 | 0 | 0.3881 | 0.7811 | |
| N = 6 | 0.5036 | 0.1910 | 0.5189 | 0.8712 | |
| N = 7 | 0.3561 | 0 | 0.2899 | 0.5512 | 0.8779 |

FIG. 13

|  | λ | $S_1$ | $S_2$ | $S_3$ | $S_4$ |
|---|---|---|---|---|---|
| N = 1 | 3.1454 | 0 | | | |
| N = 2 | 0.5614 | 0.3390 | | | |
| N = 3 | 1.4784 | 0 | 0.2440 | | |
| N = 4 | 1.0151 | 0.0989 | 0.3358 | | |
| N = 5 | 0.9509 | 0 | 0.1733 | 0.3260 | |
| N = 6 | 0.2009 | 0.2628 | 0.5827 | 0.8881 | |
| N = 7 | 0.2962 | 0 | 0.4197 | 0.6917 | 0.9126 |

FIG. 14

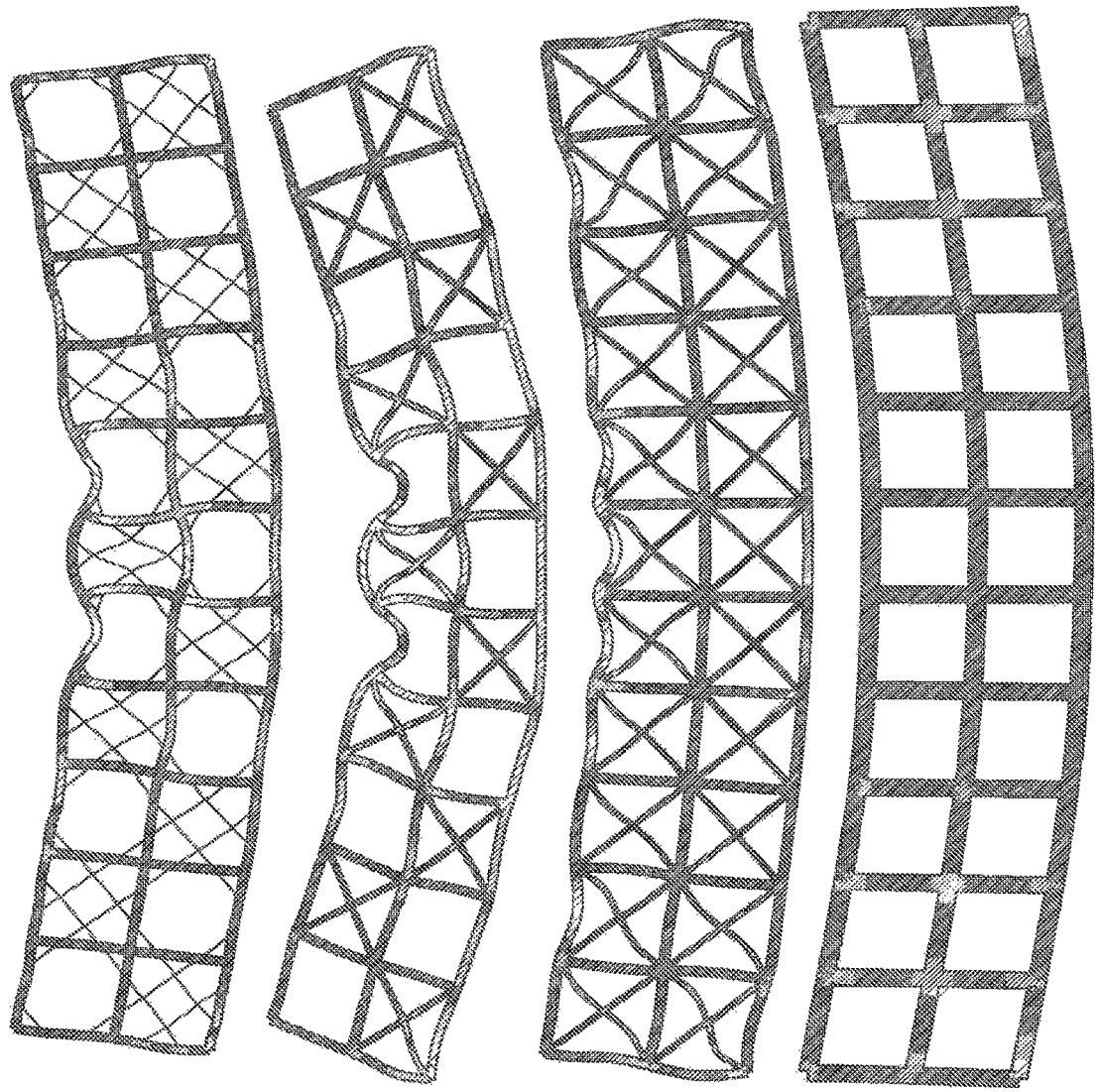
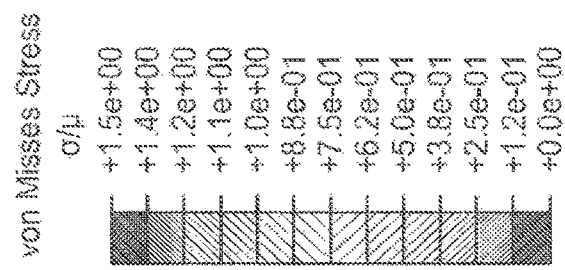
FIG. 19D

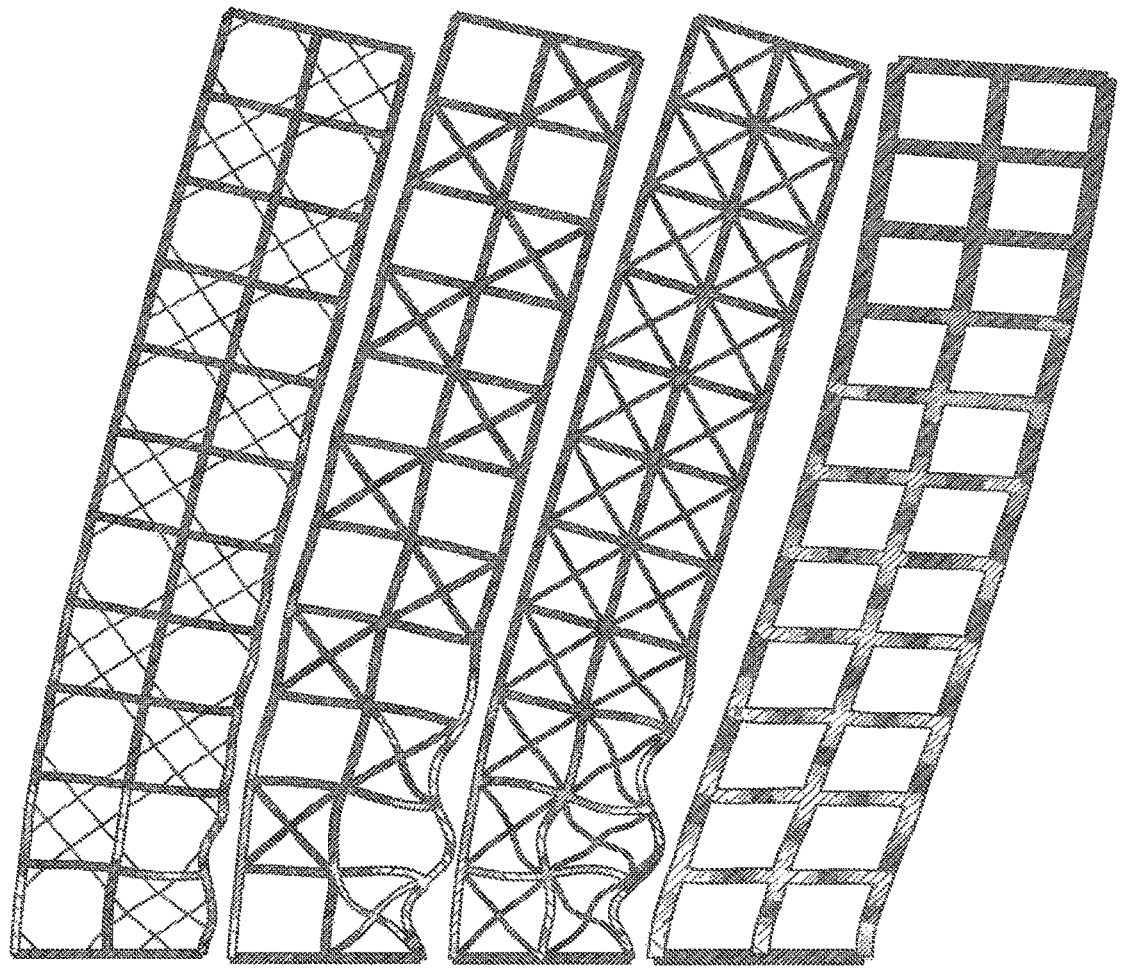
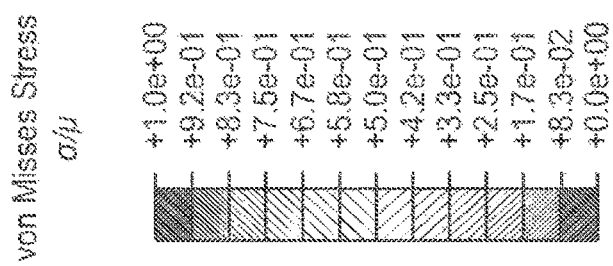
FIG. 20D

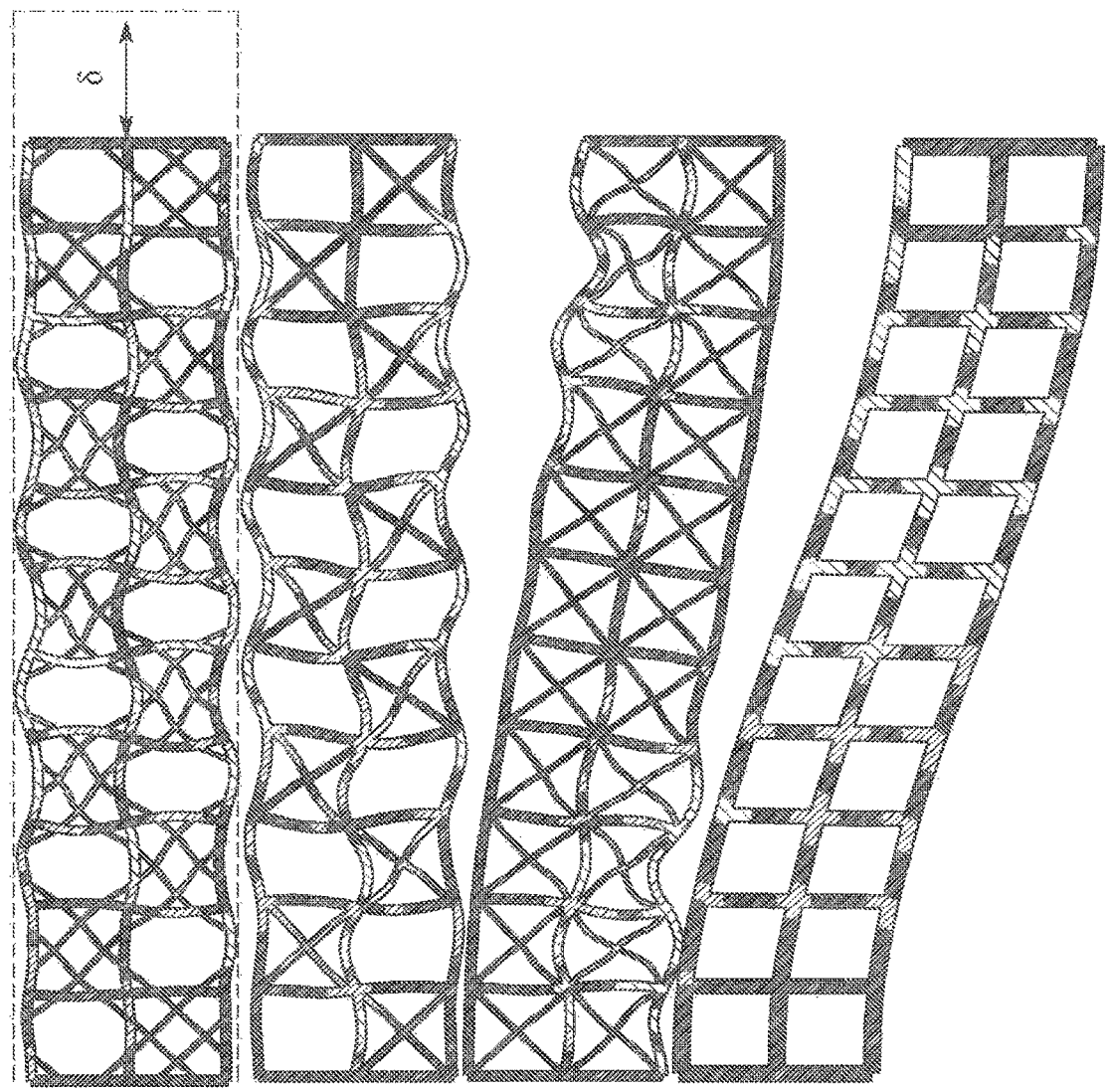
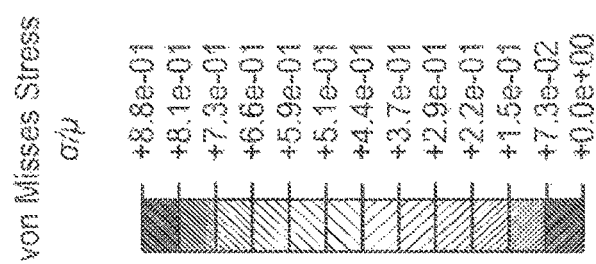
FIG. 21B

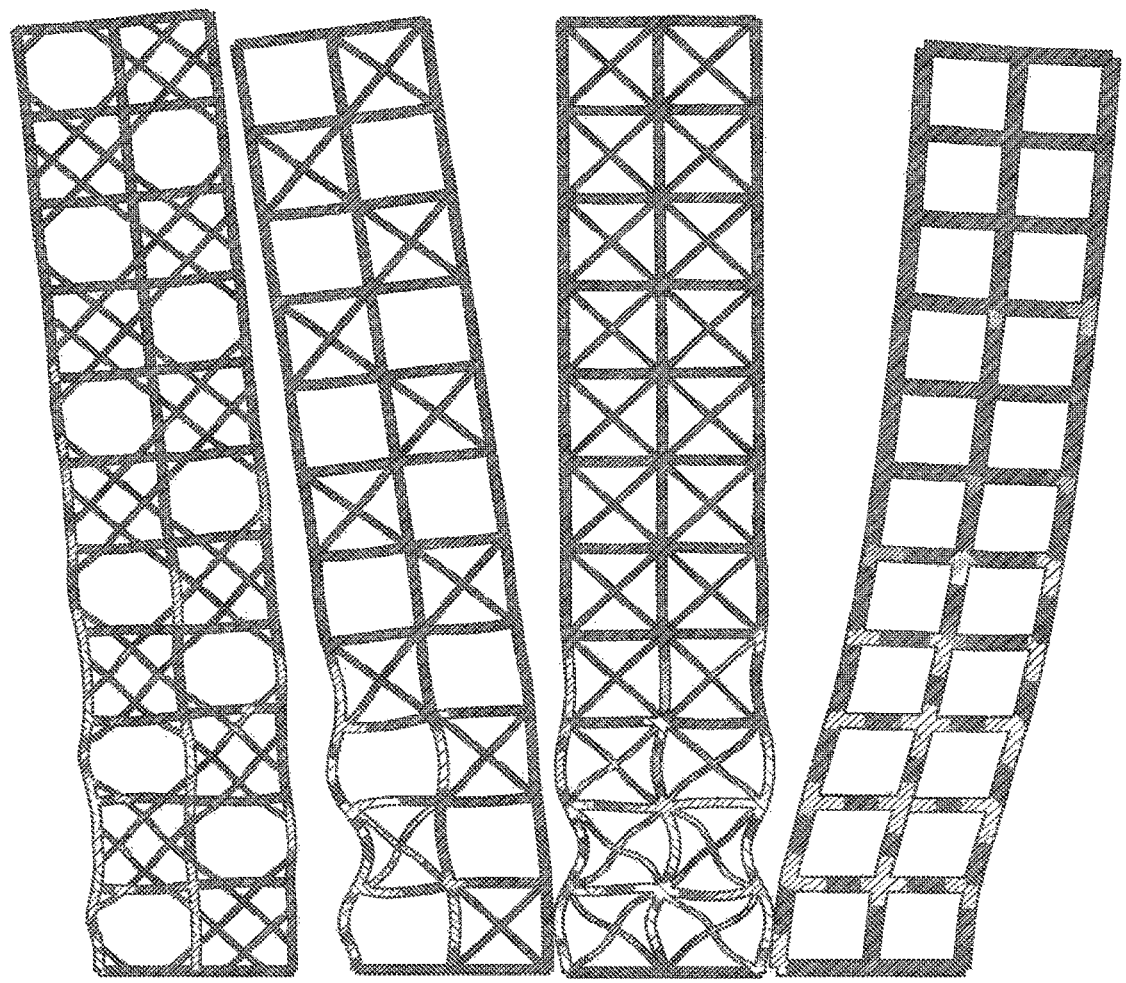
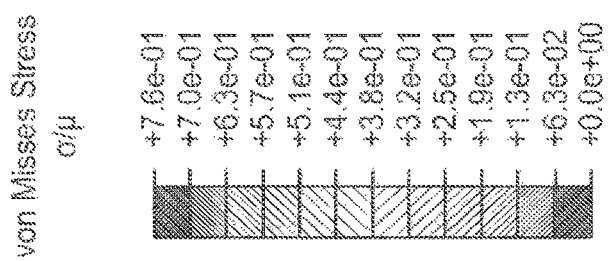
FIG. 21D

STRUCTURAL DESIGN PRINCIPLES FOR DIAGONAL BRACINGS IN TRUSS AND BEAM SUPPORT SYSTEMS

CROSS-REFERENCE TO RELATED APPLICATIONS

This application is a national stage of International Application No. PCT/US2019/063794, filed Nov. 27, 2019, which claims priority to and benefit of U.S. Provisional Patent Application Ser. No. 62/772,174, filed on Nov. 28, 2018, which is hereby incorporated by reference herein in its entirety.

STATEMENT REGARDING FEDERALLY SPONSORED RESEARCH

This invention was made with government support under 1144152 and 1533985 awarded by the National Science Foundation. The government has certain rights in the invention.

FIELD OF THE INVENTION

The present invention relates generally to a structural element, and, more particularly, to a diagonal bracing in beam and truss support systems.

BACKGROUND OF THE INVENTION

Structural bracings are typically used in beam and truss support systems commonly employed in buildings, bridges, aerospace applications, automotive applications, and power-transmission application. Additionally, structural bracings are further used in numerous other macro-scale and micro-scale examples."

For example, dating back to the 1800s, architects Ithiel Town and Colonel Long introduced complementary and simple designs for diagonal bracings in square grid lattices. Although simple, these early designs have historically proven to be effective in supporting beam structures. Based on that early success, there has been very limited research and little deviation from these old designs in modern engineering structures. As a great disadvantage, in present days the load-carrying capacity of these old designs has reached its limits. Thus, for example, weight presently limits strength and/or height of structures. In another example, weight limits lengths of structures without support, in applications such as bridges.

Thus, there is a need for providing a structural element that increases strength without increasing weight, and that prevents or reduces the above and other problems.

SUMMARY OF THE INVENTION

According to one embodiment of the present disclosure, a structural lattice includes a rectangular base defined by four periphery beams, and two non-diagonal beams that divide the rectangular base in four quadrants. The structural lattice further includes a diagonal reinforcement strut system overlaid on the rectangular base and having at least two intersecting sets of diagonal beams forming an open-and-closed cell architecture.

According to an implementation of this embodiment, one of the two intersecting sets of diagonal beams is a first set of diagonal beams, which includes first beam that is parallel to a second beam. According to a configuration of this implementation, the first beam and the second beam are symmetrically positioned over one of the four quadrants. According to another configuration of this implementation, another one of the two intersecting sets of diagonal beams is a second set of diagonal beams, the second set of diagonal beams including a respective first beam that is parallel to a respective second beam. According to one example of this configuration, the first set of diagonal beams intersects the second set of diagonal beams at a perpendicular angle. According to another example of this configuration, the respective first beam and the respective second beam are symmetrically positioned over one of the four quadrants. According to an optional aspect of this example, the first beam and the second beam of the first set of diagonal beams are symmetrically positioned over a same one of the four quadrants as the respective first beam and the respective second beam of the second set of diagonal beams.

According to another implementation of this embodiment, at least one of the four quadrants is an open cell having an equilateral octagon shape. The equilateral octagon shape is defined by two of the four periphery beams, the two non-diagonal beams, and four beams of the at least two intersecting sets of diagonal beams. According to yet another implementation of this embodiment, the rectangular base and the diagonal reinforcement strut system form at least a structural portion of a building, a bridge, an aerospace structure, an automotive structure, or a power transmission structure. According to yet another implementation of this embodiment, the diagonal reinforcement strut system is welded to the rectangular base.

According to another embodiment of the present disclosure, a periodic structural lattice has a plurality of non-diagonal reinforcing struts forms a base structure of the periodic structural lattice. The base structure is defined by a base periphery, and the plurality of non-diagonal reinforcing struts have a first volume of material. The periodic structural lattice further has a plurality of diagonal reinforcing struts coupled to the base structure and having a predetermined cross-sectional geometry that forms open and closed cells with the plurality of non-diagonal reinforcing struts. The plurality of diagonal reinforcing struts have positive and negative slopes relative to the plurality of non-diagonal reinforcing struts. The plurality of diagonal reinforcing struts is spaced apart at predetermined intervals within the base periphery and has a second volume material. The first volume of material and the second volume of material are less than a total volume of the periodic structural lattice that includes the open and closed cells.

According to one implementation of this embodiment, the plurality of non-diagonal reinforcing struts have a round cross-section. According to another implementation of this embodiment, the plurality of non-diagonal reinforcing struts have a square cross-section.

According to yet another implementation of this embodiment, the base periphery has four periphery beams forming a rectangular shape. According to a configuration of this implementation, the four periphery beams have a round cross-section. According to another configuration of this implementation, the four periphery beams have a square cross-section.

According to yet another implementation of this embodiment, the plurality of diagonal reinforcing struts includes a first pair of parallel beams and a second pair of parallel beams. The first pair of parallel beams intersects the second pair of parallel beams at a predetermined angle. According to a configuration of this implementation, the predetermined angle is 90°.

According to yet another implementation of this embodiment, the positive and negative slopes are formed by perpendicularly intersecting pairs of the plurality of non-diagonal reinforcing struts. According to yet another implementation of this embodiment, the base structure and the plurality of diagonal reinforcing struts form a repeating sub-unit of at least a structural portion of a building, a bridge, a crane, an aerospace structure, an automotive structure, or a power transmission structure.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 8 is a table that shows three-dimensional ("3D") printed samples caliper measurements.

FIG. 9 is a table that shows 3D printed samples expected values.

FIG. 13 is a table that shows finite structure buckling load optimization optimum parameters.

FIG. 14 is a table that shows infinite structure buckling load optimization optimum parameters.

FIG. 19D shows a schematic illustrating deformation of each geometry at the displacement provided at the end of the plot illustrated in FIG. 19C.

FIG. 20D shows a schematic illustrating deformation of each geometry at a displacement provided at the end of the plot illustrated in FIG. 20C.

FIG. 21B shows a schematic illustrating deformation of each geometry at a displacement provided at the end of the plot illustrated in FIG. 21A.

FIG. 21D shows a schematic illustrating deformation of each geometry at a displacement provided at the end of the plot illustrated in FIG. 21C.

Figure 1:
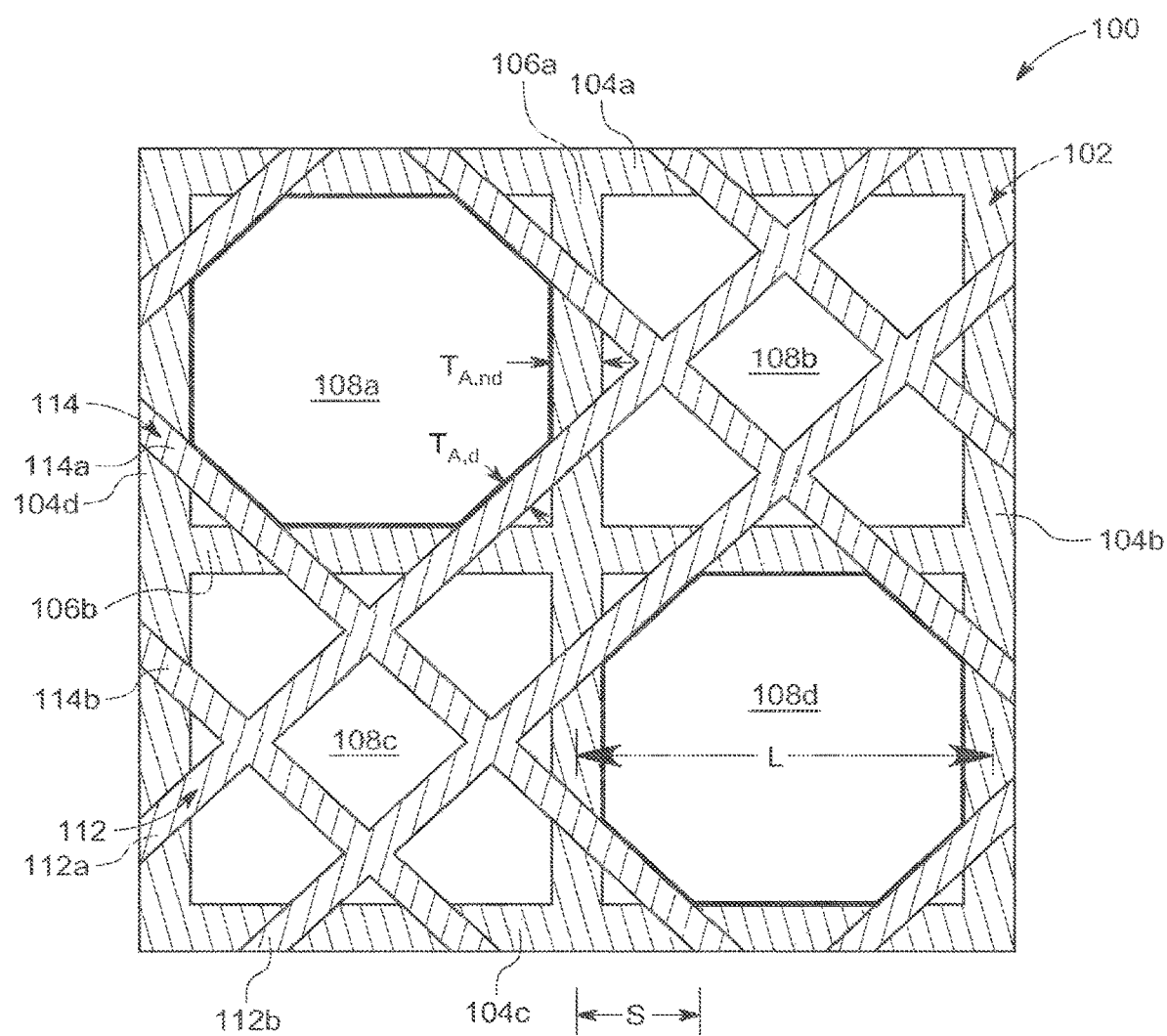
FIG. 1 shows a planar idealization of a Design A structure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, a planar idealization illustrates a periodic structural lattice 100 that has a base square-grid 102 defined by four periphery beams 104a-104d, which form a peripheral edge of the structural lattice 100. The base square-grid 102 further has two non-diagonal beams 106a, 106b that intersect each other perpendicularly at midpoints of respective periphery beams 104a-104d such that the base square-grid 102 has four open base-cells 108a-108d. In this example, the open base-cells 108a-108d are square shaped and are equal to each other. The non-diagonal beams 106a, 106b have a non-diagonal thickness $T_{A,nd}$ and the open base-cells 108a-108d each have a cell length L. According to one example, the non-diagonal beams 106a, 106b are reinforcing struts having a first volume material, and are part of a structural portion, such as a building, a bridge, a crane, an aerospace structure, an automotive structure, or a power transmission structure. For clarity, the four periphery beams 104a-104d are also considered to be non-diagonal beams.

Structurally, the base square-grid 102 is overlaid with a diagonal reinforcement strut system, which includes at least two intersecting sets of diagonal beams 112, 114 forming an open-and-closed cell checkerboard-like architecture. A first set of diagonal beams 112 has a pair of parallel beams that includes a first beam 112a and a second beam 112b. A second set of diagonal beams 114 has a respective pair of parallel beams that include a first beam 114a and a second beam 114b. Each diagonal beam 112, 114 has a diagonal thickness $T_{A,d}$ and is spaced at a diagonal spacing S.

The design of the structural lattice 100 is a new, more material-efficient design, for diagonal bracings in beam and truss support systems commonly employed in buildings, bridges, aerospace, automotive, cranes, and power transmission applications. In addition, other applications of the structural lattice 100 include numerous other macro-scale and micro-scale examples, as at least some advantages of the present disclosure are independent of the selection of material or scale of respective structure.

With the implementation of this new design, the respective structure's strength (through buckling resistance) is increased by approximately 30% over currently used engineering designs. In addition to theoretical and numerical simulation, the disclosure below describes constructed designs that were mechanically evaluated to demonstrate significant advantages over their traditionally used engineering counterparts (for example, as illustrated in FIGS. 3A-3F).

The structural lattice 100 introduces a double diagonal support system in which the alignment of S/L (diagonal spacing/cell length) is such that all lengths of the beams 106a, 106b create an equilateral octagon for the squares 108a, 108d that do not contain diagonal beams. Although some of the examples described below illustrate the thickness of the diagonals $T_{A,d}$ being half of the thickness of the non-diagonals $T_{A,nd}$, the thicknesses illustrate only one example of the mass allocation possible for the disclosed lattice design.

The structural lattice 100 is beneficial at least because, while only slightly increasing design complexity, it obtains a stronger and more robust lattice structure while using the same volume of material. One exemplary application for the structural lattice 100 is to build taller, more slender structures, such as high-rise buildings. In this application, the weight of the support structure is typically a limiting factor as how tall a high-rise can be built. Re-allocating the mass of the structural lattice 100, the same amount of material used in typical engineering now provide a significantly higher strength using the design principles of this disclosure.

The design configurations of this disclosure for the structural lattice 100 are generally advantageous over previous design configuration, and would have been considered counterintuitive in accordance with previous design thought for several reasons. For example, according to previous design configurations, the structural lattice 100 would have been considered to contain additional material, and, thus, would not have been considered to be economically advantageous. As such, the previous design configuration would have allocated additional material to existing truss elements. In contrast to the previous design configurations and previous design thought, advantageously, the structural lattice 100 does not contain additional material and is economically advantageous.

According to another example of a previous design configuration, it has been previously widely accepted that triangular lattices provide a strong mechanism for stability. In contrast to previous triangular lattices, advantageously, the structural lattice 100 designs of the present disclosure include non-triangular elements (thus, rendering the presently disclosed designs as undesirable based on previous design thought).

According to yet another example of a previous design configuration, very little attention has been devoted to buckling strength of lattices. Much of previous constriction code is kept well under the buckling strength of a design. Instead, a lot of attention has been previously devoted to the stiffness of a structure. In addition to focusing on stiffness, advantageously, the present disclosure focuses on the buckling strength of a design.

Figure 2A:
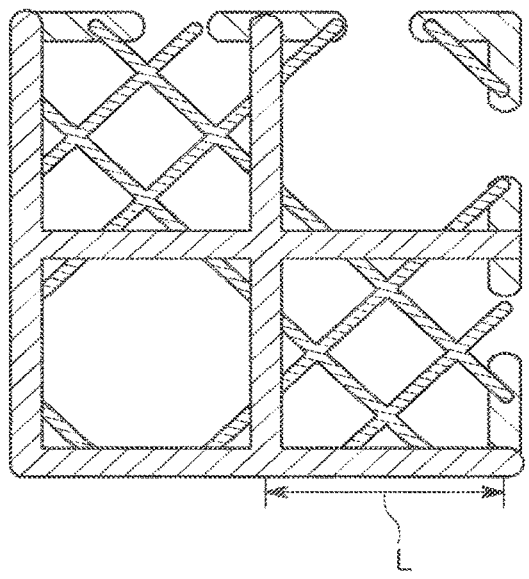
FIG. 2A shows another illustration of a Design A of a lattice structure.
Figure 2B:
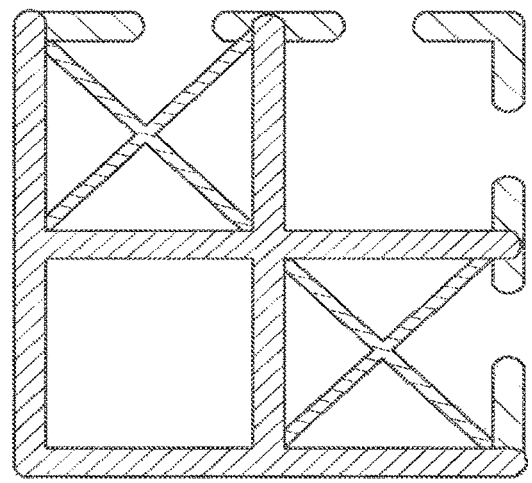
FIG. 2B shows a Design B of a lattice structure.
Figure 2C:
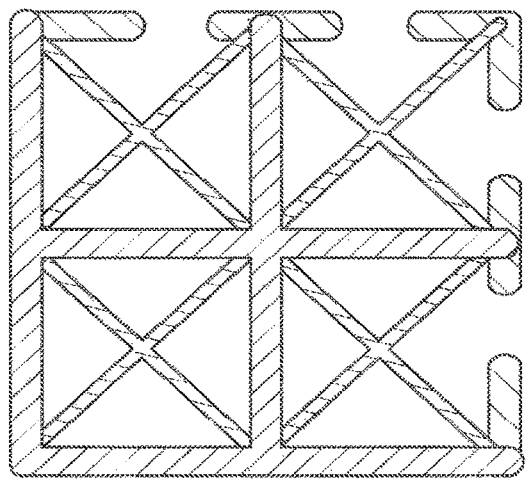
FIG. 2C shows a Design C of a lattice structure.
Figure 2D:
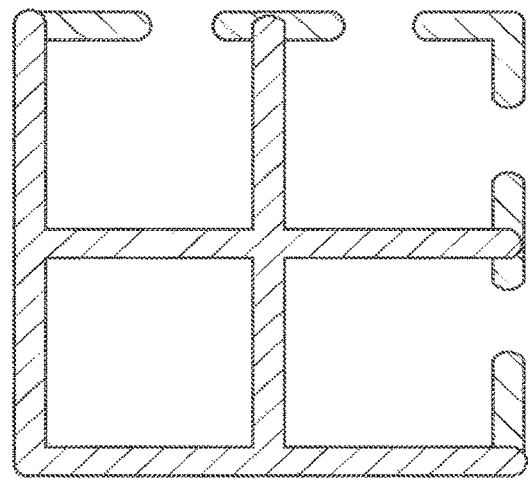
FIG. 2D shows a Design D of a lattice structure.
Figure 2E:
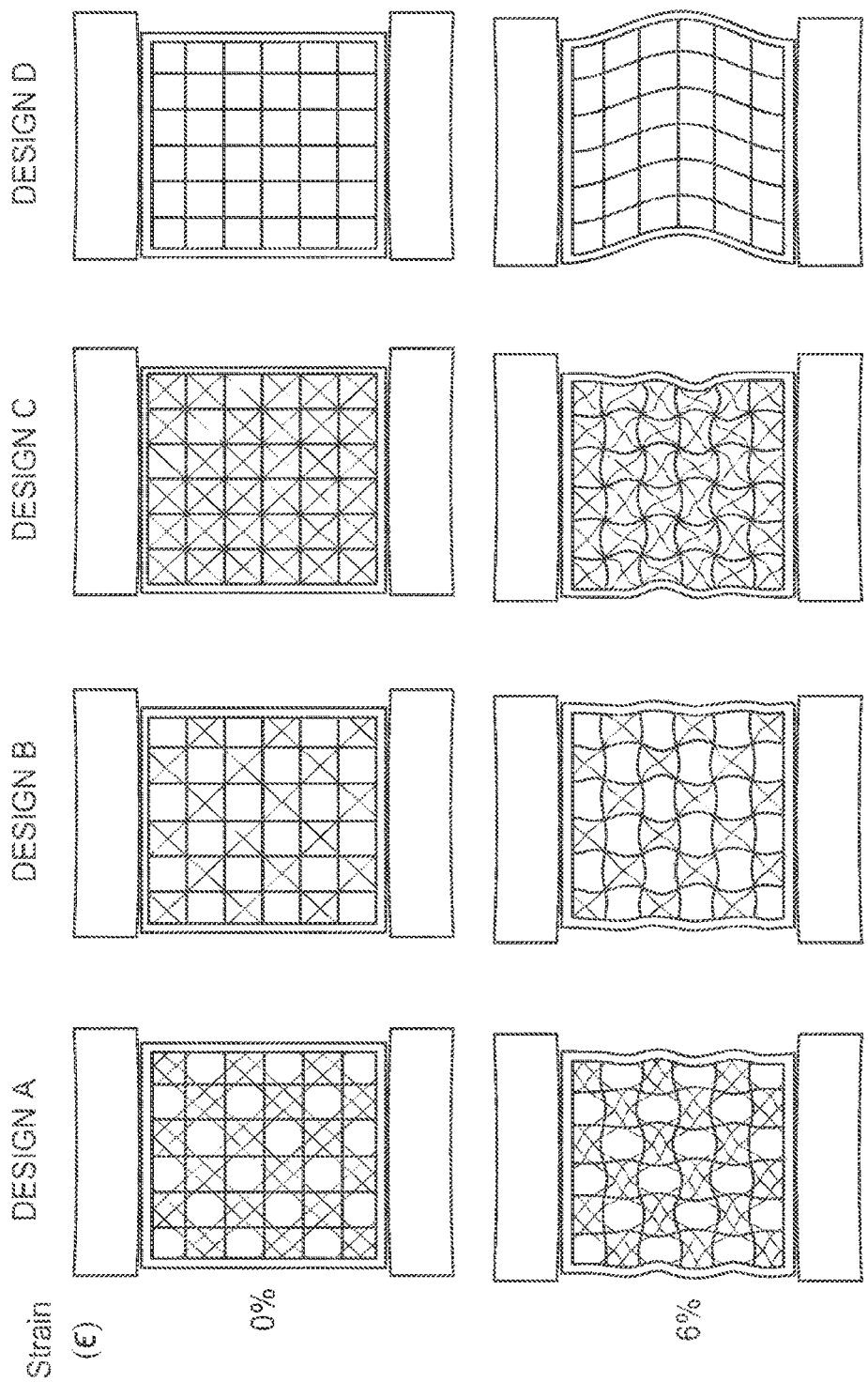
FIG. 2E shows an experimental setup (top row) and deformations (bottom row) for the different Designs A-D illustrated in FIGS. 2A-2D.
Figure 2F:
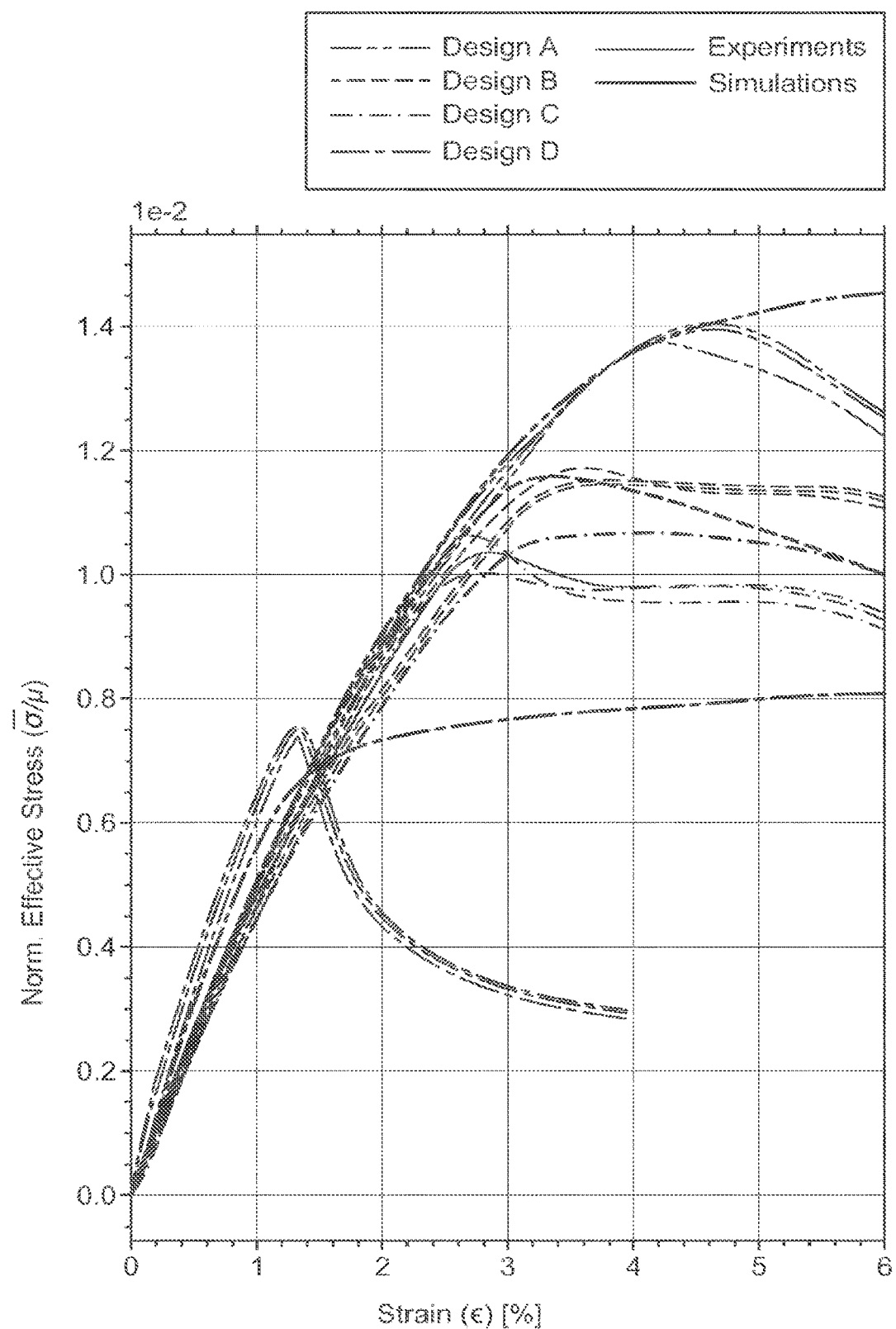
FIG. 2F shows a chart with results from experiments using the experimental setup illustrated in FIG. 2E, as well as numerical finite element simulations.

Referring generally to FIGS. 2A-2F, different designs A-D are considered in the analysis disclosed below. Each of the designs A-D illustrated in FIGS. 2A-2D are variations based on the structural lattice 100 described above. Referring to FIG. 2E, an experimental setup shows 0% applied strain (top row) and 6% applied strain (bottom row) to a representative model for each of the four designs A-D. Referring to FIG. 2F, experimental (solid lines) stress-strain curves for 3 independently tested samples of each design are shown, as well as the overlaid numerical (dashed lines) non-linear results. The close agreement between the experimental and numerical results convey that the model is accurately capturing the physical behavior observed experimentally.

To understand mechanical benefits of the disclosed structural architecture, the performance of a disclosed design is compared to that of three other two-dimensional ("2D") lattices, all based on a square architecture with edge lengths L and comprising struts with rectangular cross-sections and depth H large enough to avoid any out-of-plane deformation. More specifically, the comparison is made relative to Design A, Design B, Design C, and Design D. Design A, which is illustrated in FIG. 2A, and includes horizontal and vertical elements with thickness $T_{A,nd}$=0.1 L and two sets of parallel double diagonals with thickness $T_{A,d}$=0.05 L located at a distance S=L/($\sqrt{2}$+2) from the nodes (as illustrated in FIG. 2A). Design B, which is illustrated in FIG. 2B, is similar to Design A but only contains a single diagonal with thickness $T_{B,d}$=0.1 L crossing each of the closed cells. Design C, which is illustrated in FIG. 2C, is similar to bracings found in modern structural engineering and contained a crossed set of diagonal beams with thickness $T_{C,nd}$=0.05 L in every cell. Lastly, Design D, which is illustrated in FIG. 2D, has no diagonal reinforcement and horizontal and vertical elements with thickness $T_{D,nd}$=0.1 L(1+1/$\sqrt{2}$). All four designs share the same total volume and that for Designs A, B, and C the ratio between the volume of the diagonals and non-diagonals struts is identical.

The mechanical response under uniaxial compression is compared along the vertical elements of the four lattices described above in reference to Designs A-D. Samples with 6×6 tessellations of square cells with L=1.5 cm and H=4 cm are fabricated with a Connex500 multi-material 3D printer (Stratasys, Eden Prairie, Minn., United States) from a Shore A 95 durometer digital elastomer (FLX9795-DM) and are compressed uniaxially using a single axis Instron (Model 5969) with a 50 kN load cell (as illustrated in FIG. 2E). Two key features emerge from the stress-strain curves reported in FIG. 2F. First, all designs with diagonal reinforcement (i.e., Designs A-C) are characterized by a nearly identical initial elastic response, indicating that the different diagonal reinforcement designs do not impact the structure's initial overall stiffness. Design D, as expected, exhibits a higher initial stiffness because of its thicker vertical and horizontal elements. Second, all curves show a clear maximum load bearing capacity, with Design A accommodating the highest load. Because such maximum corresponds to the onset of buckling, it is inferred that Design A displays the highest critical buckling stress between the considered designs. Furthermore, as illustrated in FIG. 2E, in all three designs with diagonals the post-buckling behavior results in a homogeneous pattern transformation throughout the sample. Differently, for Design D the critical mode has a much larger wavelength than the size of a square unit cell and results in a post-buckled shape qualitatively similar to that of a compressed buckled beam.

As shown in FIG. 2F, close agreement exists between the numerical and experimental results, confirming the accuracy of the analyses. Next, the finite element model is extended to explore the effect of additional loading direction.

Figure 3A:
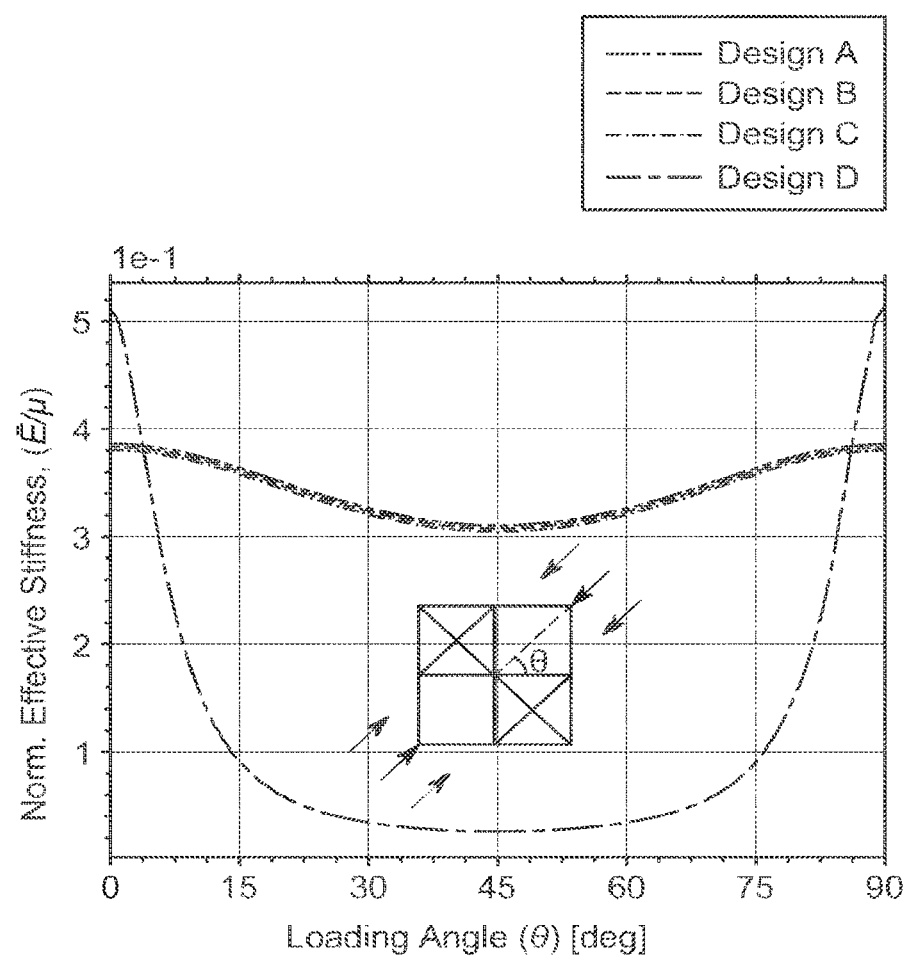
FIG. 3A shows a chart with structural stiffness as a function of loading angle for different designs.
Figure 3B:
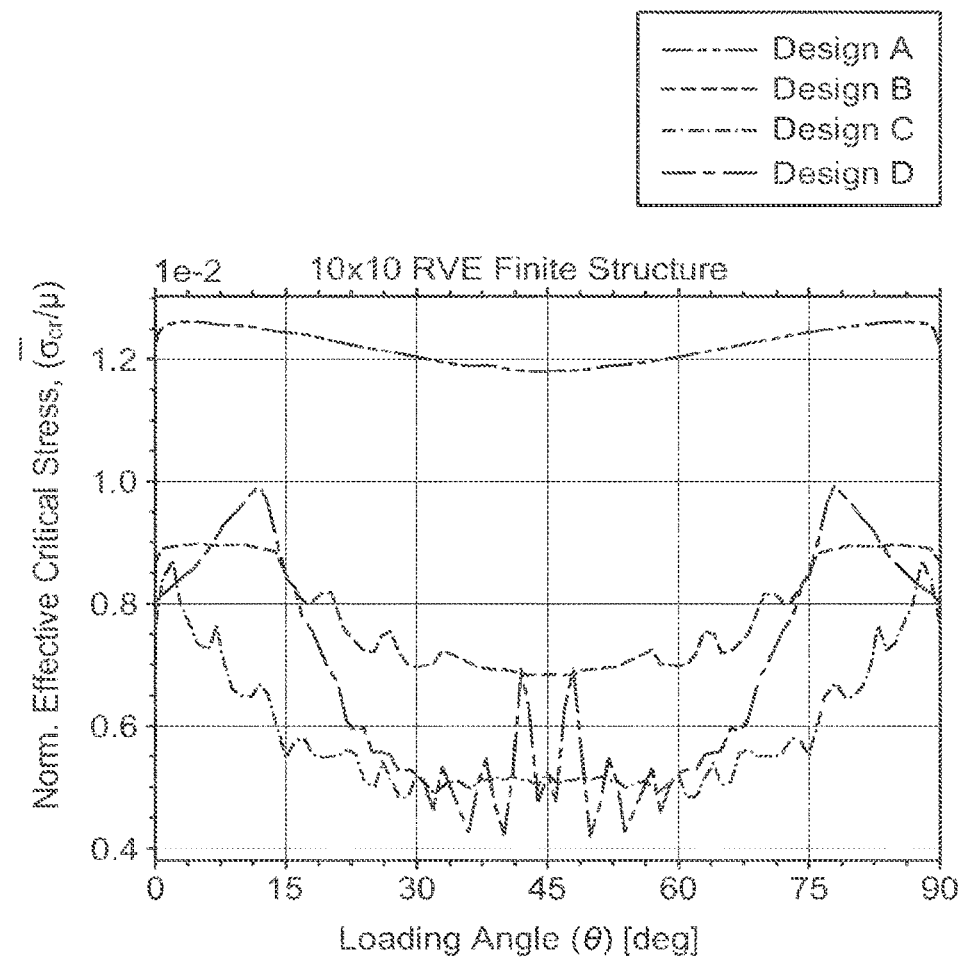
FIG. 3B shows a chart with effective buckling stress as a function of loading angle for different designs.
Figure 3C:
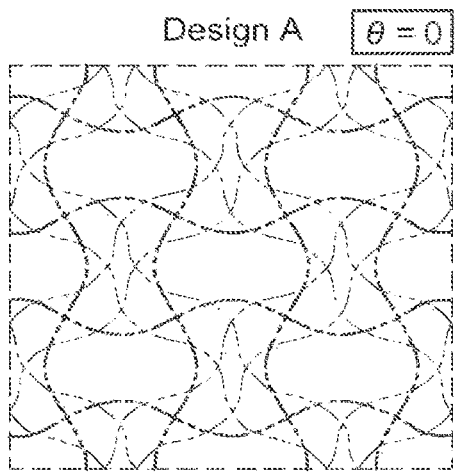
FIG. 3C shows a buckling mode for Design A at an angle of 0 degrees.

Referring generally to FIGS. 3A-3F, a structure mechanical response is illustrated. FIG. 3A shows a chart with the structural stiffness for the different designs as a function of loading angle. The chart is generated using periodic infinite RVE arranged in a 10 by 10 unit with periodic boundary condition. FIG. 3B shows a chart with effective buckling stress for a finite (non-periodic) 10 by 10 unit-cell structure. FIGS. 3C-3F show a buckling mode for Design A-D at 0° loading angle. A 10×10 unit cell periodic structure is used to capture the macroscale behavior of Design D.

In FIG. 3A, the evolution of the effective stiffness, E, is reported as a function of the loading angle θ. The stiffness of all structures containing diagonal reinforcement is virtually identical for any loading angle, further confirming that the structural stiffness is nearly entirely governed by the amount of material allocated along the loading direction. As a result, Design D, in which all of the material is allocated to the non-diagonal elements, has the highest stiffness for θ=0°, but has almost negligible load-bearing capacity for θ=45°, where the only contribution to its stiffness comes from the minimal bending resistance of the joints.

Figure 3D:
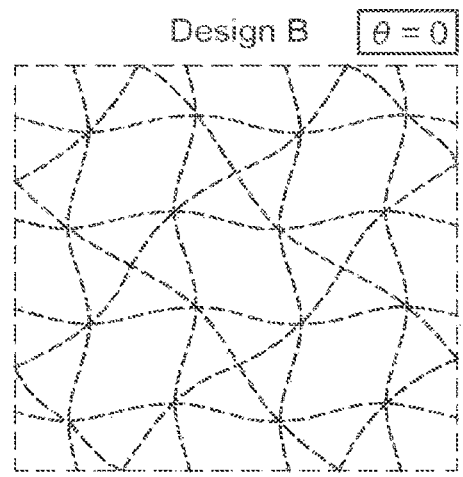
FIG. 3D shows a buckling mode for Design B at an angle of 0 degrees.
Figure 3E:
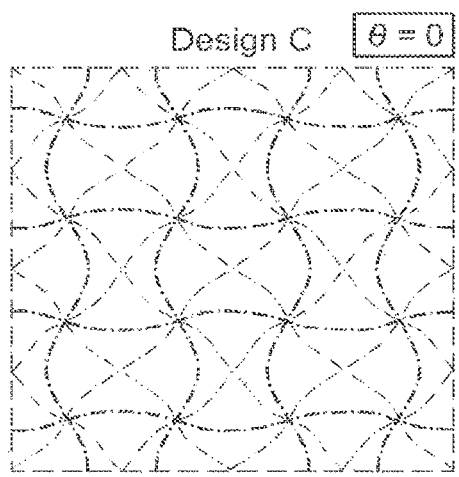
FIG. 3E shows a buckling mode for Design C at an angle of 0 degrees.
Figure 3F:
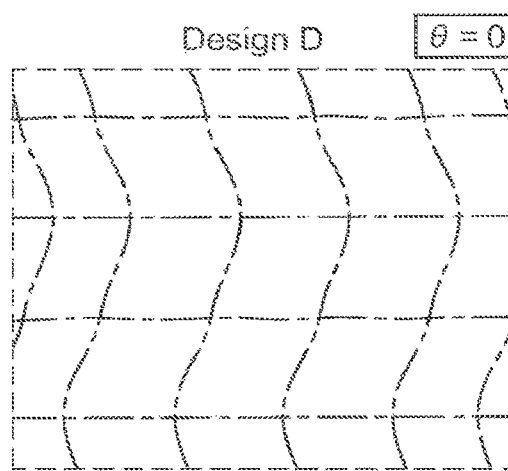
FIG. 3F shows a buckling mode for Design D at an angle of 0 degrees.

Next, the effect of 0 on the buckling behavior of Designs A-D is investigated. The effective critical buckling stress ($\bar{\sigma}_{cr}$) of Design A is higher than the other diagonally reinforced designs (namely Design B and Design C) for all values of θ (FIGS. 3D and 3E).

Having demonstrated the benefits of Design A compared to Designs B-D, a question is whether there exists a different diagonally reinforced square lattice design with even higher critical buckling stress. To answer this question, an optimization problem identifies the number of diagonals, N, their distance from the nodes of the square lattice Si (with i=1, 2, ..., N), as well as the ratio between diagonal and non-diagonal elements $\lambda=V_{nd}/V_d$ ($V_{nd}$ and $V_d$ being the volume of the non-diagonal and diagonal elements, respectively) that result in the highest buckling stress. Particularly, finite size structures are considered that are composed of 3×3 RVEs and that focus on uniaxial compression parallel to the non-diagonal elements (i.e. θ=) 0° while constraining the total volume of the RVE to match that of the designs considered in FIGS. 2A-2F. The objective function $Z=\bar{\sigma}_{cr}$ is maximized using finite element simulations. For each set of inputs identified by optimization algorithm, a finite element buckling analysis is conducted to obtain $\bar{\sigma}_{cr}$ and, therefore, evaluate the objective function Z. Note that seven separate optimizations are conducted, each considering a fixed integer number of diagonal elements N, ranging from one to seven (N= $\mathbb{Z} \in$ [1, 7]). Based on the high strength of lattices reinforced by diagonals aligned at a 45°, in all the runs it is assumed that all diagonals are oriented at 45° with respect to the non-diagonal members and that $V_d$ and $V_{nd}$ are distributed equally among the diagonal and non-diagonal elements, respectively. Furthermore, to ensure the symmetry, it is assumed that $S_{2i-1}=S_{2i}$ (i=1, 2, . . . , N/2) if N is an even number and $S_1=0$ and $S_{2i-1}=S_{2i}$ (i=2, 3, (N−1)/2) for off values of N.

Figure 4A:
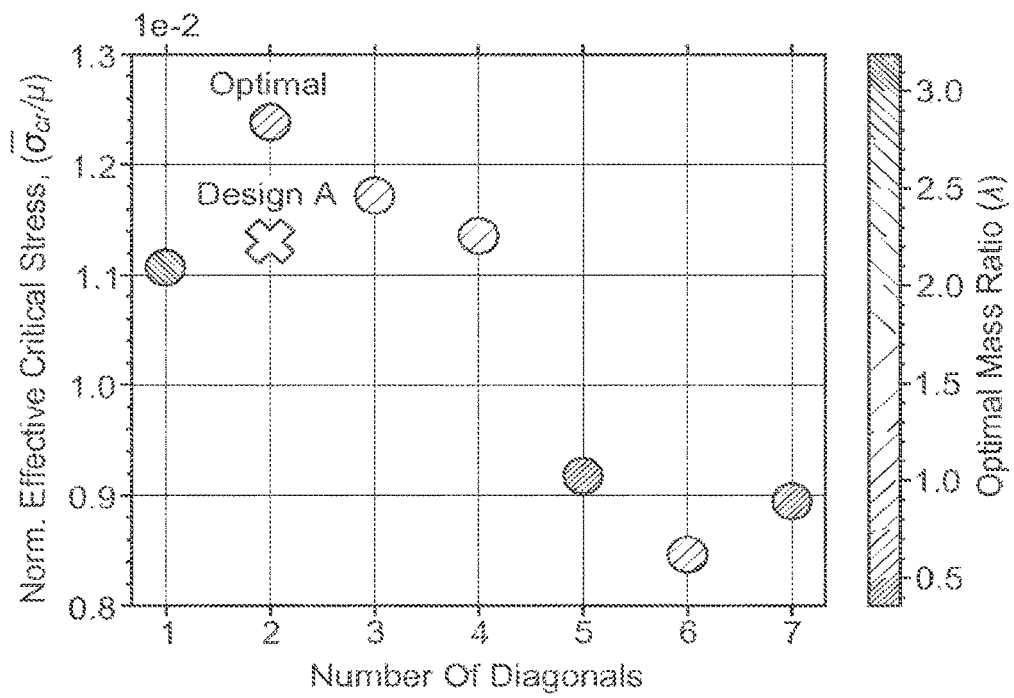
FIG. 4A shows a chart with an optimal value of critical buckling load for a varying number of diagonals.
Figure 4B:
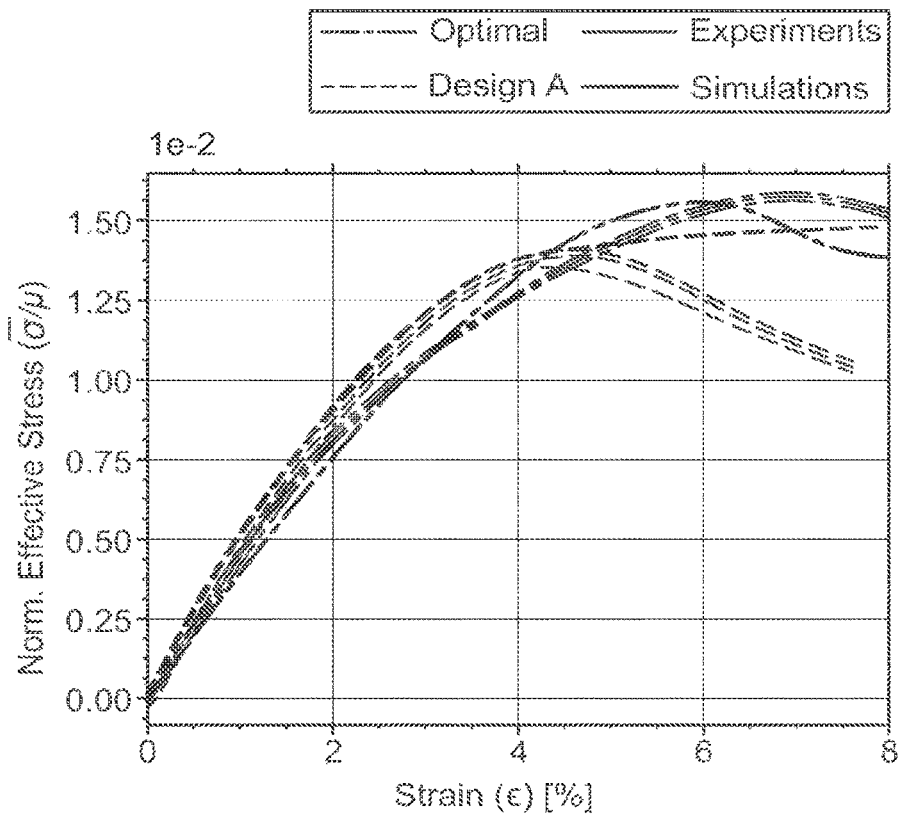
FIG. 4B shows a chart with experimental stress-strain curves for 3 independently tested samples of Design A, Optimum Design, and respective simulations.

Referring generally to FIGS. 4A and 4B, charts shows critical buckling load optimization results. Referring specifically to FIG. 4A, a chart shows the optimal value of critical buckling load for varying number of diagonals. Geometries in this optimization analysis are defined to match that of the experimental setup in order to optimize a realistic structure found in modern lattice applications. The shade for each point in this graph represents the optimal mass ratio λ parameter output by the optimization algorithm for that configuration.

Referring specifically to FIG. 4B, a chart shows the experimental (solid lines) stress-strain curves for 3 independently tested samples of each design, as well as the overlaid numerical (dashed lines) non-linear results comparing both Design A and the Optimization Design. In FIG. 4B, the Optimization Design has proven slightly better than Design A. Additionally, the chart of FIG. 4B shows the highest $\bar{\sigma}_{cr}$ identified by the optimization algorithm for all considered number of diagonals N. Remarkably, it is determined that the highest $\bar{\sigma}_{cr}$ is only 9.55% higher than that of Design A and occurs for a design similar to Design A (with two diagonals located at a distance $S_1=S_2=0.1800$ L from the nodes and volume is distributed so that λ=0.6778). As such, this numerical prediction, which is validated by experimental results (illustrated in FIG. 4B) indicates that Design A is exceptionally close to that providing the highest critical stress.

Figure 5A:
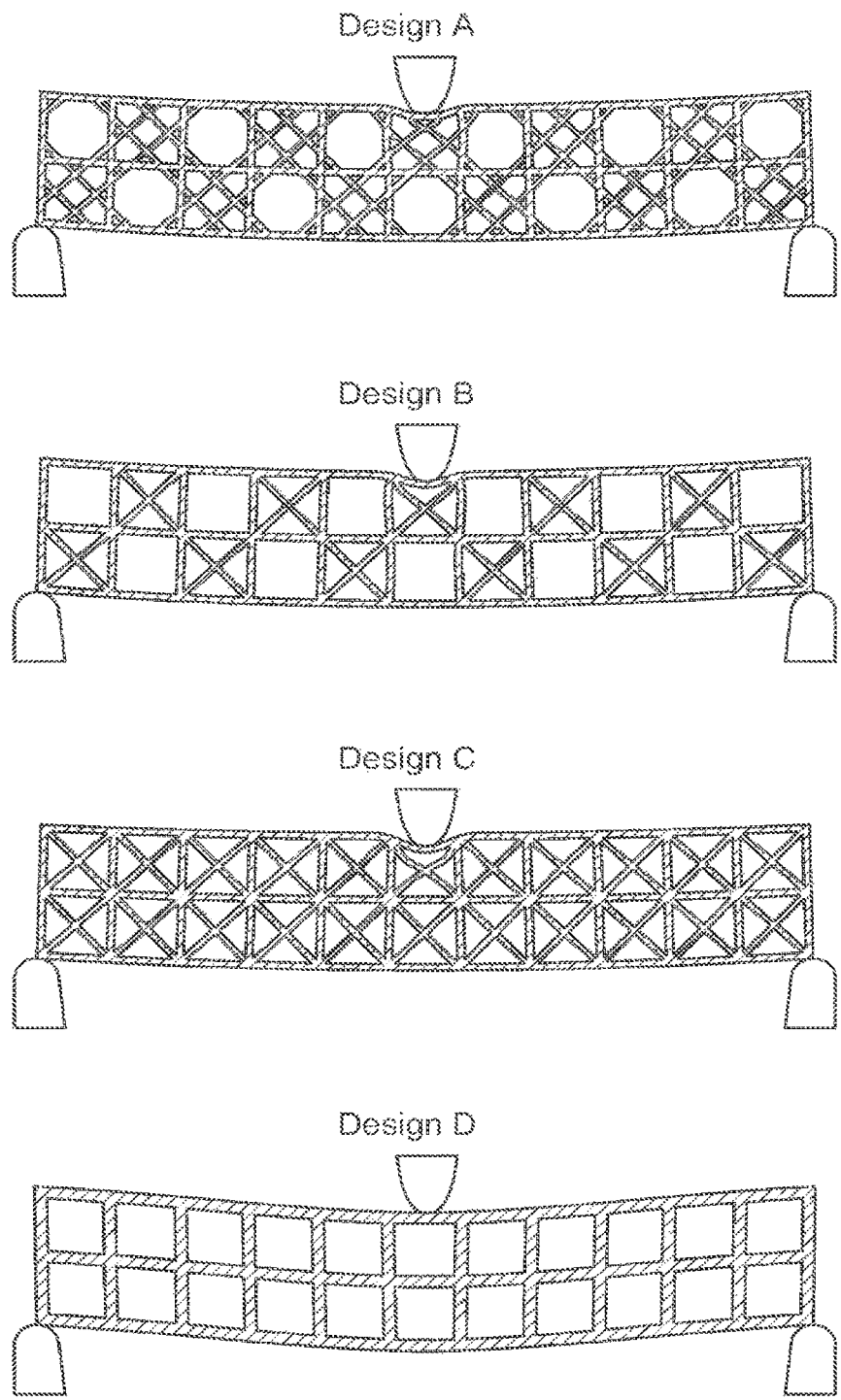
FIG. 5A shows experimental deformation from 3-point bending applied in each of Designs A-D.
Figure 5B:
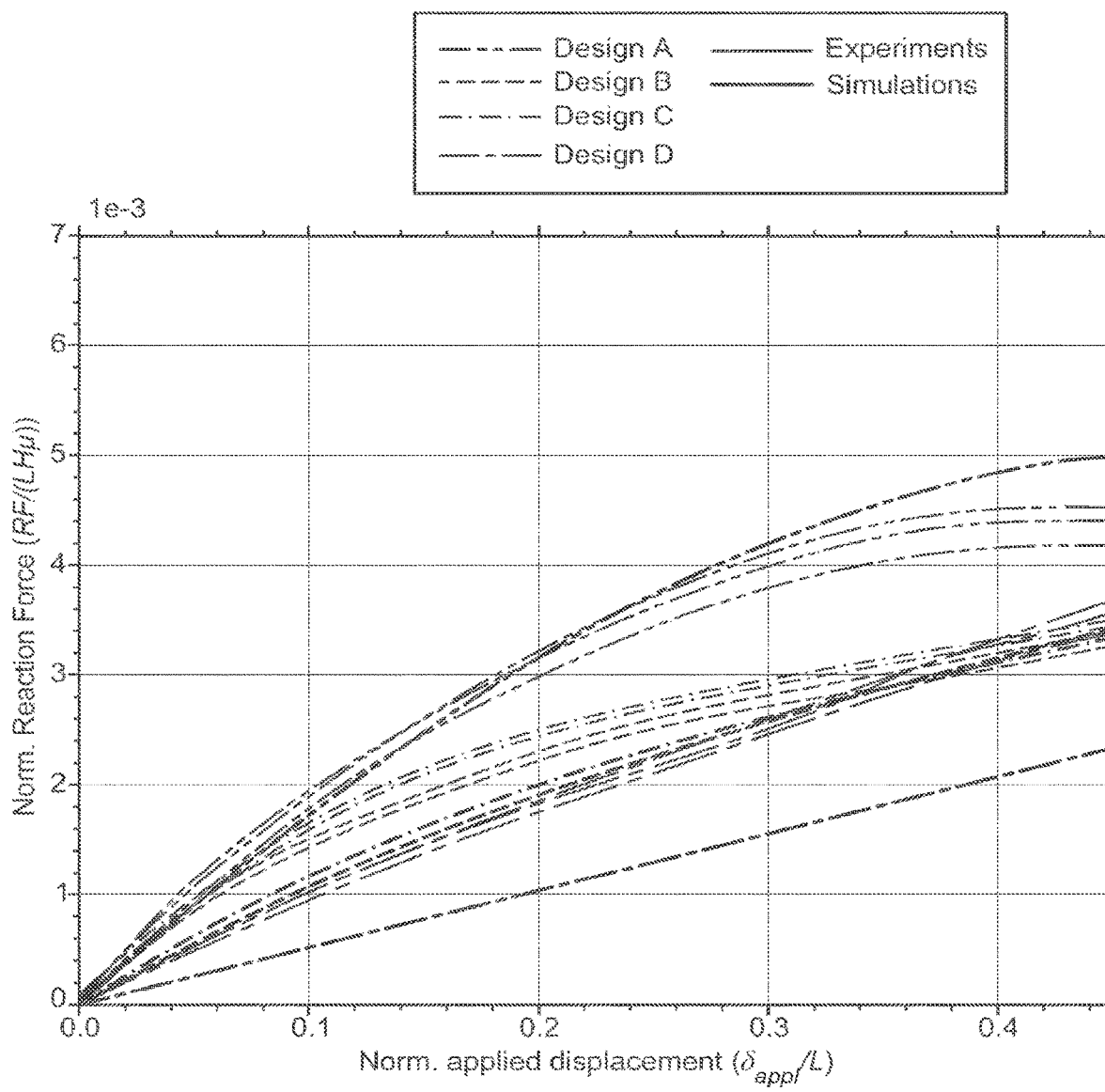
FIG. 5B shows a chart with results from an experimental reaction force vs. an applied displacement with simulations results overlaid.

Referring generally to FIGS. 5A and 5B, an experiment provides bridge loading experimental and numerical results. The experimental results are from 3-point bend testing of 11 cell (5.5 unit cell) array aligned horizontally. In FIG. 5A, the deformation of the structure at $\delta_{app}/L=0.45$ is illustrated for each of the four Designs A-D. In FIG. 5B, a chart shows the experimental reaction force vs. applied displacement and its equivalent nonlinear finite element result.

However, the superior mechanical performance of Design A is not limited to this loading condition. To demonstrate this important point, in FIGS. 5A and 5B results are presented for tessellation of 11×2 square cells loaded in 3-point bending. Both experiments and finite element simulations indicate that Design A is stiffer and can withstand higher loads by approximately 15% over a larger range of applied displacements, illustrating the potential benefit of incorporating such design in suspended structures. Finite element simulations are further used to evaluate the performance of Designs A-D in 5 other loading regimes with results identified in FIGS. 19A-21D. For all of the loading cases considered, it is found that Design A is able to withstand significantly higher loads than any of the other structures— making it the best candidate to realize load bearing structures for a variety of applications.

Design A is experimentally compared to other common diagonally reinforced square lattices (Design B-C) and to the non-diagonally reinforced lattice (Design D), all with the same total mass. It is determined, based on the comparison, that Design A provides a superior mechanism for withstanding uniaxial loads prior to the onset of buckling. Furthermore, by simulating these designs using finite element analysis Design A has proven superior buckling performance not only in uniaxial compression but also in every other possible loading direction. Additionally, by using optimization tools to survey the design space it is determined that Design A is nearly identical to the design providing the highest critical stress under uniaxial compression. Finally, by expanding the numerical simulations, a wide spectrum of loading conditions are analyzed and Design A proves to maintain robustness for a large number of conditions considered. Therefore, the results presented here indicate that by intelligently allocating material within a square lattice, a structure is achieved that is at least 15% stronger without the need for adding more material or reduce its stiffness. The mechanical properties of Design A has the implication to improve square lattice designs found in modern infrastructure such as bridges and buildings, as well as small scale lattice applications.

Design Examples

In this study, four different lattice configurations (Designs A, B, C, and D) are constrained to deform in an in-plane setting only. In an effort to conduct a fair performance comparison between the different designs, all four lattices are characterized by containing the same total volume of material and a fixed volume ratio between non-diagonal and diagonal elements. Two different shapes are considered for the cross-section of the struts: circular and rectangular. For the circular cross-section case, the diameters are $D_{\alpha,nd}$ and $D_{\alpha,d}$ of the non-diagonal (i.e. horizontal and vertical) and diagonal struts in the a-th design, respectively, and out-of-plane buckling is neglected. For the rectangular cross-sections, the depth H and in-plane thickness $T_{\alpha,nd}$ and $T_{\alpha,d}$ are selected to avoid out-of-plane deformation (i.e., the depth over thickness ratio is selected to be sufficiently large). Finally, it is important to note that the slenderness of the non-diagonal members in the α-th design ∈[A, B, C] is chosen as $$\frac{D_{\alpha,nd}}{L} = 0.1, \tag{S1}$$

and $$\frac{T_{\alpha,nd}}{T} = 0.1,$$

for the case of circular and rectangular cross-section. The disclosure below further describes in detail the unit cells for four different designs, and provides the derivations for each geometry cross-section characteristics.

Figure 6A:
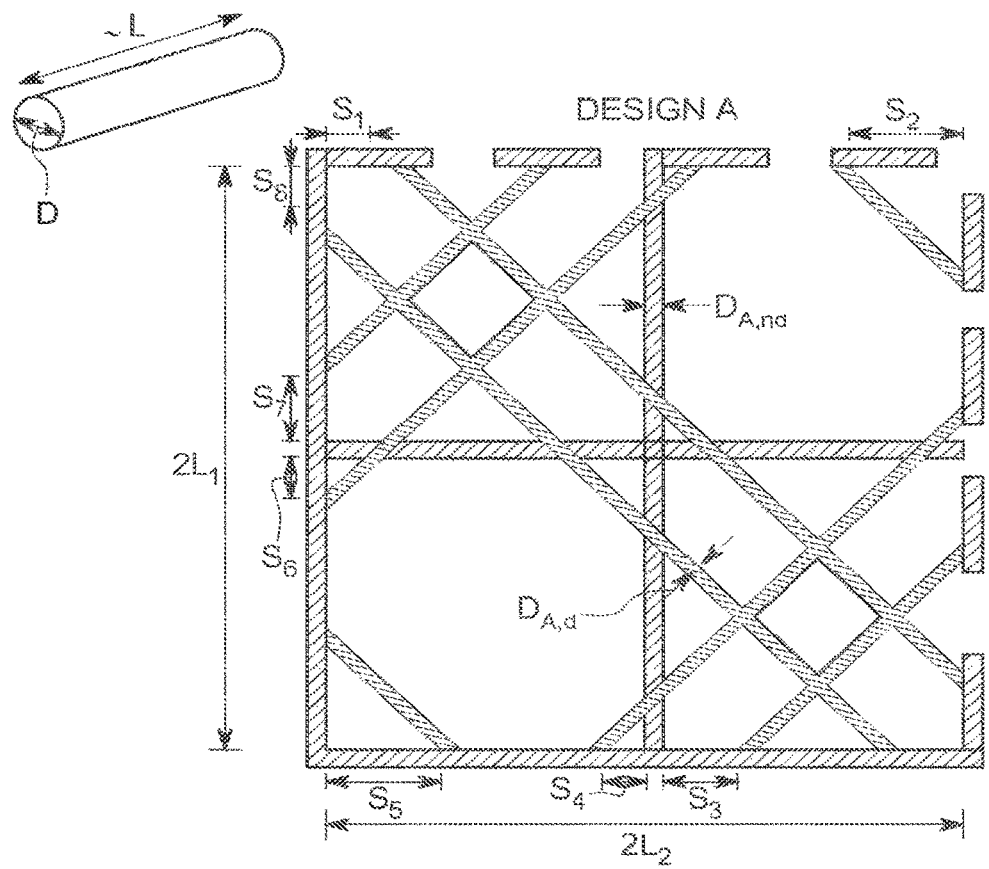
FIG. 6A shows dimensions for Design A in a circular cross-section configuration.
Figure 6B:
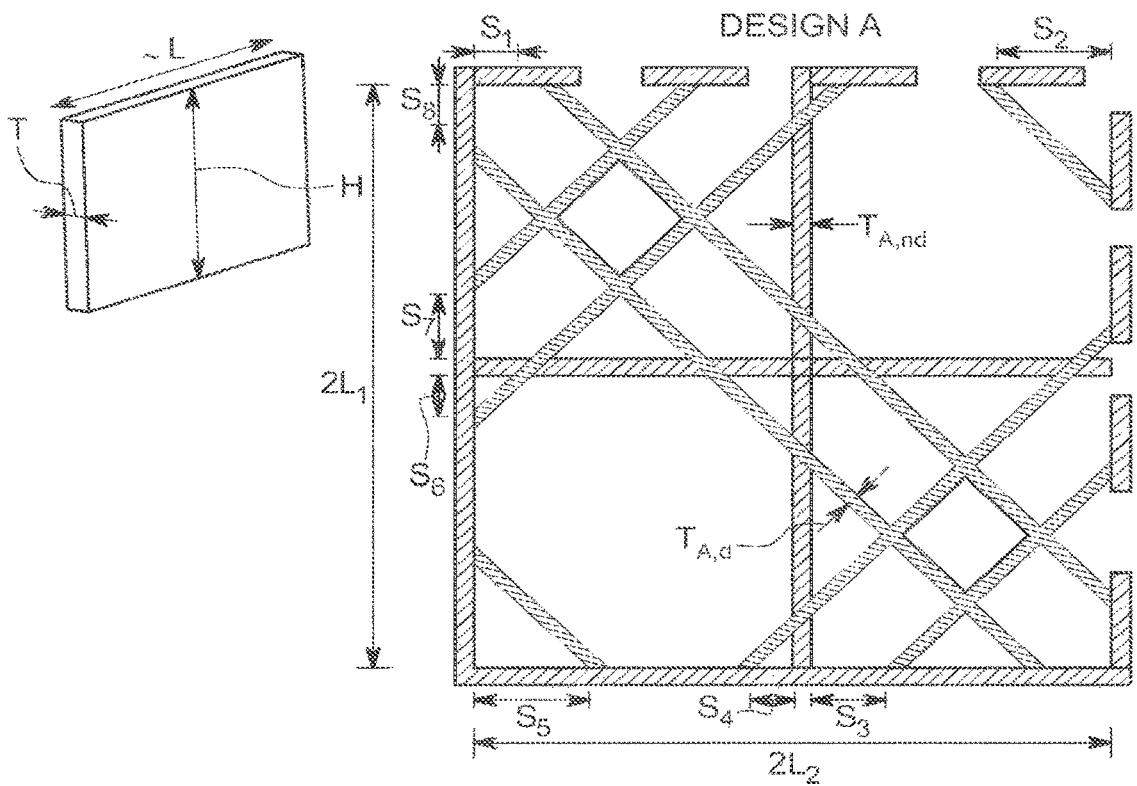
FIG. 6B shows dimensions for Design A in a rectangular cross-section configuration.

Referring generally to FIGS. 6A and 6B, a unit cell is illustrated for Design A. This design consists of a square grid reinforced by a double diagonal support system. FIG. 6A shows dimensions of this design considering a circular cross-section, and FIG. 6B shows dimensions of this design considering a rectangular cross-section. In both cases, the horizontal and vertical non-diagonal struts have a total length 2L, in which L1=L2 and all $S_1$=S. For FIG. 6A, considering a circular cross-section, the non-diagonal diameter is denoted as $D_{A,nd}$ and it is assumed that $D_{A,nd}/L=0.1$, and the diagonal elements have a diameter $D_{A,d}=2D_{A,nd}$. For FIG. 6B, considering a rectangular cross-section, the non-diagonal thickness is denoted as $T_{A,nd}$ and it is assumed that $T_{A,nd}/L=0.1$, and the diagonal elements have a thickness $T_{A,nd}=2T_{A,d}$. For all rectangular cross-section elements, the depth H is assumed to be equal and large enough to constrain any out-of-plane deformation.

Design A consists of a square grid reinforced by a double diagonal support system (as illustrated in FIGS. 6A and 6B). As for the case of Design A, the diagonal elements are assumed to form an octagonal opening on every other cell, so that they intersect the horizontal and vertical struts at a distance $\Delta L=L/(\sqrt{2}+2)$ from the nodes, where L denote the length of the vertical/horizontal struts.

CIRCULAR CROSS-SECTION—If it assumed that the cross-section of all struts is circular, the projected area and volume for the non-diagonal ($A_{A,nd}$ and $V_{A,nd}$) and diagonal ($A_{A,d}$ and $V_{A,d}$) members is given by $$A_{A,nd} = 8LD_{A,nd}; \tag{S2}$$

$$V_{A,nd} = 8L\left(\pi\frac{D_{A,nd}^2}{4}\right) = 2L\pi D_{A,d}^2; \tag{S3}$$

$$A_{A,d} = 8\sqrt{2}LD_{A,d}; \tag{S4}$$

and $$V_{A,d} = 8\sqrt{2L}\pi\frac{D_{A,d}^2}{4} = 2\sqrt{2}L\pi D_{A,d}^2. \tag{S5}$$

Because the projected area ratio of the non-diagonal to diagonal elements in Design A has been measured to be $$\frac{A_{A,nd}}{A_{A,d}} = 1.4; \tag{S6}$$

by substituting eq. (S2) and eq. (S4) into the equation above it is determined that for Design A $$D_{A,nd}=1.4\sqrt{2}D_{A,d}=2D_{A,d}. \tag{S7}$$

Substitution of eq. (S7) into eq. (S3) and eq. (S5) yields $$\frac{V_{A,nd}}{V_{A,d}} = \frac{2L\pi D_{A,nd}^2}{2\sqrt{2}L\pi D_{A,d}^2} 2\sqrt{2} \tag{S8}$$

and $$V_{A,T} = V_{A,nd} + V_{A,d} = 2\pi L(D_{A,nd}^2 + \sqrt{2}D_{A,d}^2) = 2\pi LD_{A,nd}^2\left(1 + \frac{1}{2\sqrt{2}}\right); \tag{S9}$$

where $V_{A,T}$ indicates the total volume of the unit cell for Design A.

Finally, it is important to note that in this study Design A is used as the base model, and thus constrain the total volume of all the other unit cell designs with circular cross-section to be equal to that of Design A, namely, $$V_{\alpha,d} + V_{\alpha,nd} = V_{A,T} = 2\pi LD_{A,nd}^2\left(1 + \frac{1}{2\sqrt{2}}\right); \tag{S10}$$

with α=B, C and D. For Designs B and C, which include diagonal elements, the volume ratio of the non-diagonal to diagonal elements is constrained to be the same as in Design A $$\frac{V_{\alpha,nd}}{V_{\alpha,d}} = \frac{V_{A,nd}}{V_{A,d}} = 2\sqrt{2}; \tag{S11}$$

with α ∈ B and C.

RECTANGULAR CROSS-SECTION—If it is assumed that the cross-section of all struts is rectangular, the projected-area for the non-diagonal ($A_{A,nd}$) and diagonal ($A_{A,d}$) members is given by $$A_{A,nd} = 8LT_{A,nd} \tag{S12}$$

and $$A_{A,d} = 8\sqrt{2}LT_{A,d}, \tag{S13}$$

where $T_{A,nd}$ and $T_{A,d}$ are the non-diagonal and diagonal in-plane strut thickness for Design A, respectively. Because for Design A $A_{nd}/A_d \approx 1.4$, it follows that $$T_{A,nd} = 2T_{A,d}. \tag{S14}$$

Finally, also for the case of rectangular cross-section Design A is the base model, and thus the total volume is constrained of all the other unit cell designs with rectangular cross-section to be equal to that of Design A, namely, $$V_{A,T} = V_{\alpha,d} + V_{\alpha,nd} = 8LH(T_{A,nd} + \sqrt{2}\,T_{A,D}) = 8LHT_{A,nd}\left(1 + \frac{1}{\sqrt{2}}\right); \tag{S15}$$

with α ∈ B, C and D. Moreover, for Designs B-C, which include diagonal elements, the volume ratio of the non-diagonal to diagonal elements is constrained to be the same as in Design A, $$\frac{V_{\alpha,nd}}{V_{\alpha,d}} = \sqrt{2}; \tag{S16}$$

with α ∈ B and C.

Figure 7A:
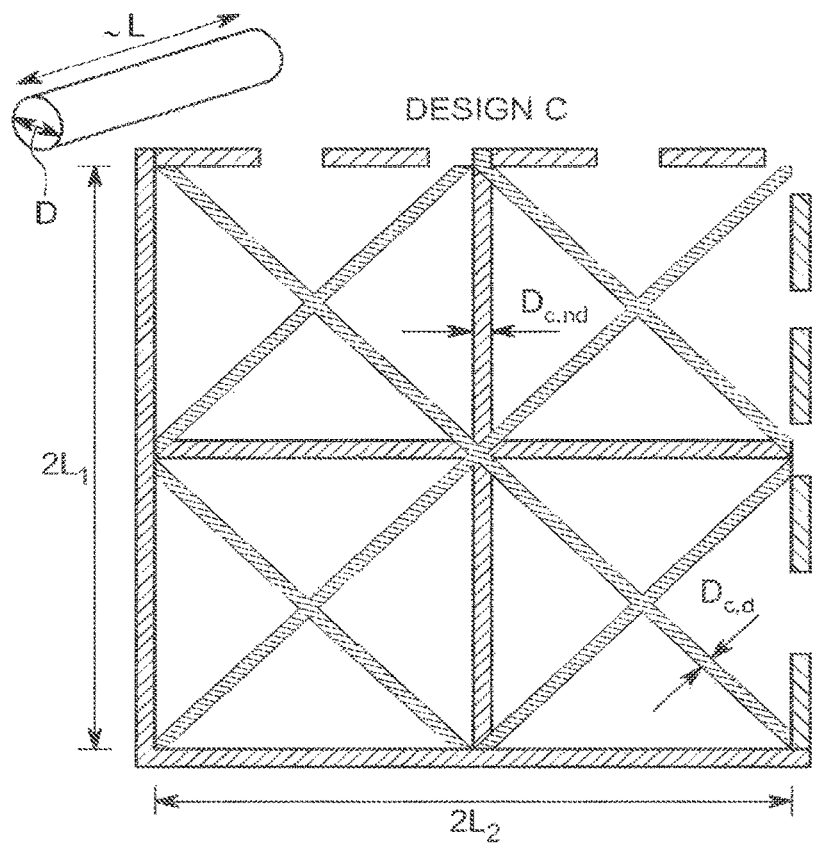
FIG. 7A shows dimensions for Design C in a circular cross-section configuration.
Figure 7B:
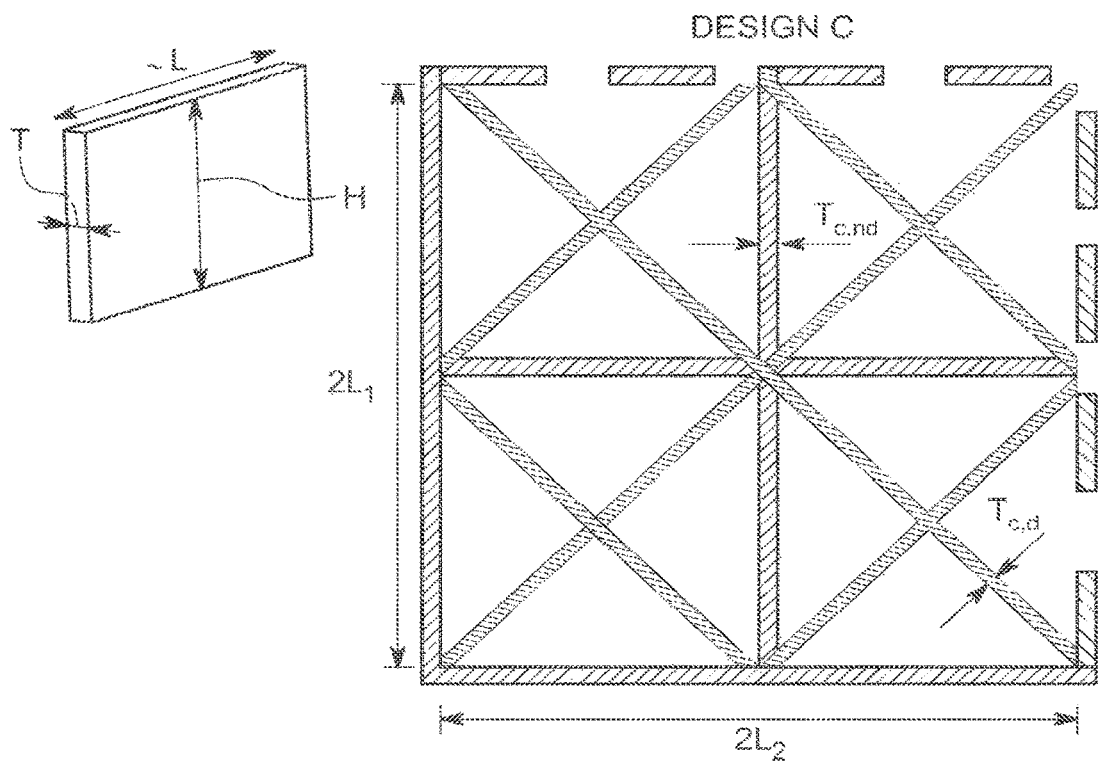
FIG. 7B shows dimensions for Design C in a rectangular cross-section configuration.
Figure 10A:
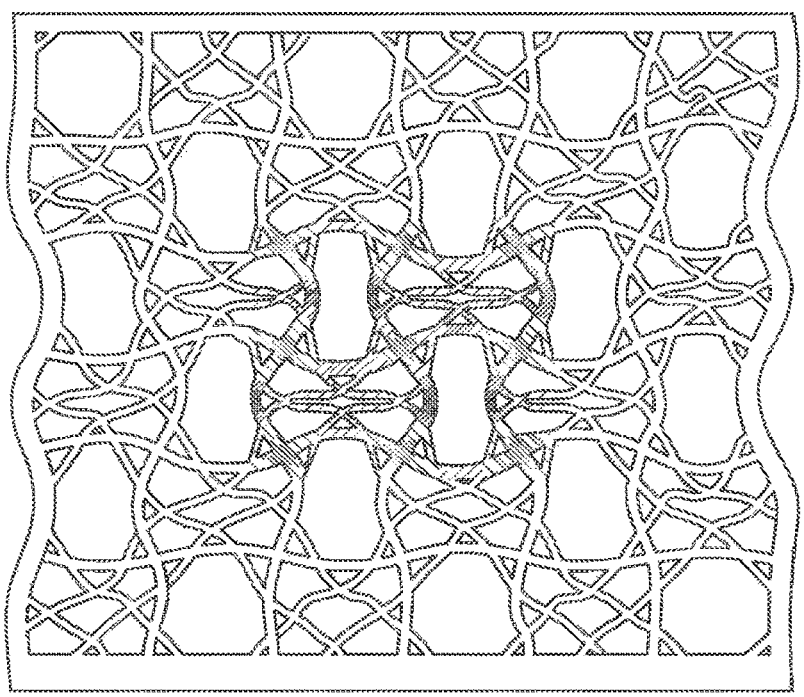
FIG. 10A shows Design A simulation deformation overlaid with respective experimental results.
Figure 10B:
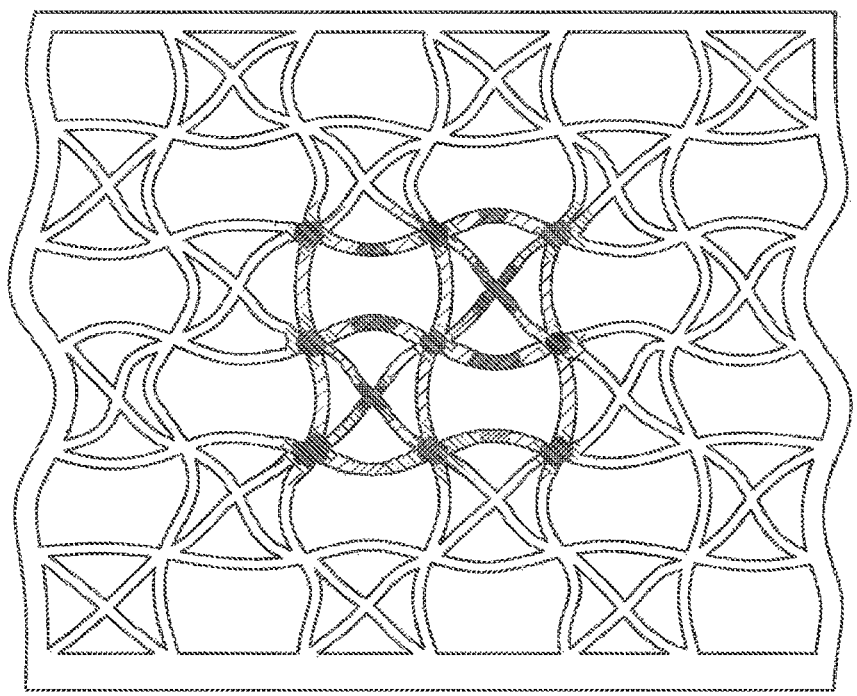
FIG. 10B shows Design B simulation deformation overlaid with respective experimental results.
Figure 10C:
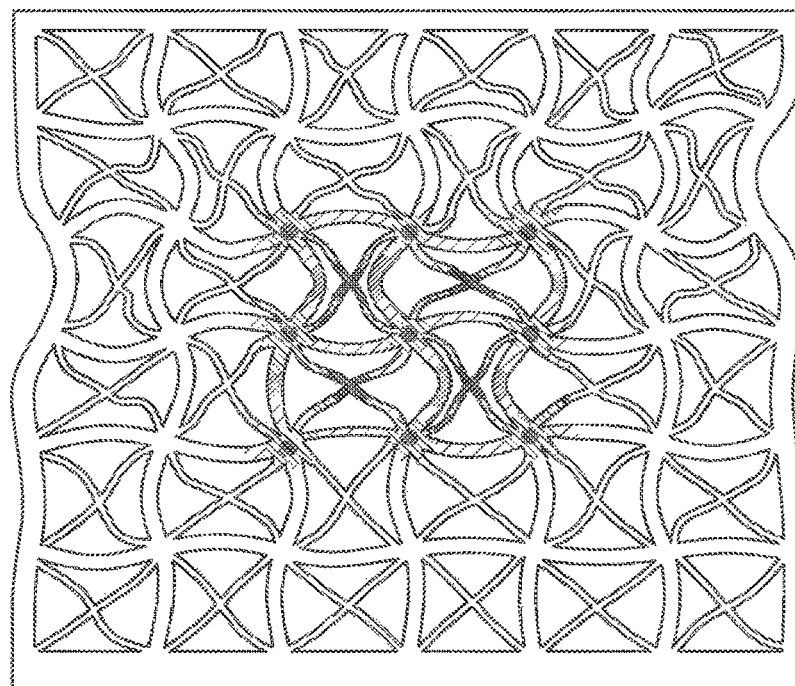
FIG. 10C shows Design C simulation deformation overlaid with respective experimental results.
Figure 10D:
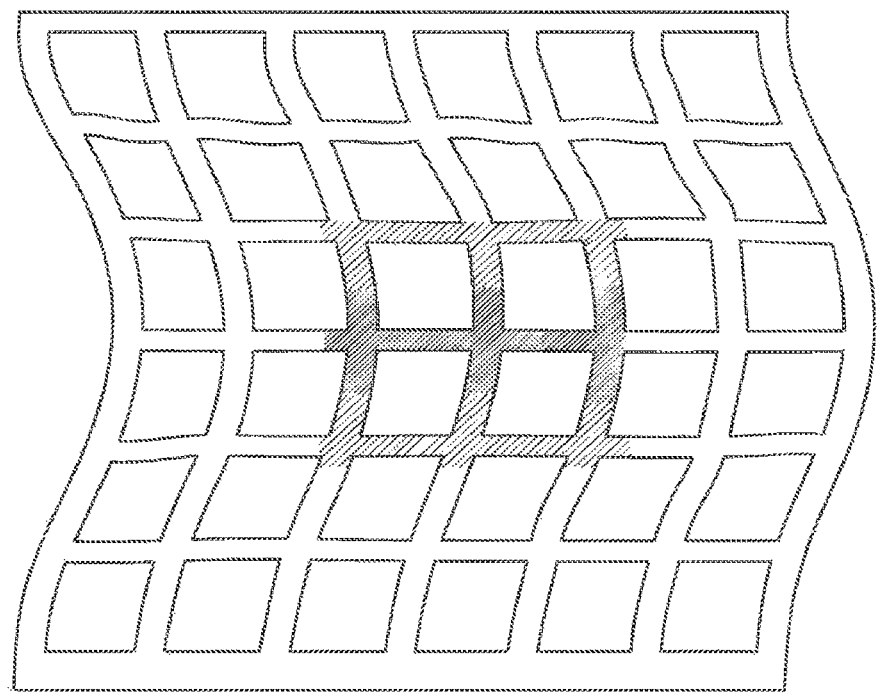
FIG. 10D shows Design D simulation deformation overlaid with respective experimental results.

Referring generally to FIGS. 7A and 7B, a unit cell is illustrated for Design C. This design consists of a square grid with all cells being reinforced by diagonal trusses passing through the nodes. FIG. 7A shows dimensions of this design considering a circular cross-section, and FIG. 7B shows dimensions of this design considering a rectangular cross-section. In both cases, the horizontal and vertical non-diagonal struts have a total length 2L, with L1=L2. For FIG. 7A, considering a circular cross-section, the non-diagonal diameter is denoted as $D_{C,nd}$ and, as with Design A, it is assumed that $D_{C,nd}/L=0.1$, and the diagonal elements have a diameter $D_{C,d}=D_{C,nd}/2$. For FIG. 7B, considering a rectangular cross-section, the non-diagonal thickness is denoted as $T_{C,nd}$ and it is assumed that $T_{C,nd}/L=0.1$, and the diagonal elements have a thickness $T_{C,nd}=2T_{C,d}$. For all rectangular cross-section elements, the depth H is assumed to be equal and large enough to constrain any out-of-plane deformation.

CIRCULAR CROSS-SECTION—For this design with circular cross-section, the volume of the non-diagonal and diagonal members of the unit cell are given by:

$$V_{C,nd} = V_{A,nd} = 2L\pi D_{A,nd}^2 \tag{S25}$$

and $$V_{C,d} = V_{A,d} = 2\sqrt{2}L\pi D_{A,d}^2, \tag{S26}$$

respectively. Using the constraints provided by eq. (S10) and eq. (S11), the following formulas are obtained:

$$D_{C,nd} = D_{A,nd}, \tag{S27}$$

and $$\frac{D_{C,d}}{D_{C,nd}} = \frac{1}{2}. \tag{S28}$$

RECTANGULAR CROSS-SECTION—For this design with circular cross-section, the volume of the non-diagonal and diagonal members of the unit cell are given by $$V_{C,nd} = 8LT_{C,nd}H \tag{S29}$$

and $$V_{C,d} = 8\sqrt{2}LT_{C,d}H. \tag{S30}$$

Using the constraints provided by eq. (S15) and eq. (S16), as well as the above volumes, the following formulas are obtained:

$$T_{C,nd} = 2T_{C,d}, \tag{S31}$$

and $$T_{C,nd} = T_{A,nd}. \tag{S32}$$

Referring to FIG. 8, a table shows caliper measurements averaged over the three separate 3D specimens tested for each design. The units provided are in [mm] and [kg], for lengths and weights, respectively. Because these are square samples, there are 2 overall sample lengths provided, one that is along the testing direction and one that is perpendicular to the testing direction. Measurements are made at both along the top face as well as the bottom face of the structure. As expected, the top face dimensions are generally smaller than the bottom face due to 3D printing layer depositions. All measurements are conducted prior to testing the samples.

Referring to FIG. 9, a table provides the expected baseline measurements. These are the defined parameters for the 3D printed geometries. The units provided are in [mm] for all lengths.

Testing

Each of the specimens is 3D printed using a Conex500 multi-material 3D printer. Each of the specimens is printed in parallel along with the print-head direction as to minimize material anisotropy between specimens. During the fabrication process, a photosensitive liquid precursor (the 3D printer ink) is deposited in a voxel-by-voxel fashion. The 3D printed specimens are placed individually on an Instron 5969 with standard compression plates on a 50 kN load cell. While similar results are obtained regardless of whether the models are loaded parallel or perpendicular to the print direction, for experimental consistency all tests are performed with models oriented parallel to the print direction.

Referring to FIGS. 10A-10D, a deformation is overlaid with experimental results. Specifically, FIGS. 10A-10D show the deformed finite element results overlaid on top of pictures taken of the deformed experimental specimen. The close agreement between the experiments and simulations suggests that the finite element simulations are accurately capturing the physical deformation of the specimens.

Figure 11A:
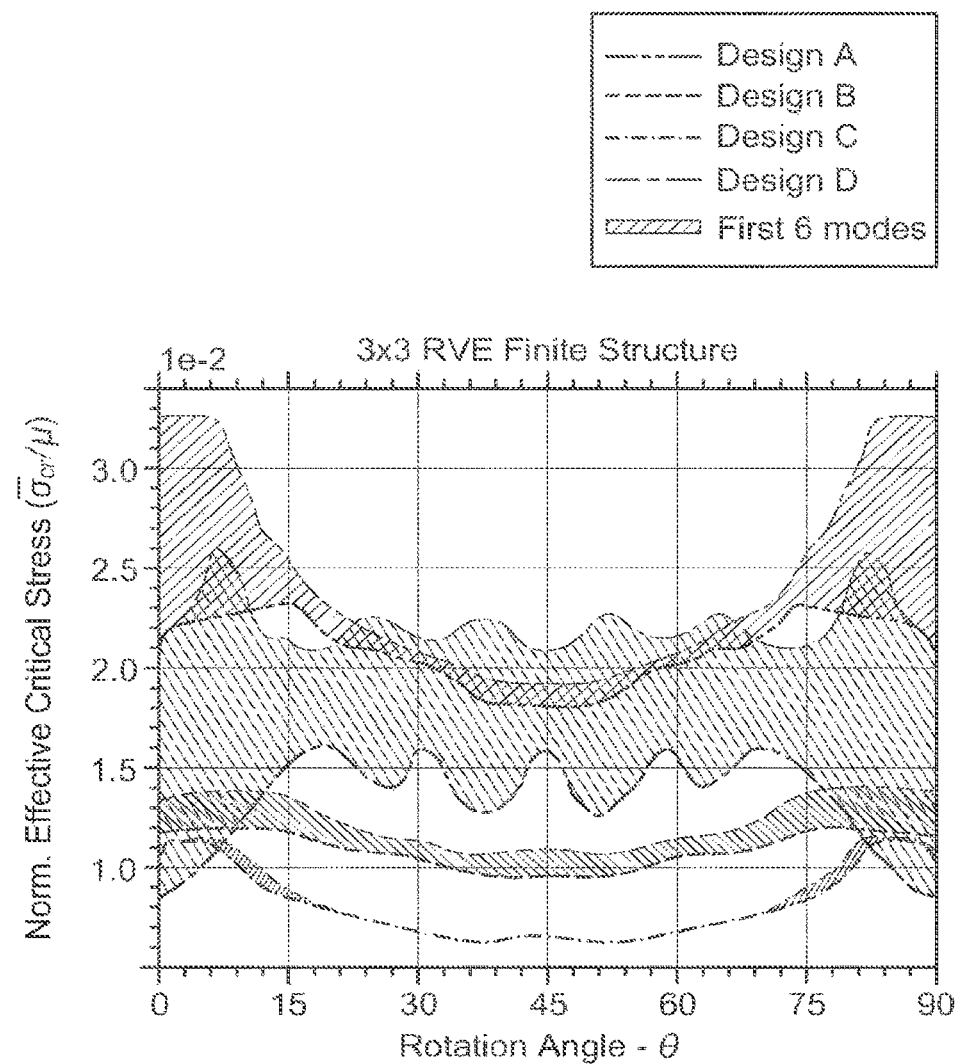
FIG. 11A shows a chart with normalized critical effective buckling stress for a 3×3 representative-volume element ("RVE") finite size structure including a region of first 6 critical modes.
Figure 11B:
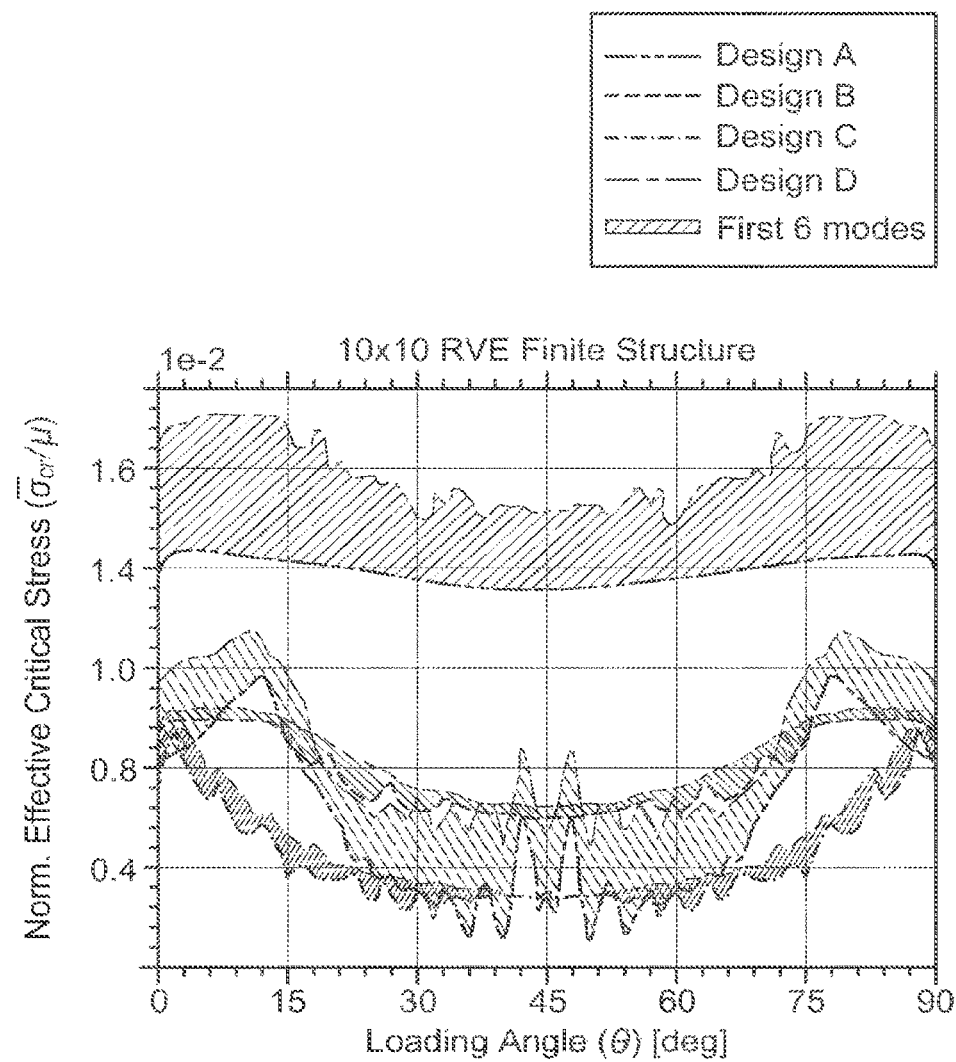
FIG. 11B shows a chart with normalized critical effective buckling stress for a 10×10 RVE finite size structure including a region of first 6 critical modes.

Referring to FIGS. 11A and 11B, charts show results of a finite size geometry square cutting. FIG. 11A shows the normalized critical effective buckling stress for a 3×3 RVE finite size structures for all loading angles. FIG. 11B shows the normalized critical effective buckling stress for a 10×10 RVE finite size structures for all loading angles. The shaded part in FIGS. 11A and 11B represents the lowest 6 buckling modes range. Both of these plots provide a clear indication on the superior performance of Design A when comparing to Designs C-D.

Optimization Analysis

In an effort to identify lattice configurations resulting in large critical loads, a Python implementation was used of the Covariance Matrix Adaptation Evolution Strategy (CMA-ES). CMA-ES is an evolutionary algorithm that is used to solve optimization/inverse problems by iteratively solving several forward problems to adjust a covariance matrix of the solution. Since it is a derivative free algorithm, CMA-ES is well suited for optimization problems of high dimensionality and non-linear parameter topology, such as the examples disclosed in the present disclosure.

Figure 12A:
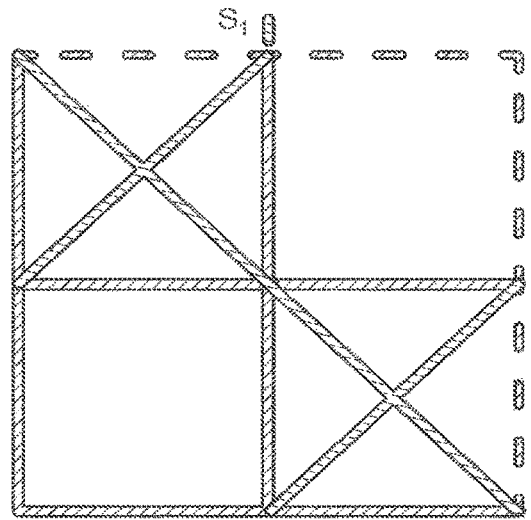
FIG. 12A shows a structure with 1 diagonal and no separation parameter.
Figure 12B:
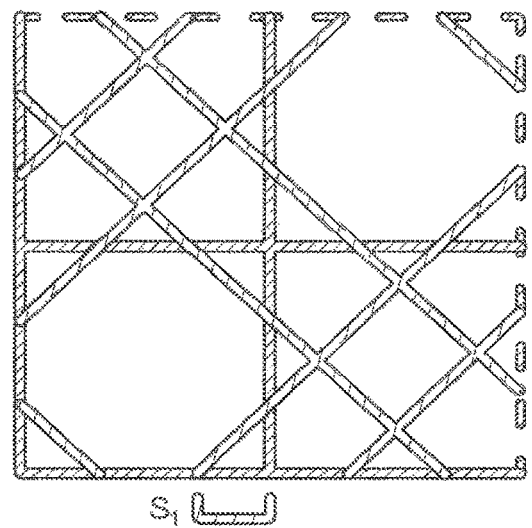
FIG. 12B shows the structure of FIG. 12A with 2 diagonals with one separation parameter given by $S_1$.
Figure 12C:
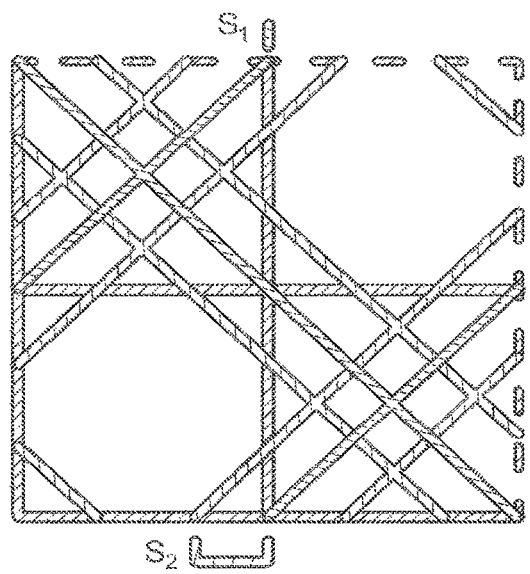
FIG. 12C shows the structure of FIG. 12A with 3 diagonals with one separation parameter $S_2$.
Figure 12D:
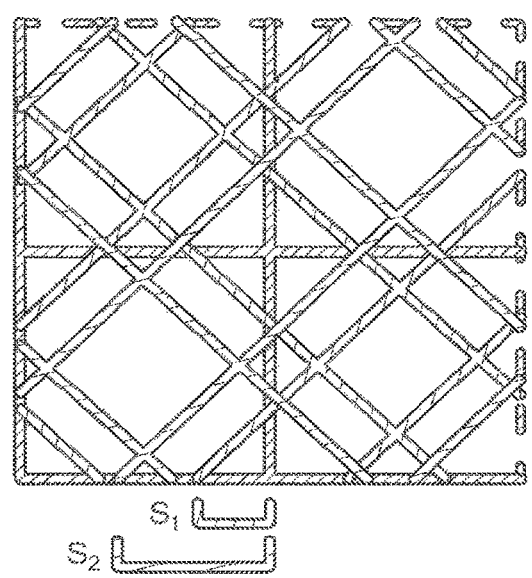
FIG. 12D shows the structure of FIG. 12A with 4 diagonals and 2 diagonal separation parameters $S_1$, $S_2$.
Figure 12E:
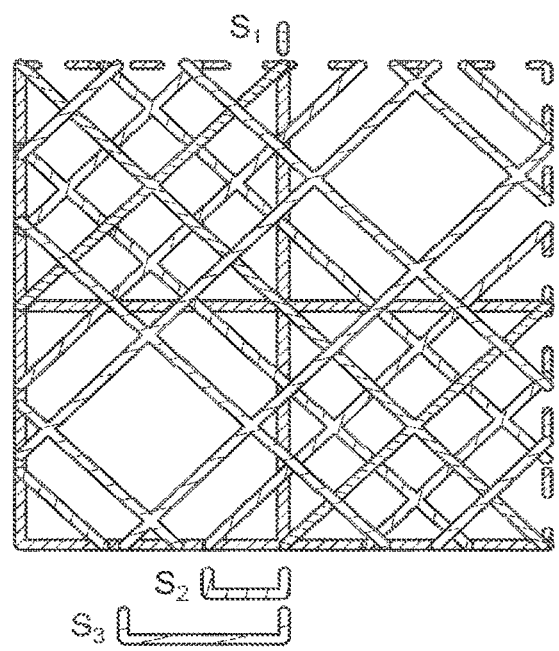
FIG. 12E shows the structure of FIG. 12A with 5 diagonals and 2 separation parameters $S_2$, $S_3$.

Referring generally to FIGS. 12A-12E, a schematic depicts separation parameters for optimization analysis. This schematic shows the separation parameters for optimization geometry at different levels of complexity, up to five diagonals with distances are denoted by $S_1$. FIG. 12A shows the structure with 1 diagonal and no separation parameter. FIG. 12B shows the structure with 2 diagonals with one separation parameter given by $S_1$. FIG. 12C shows the structure with 3 diagonals with one separation parameter $S_2$. FIG. 12D shows the structure with 4 diagonals and 2 diagonal separation parameters $S_1, S_2$. FIG. 12E shows the structure with 5 diagonals and 2 separation parameters $S_2$, $S_3$. For each set of even diagonals, the distance $S_1$ is the same from the center for both sides.

In this study CMA-ES is used to identify
the number of diagonals, N;
the volume ratio of non-diagonal to diagonal members, $\lambda=V_{nd}/V_d$; and
the separation between each even set of diagonals, $S_1$ (see FIG. S14).

The result is a lattice structure with the largest critical load. For such optimization problem, the number of optimization variables increases with the number of diagonals incorporated in the model (i.e. the total number of parameters are 1+½(N−(N mod 2)) for a given optimization instance with N number of diagonals). Note, for simulations with odd number of diagonal reinforcements, only an even number of diagonals are separated while keeping one diagonal going through the non-diagonal junction in order to ensure geometry symmetry (as illustrated in FIGS. 12A-12E).

The algorithm's initial values are chosen to be in the center of the design space, namely, $\lambda=1$ and diagonal separation for the even set of diagonals $S_i=0.5*L$. The covariance matrix is initialized uniformly with standard deviation ($\sigma$) half of the domain space, which are normalized to remain between 0 and 1. The optimization is run for uniaxial loading condition in the direction parallel to the vertical elements.

For the optimization results described above, the critical buckling load of a finite size structure is maximized using a single objective target function. However, an equivalent analysis is performed to maximize the critical buckling stress (illustrated in FIGS. 15A-15B) of an infinite periodic structure as the target response. The resultant parameter values from the optimization for the finite size structure presented in FIGS. 4A-4B can be found in FIG. 13. The resultant parameter values from the optimization for infinite periodic optimization are identified in the table of FIG. 14 for the stress optimization.

Referring to FIG. 13, a table shows optimization of a finite structure buckling load. Specifically, the table shows output parameters from the analysis necessary to construct each optimum structure.

Referring to FIG. 14, a table shows optimization result parameters of a buckling load for an infinite periodic structure. Specifically, the table shows output parameters from the analysis necessary to construct each optimum structure.

Figure 15A:
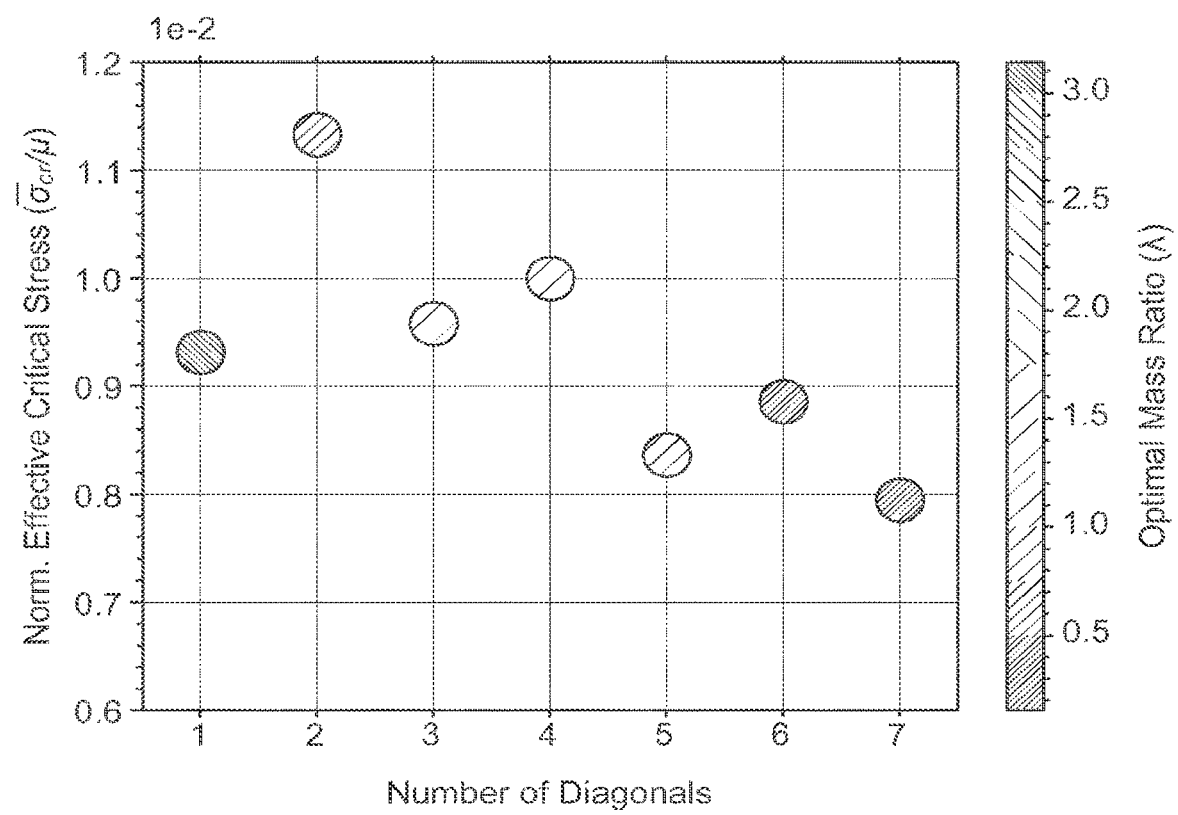
FIG. 15A shows an optimal value of critical buckling load for a varying number of diagonals for an infinite structure.
Figure 15B:
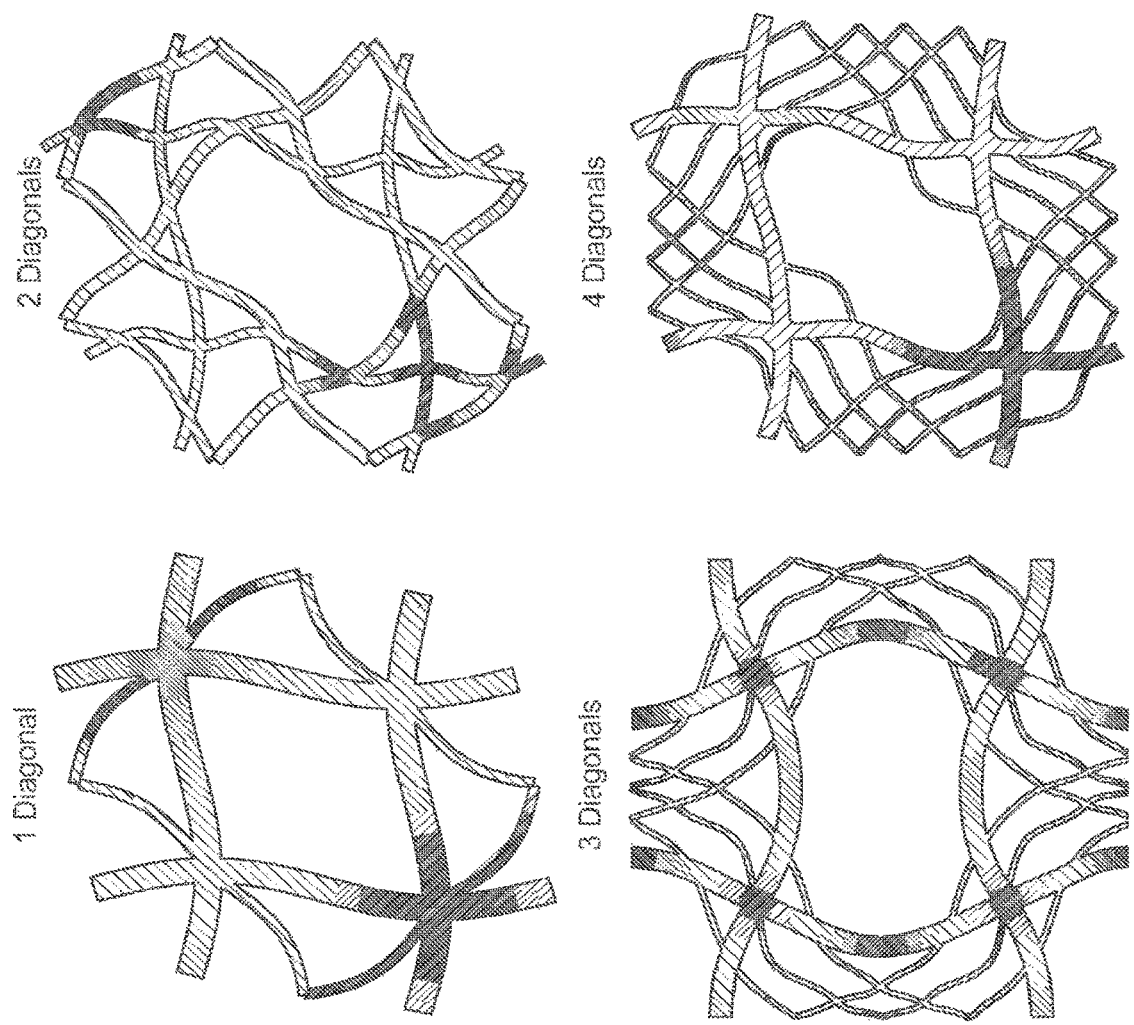
FIG. 15B shows resulting deformed geometries for optimal infinite designs, illustrated in FIG. 15A, including geometries from one to four diagonals.

Referring to FIGS. 15A and 15B, critical buckling load optimization results are illustrated for an infinite periodic structure. FIG. 15A shows the optimal value of critical buckling load for a varying number of diagonals. For all simulations, the total mass of the structure is maintained constant while the mass-ratio is allowed to vary. Furthermore, the diagonal separation for each pair of even diagonals is allowed to vary together ensuring half symmetry of the structure at all times. The optimization is run under a uniaxial loading condition. The shade of each point represents the optimal mass ratio $\lambda$ parameter for that configuration. FIG. 15B shows the resulting deformed geometries for designs including one to four diagonals. The shaded areas in each structure represent the scale-less deformed displacement as a result of buckling.

MASS RATIO DERIVATION FOR ARBITRARY NUMBER OF DIAGONALS—To parameterize the numerical model, a determination is made how to allocate mass between diagonals and non-diagonals when the number of diagonals is increasing. To obtain this derivation, a number of initial assumptions are made, namely:

in-plane geometry is uniform, the in-sectional dimension H is a constant;
all diagonals elements have the same dimension;
all non-diagonal elements have the same dimension; and
area of overlapping beam crossing is negligible and unaccounted.

To begin this analysis, the individual total volume of the non-diagonal and diagonal members is computed as $$\frac{V_{nd}}{LH} = 8T_{nd}; \text{ and} \tag{S39}$$

$$\frac{V_d}{LH} = 4\sqrt{2}NT_d. \tag{S40}$$

In the above equations, H is the in-plane thickness dimension, and N is the number of diagonals considered. Using this information, the total volume of the entire unit cell structure $V_T$ is computed, namely:

$$\frac{V_T}{LH} = \frac{V_{nd}}{LH} + \frac{V_d}{LH} = 8T_{nd} + \sqrt{2}NT_d. \tag{S41}$$

Thus, the mass ratio is rewritten as:

$$\lambda = \frac{V_{nd}}{V_d} = \frac{\sqrt{2}T_{nd}}{NT_d}. \tag{S42}$$

Using eq. (S41), the following expression is obtained:

$$T_d = \frac{1}{N4\sqrt{2}}\left(\frac{V_t}{LH} - 4T_{nd}\right). \tag{S43}$$

Using eq. (S42), the following expression is obtained:

$$T_{nd} = \frac{\lambda N T_d}{\sqrt{2}}. \quad (S44)$$

Inserting eq. (S43) into eq. (S44) the following equation is obtained:

$$T_{nd} = \frac{1}{81+\lambda L H} \frac{\lambda\, V_T}{}. \quad (S45)$$

Using this and the equation for k, the expression for $D_d$ is obtained, namely:

$$T_d = \frac{\sqrt{2}}{8} \frac{1}{N(1+\lambda)} \frac{V_t}{LH}. \quad (S46)$$

Using Design A as a reference, the total volume $V_T$ is determined. Specifically, the following is used:

$$T_{nd}=0.1L \ \& \ T_d=T_{nd}/2=0.05L \quad (S47)$$

to solve for $$\frac{V_T}{LH} = 0.8L + 0.4\sqrt{2}\,L. \quad (S48)$$

Thus inserting this into eq. (S46) and eq. (S45), the following is obtained:

$$T_{nd} = \frac{1}{21+\lambda}\frac{\lambda}{}(0.2L + 0.1\sqrt{2}\,L); \text{ and} \quad (S49)$$

$$T_d = \frac{1}{\sqrt{2}}\frac{1}{N(1+\lambda)}(0.2L + 0.1\sqrt{2}\,L). \quad (S50)$$

Parameter Exploration

To survey the design space of the double diagonal construction, parametric simulations are explored for 2 variables: diagonal separation and mass ratio. For each of these separate analyses, the Design A geometry is maintained as the base geometry and only the respective variable is varied.

Figure 16A:
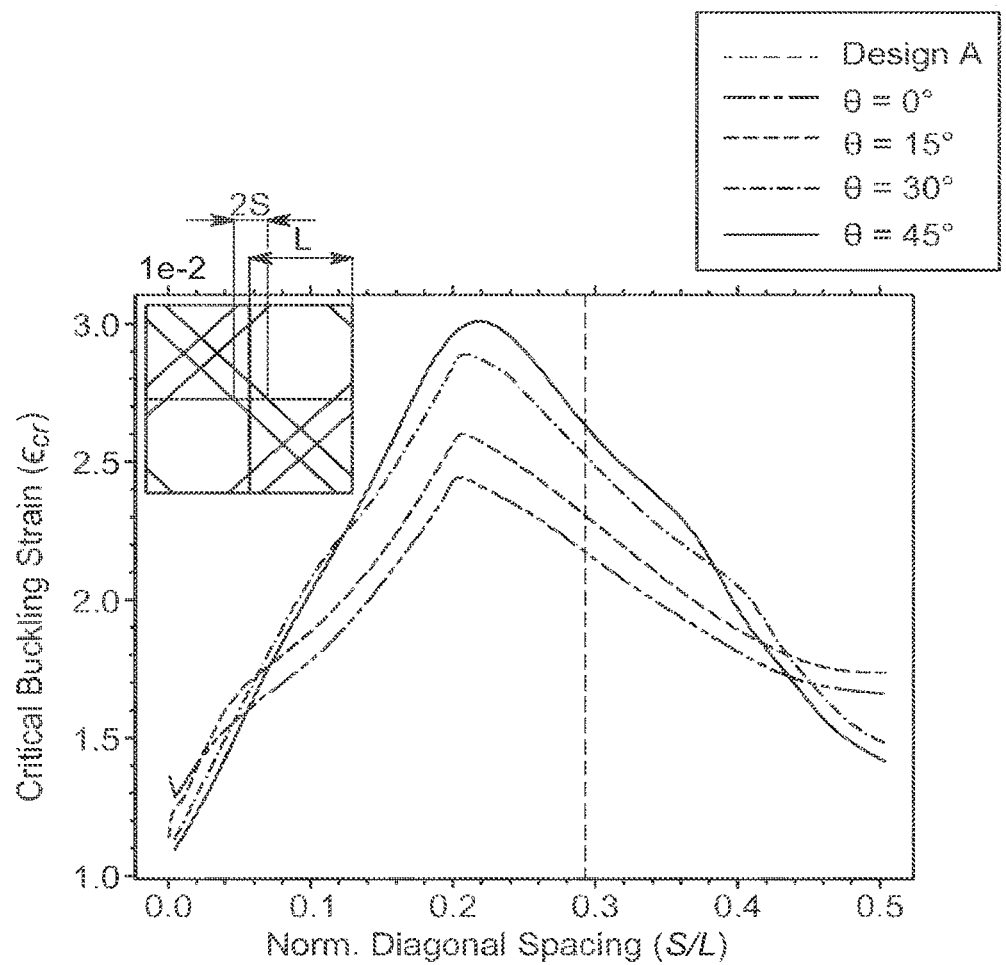
FIG. 16A is a chart that shows a critical buckling strain for varying spacing between diagonals and select loading angles.
Figure 16B:
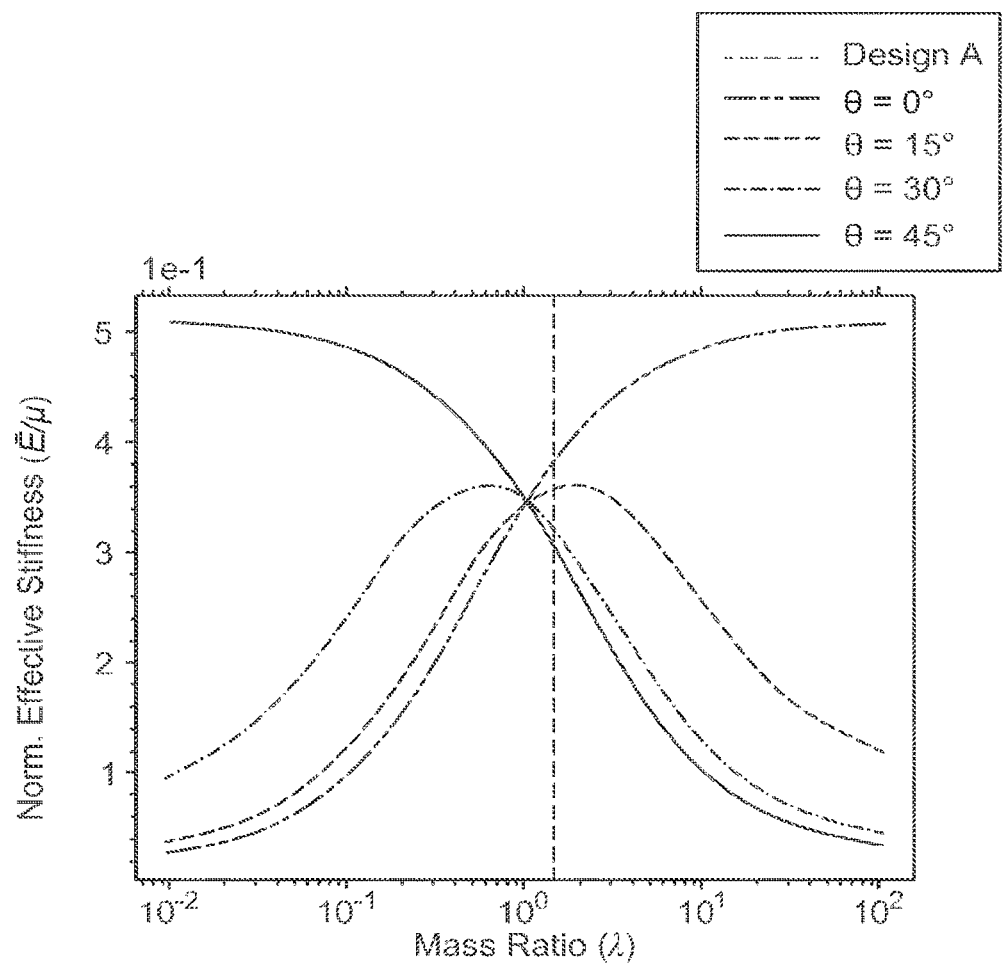
FIG. 16B is a chart that shows the normalized structural linear elastic effective stiffness of the geometry as the mass ratio $\lambda$ is varied for select loading angles.
Figure 16C:
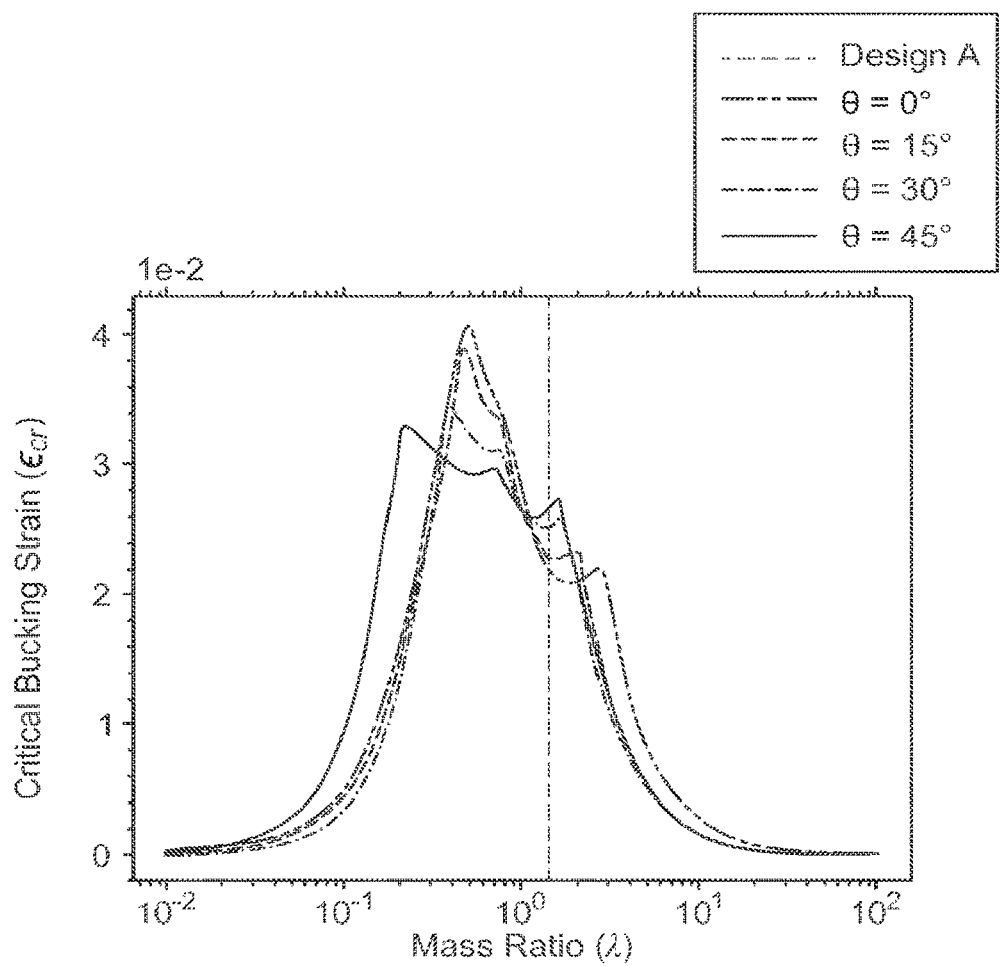
FIG. 16C is a chart that shows the critical buckling strain of the geometry as a mass ratio $\lambda$ is varied for select loading angles.

Referring generally to FIGS. 16A-16C, charts show plots for rectangular cross-section parameter exploration. For each of these plots, a single parameter is varied while maintaining the base Design A geometry constant. The dashed vertical line indicates Design A's value for that parameter. FIG. 16A shows the critical buckling strain for varying spacing between diagonals. FIG. 16B shows the structural stiffness of the geometry as the mass ratio λ is varied. FIG. 16C shows the critical buckling strain of the geometry as the mass ratio λ is varied.

RECTANGULAR CROSS-SECTION—This section shows the results when using a rectangular cross-section for the truss members. From FIG. 16A, it is apparent that there exists an optimum for the diagonal separation that occurs when the spacing between diagonals are approximately 0.2 of the horizontal distance between vertical struts. This optimum value also persists when varying the loading angle. From FIG. 16B, it can be seen that the linear stiffness is symmetrically and almost purely dependent on the mass ratio allocated to diagonal versus non-diagonal elements. Comparing this figure to FIG. 18B, it is determined that even the design cross-section does not change the linear stiffness behavior. FIG. 16C shows that there exists two optimum mass ratios, one where more material is allocated to the diagonal and one where there is more material allocated to non-diagonals.

Figure 17A:
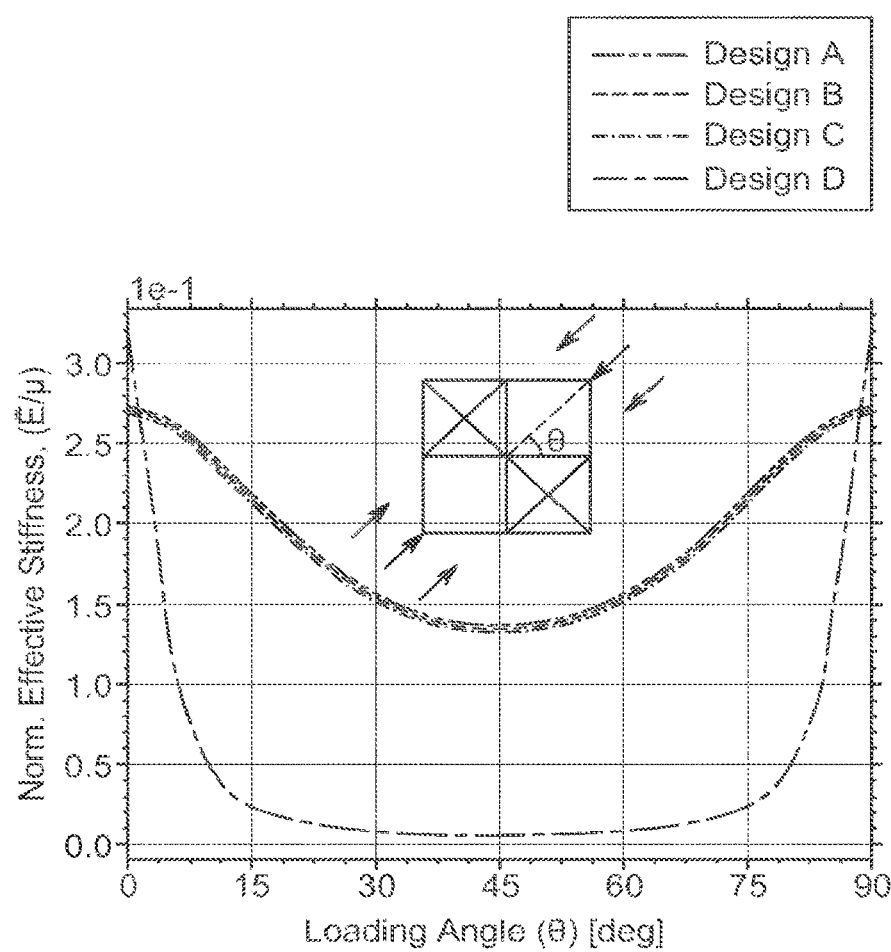
FIG. 17A is a chart that shows normalized linear elastic effective stiffness for different designs as a result of a varying loading angle for a structure with circular cross-section.
Figure 17B:
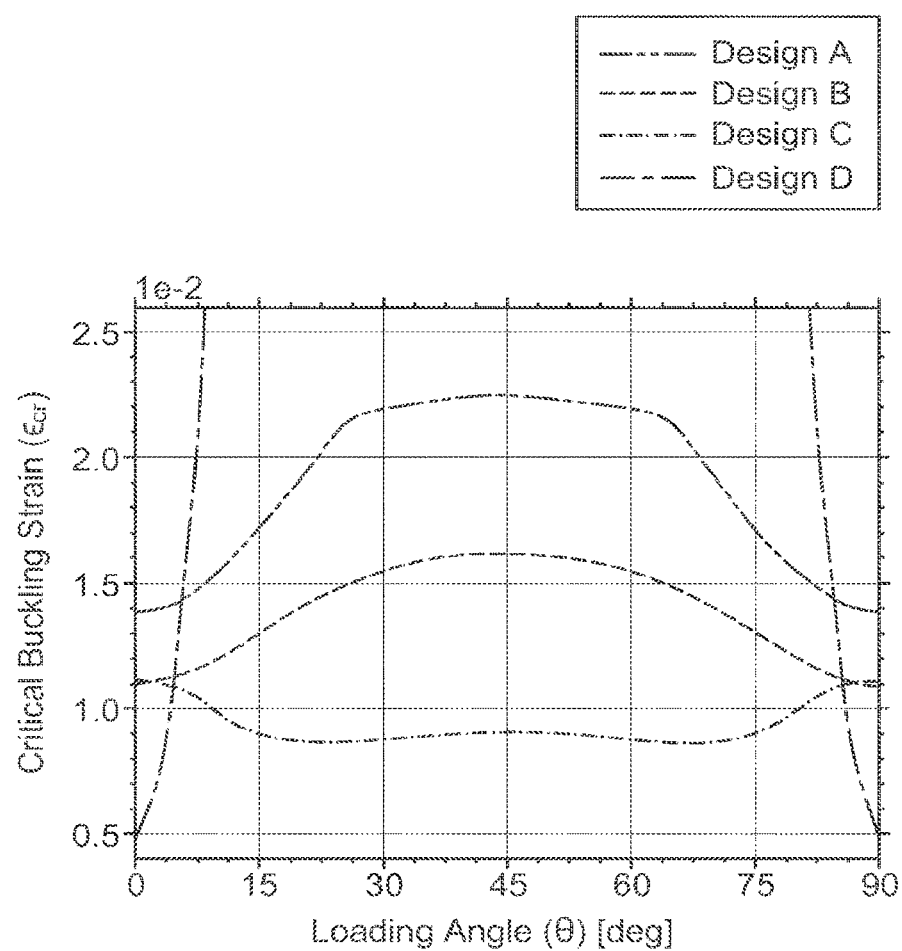
FIG. 17B is a chart that shows a critical buckling strain for the varying loading angle of FIG. 17A for a structure with circular cross-section.
Figure 17C:
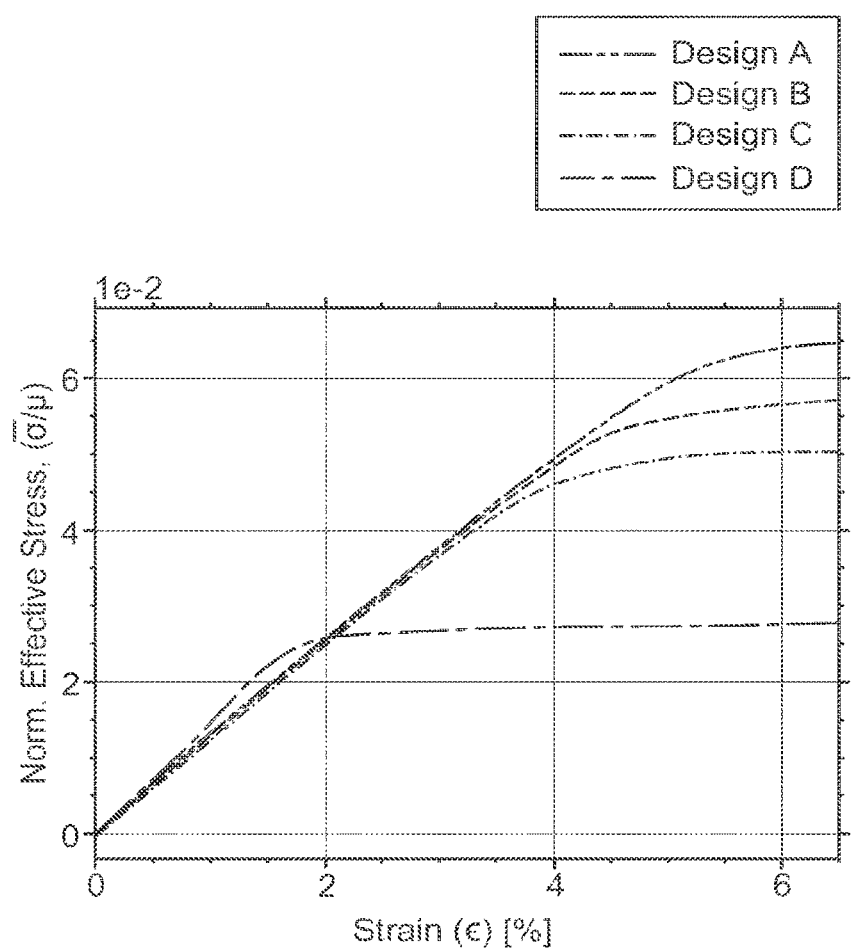
FIG. 17C is a chart that shows results of a nonlinear simulation with circular cross-section for a finite size structure matching that of an experimental setup as in FIG. 2E.

Referring generally to FIGS. 17A-17C, circular cross-section results are illustrated. FIG. 17A shows the linear elastic stiffness for the different designs as a result of varying loading angle. All structures except for the design without diagonal reinforcement (Design D) have the same stiffness. FIG. 17B shows the critical buckling strain for varying loading angle. For all angles, Design A outperforms other diagonally reinforced designs (Design B-C). FIG. 17C shows the results to a nonlinear simulation with circular cross-section for a finite size structure matching that of the experimental setup. The nonlinear simulation is composed of three steps: (i) obtaining the critical buckling deformation via a perturbation analysis; (ii) applying an imperfection in the shape of the critical buckling deformation onto the geometry; (iii) performing a large deformation nonlinear simulation on the perturbed geometry. For all results presented, the geometries are constrained to in-plane deformation only. These results show that the two-diagonal benefit persists beyond a square beam cross-section as long as deformations are constrained to remain in-plane.

Figure 18A:
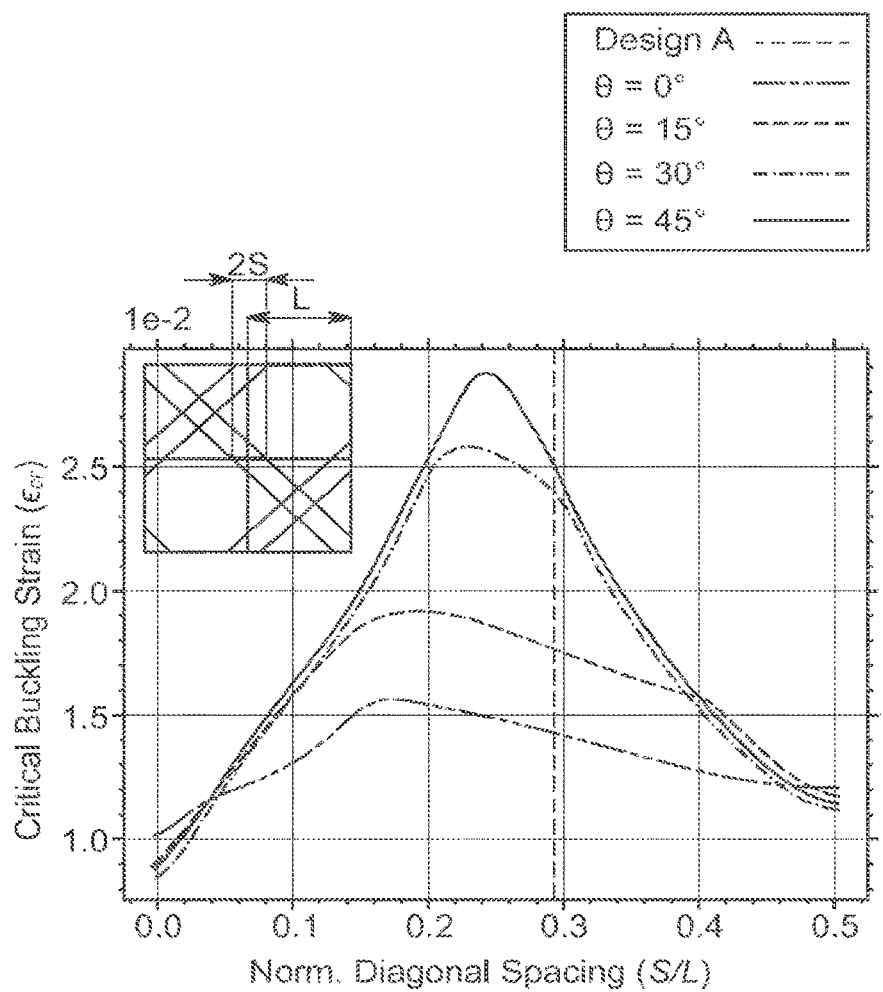
FIG. 18A is a chart that shows a critical buckling strain for varying spacing between diagonals for a circular cross-section geometry for select loading angles.
Figure 18B:
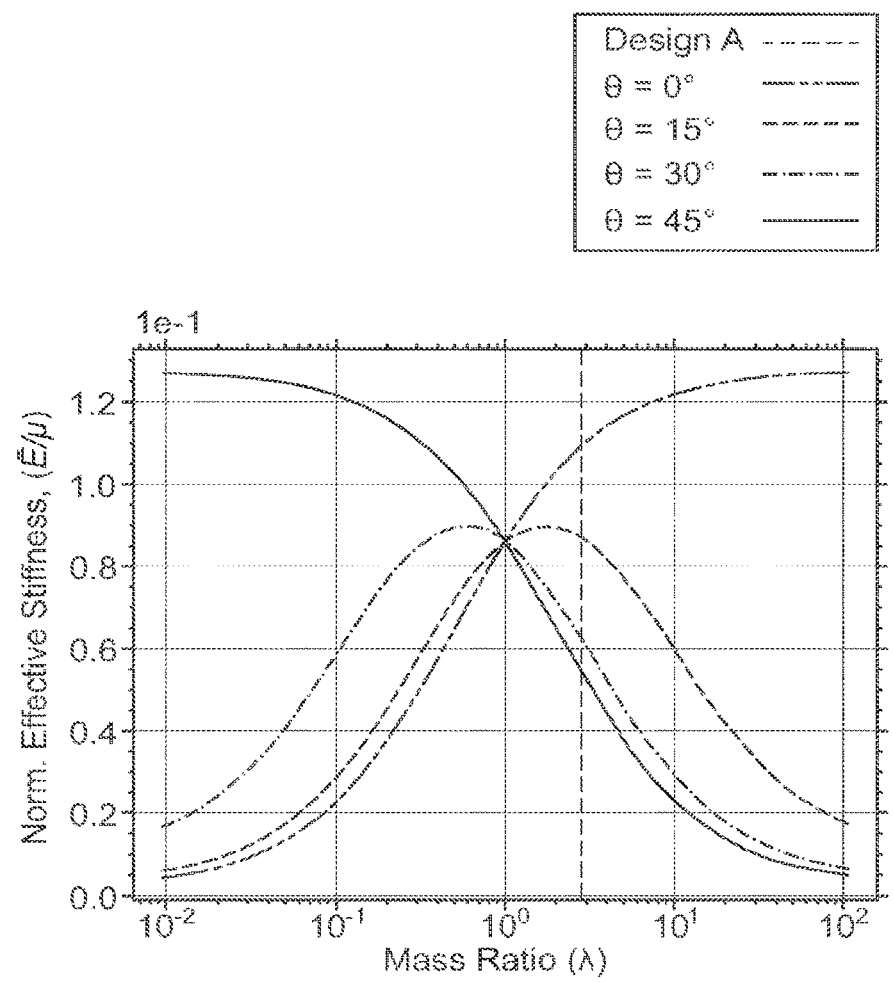
FIG. 18B is a chart that shows the normalized effective structural stiffness of the circular cross-section geometry of FIG. 18A, as the mass ratio $\lambda$ is varied for select loading angles.
Figure 18C:
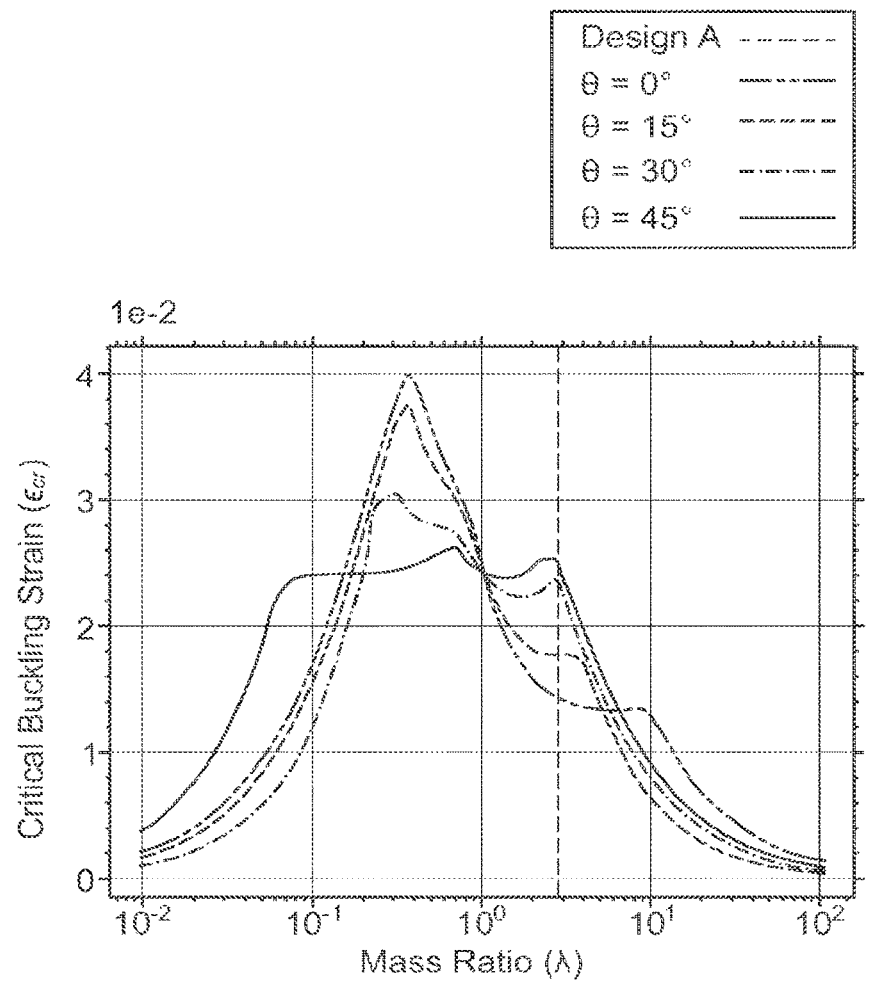
FIG. 18C is a chart that shows a critical buckling strain of the circular cross-section geometry of FIG. 18A, as the mass ratio $\lambda$ is varied for select loading angles.

Referring generally to FIGS. 18A-18C, circular cross-section results are illustrated. For each of the represented plots, a single parameter is varied while maintaining the base Design A geometry constant. The dashed vertical line indicates a Design A's value for that parameter. FIG. 18A shows the critical buckling strain for varying spacing between diagonals. FIG. 18B shows the structural stiffness of the geometry as the mass ratio λ is varied. FIG. 18C shows the critical buckling strain of the geometry as the mass ratio λ is varied.

CIRCULAR CROSS-SECTION—The results presented here complement those disclosed above and show that the structural benefit for the Design A persists when using a different cross-section for the structure. For varying loading angles, it is determined that all of the diagonally reinforced designs provide the same stiffness, but Design A consistently provides the best resistance to buckling. For this cross-section the findings are consistent with Design A, and as illustrated in FIGS. 18A-18C, the overall behavior has second order differences illustrated in FIG. 18A, no change illustrated in FIG. 18C, and a large difference in relative magnitude illustrated in FIG. 18C. Furthermore, it is determined that by using a rectangular cross-section the mass ratio is tuned to achieve an overall structure with higher critical buckling strength.

Slender Structure Exploration

Figure 19A:
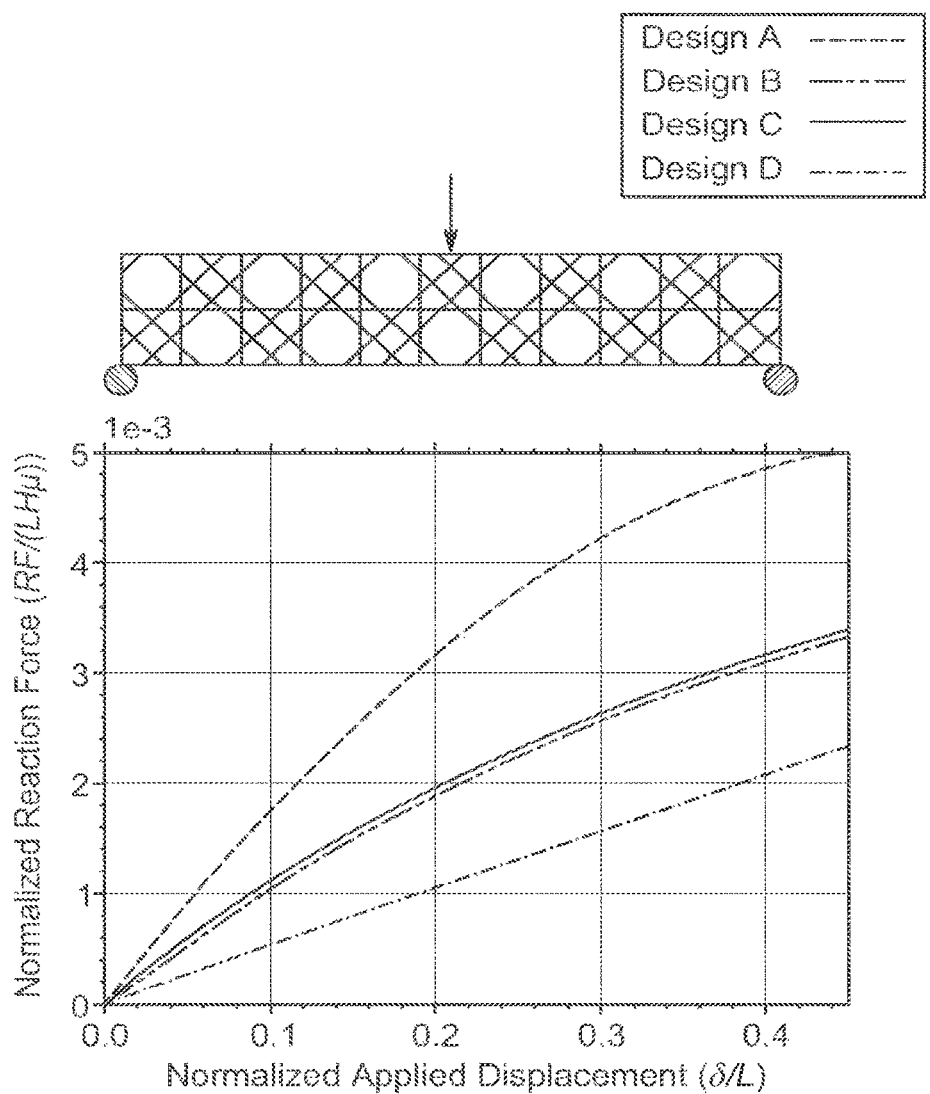
FIG. 19A shows a chart with simulation results for a 3-point bend test.
Figure 19B:
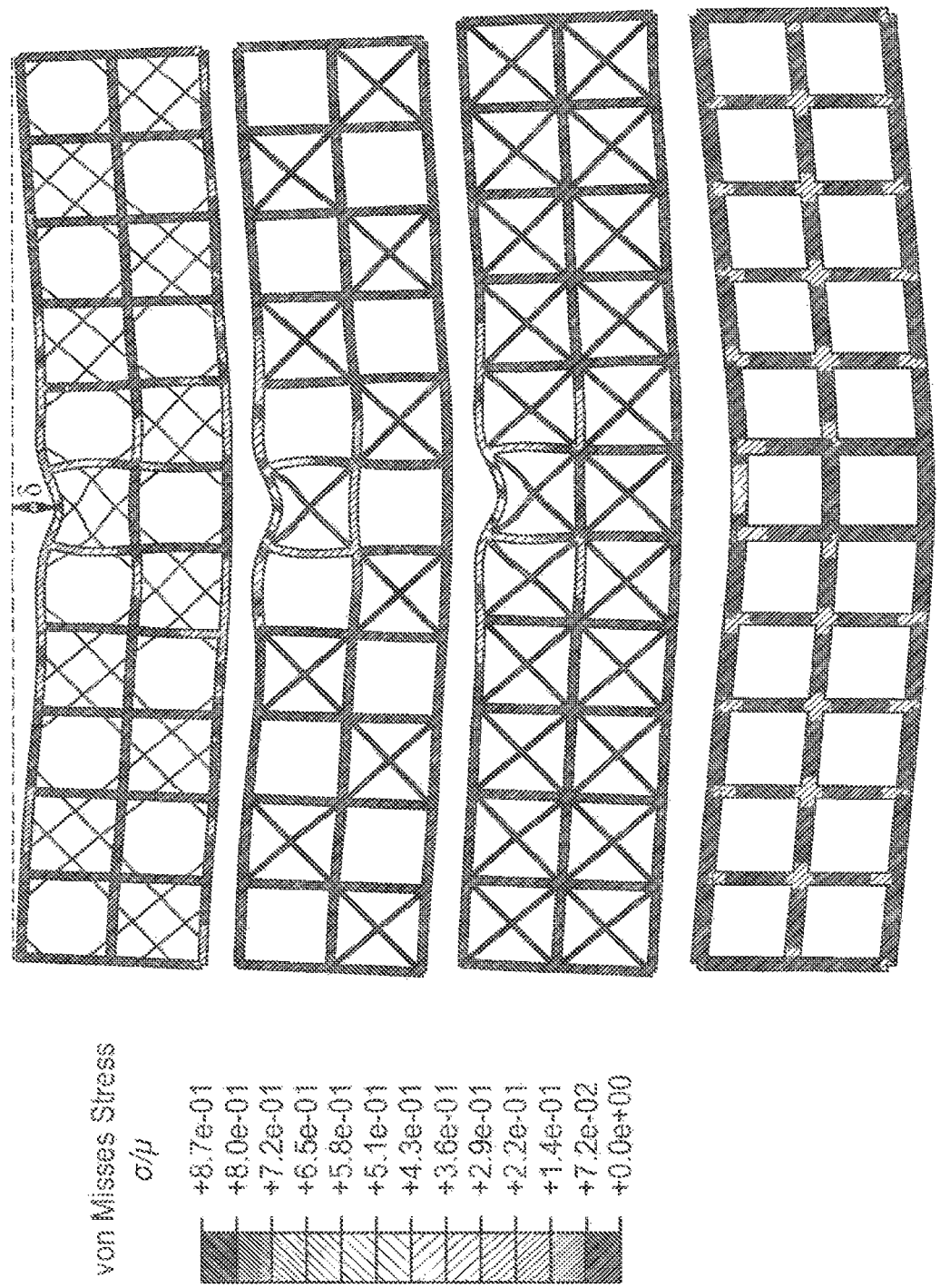
FIG. 19B shows a schematic illustrating deformation of each geometry at the displacement provided at the end of the plot illustrated in FIG. 19A.
Figure 19C:
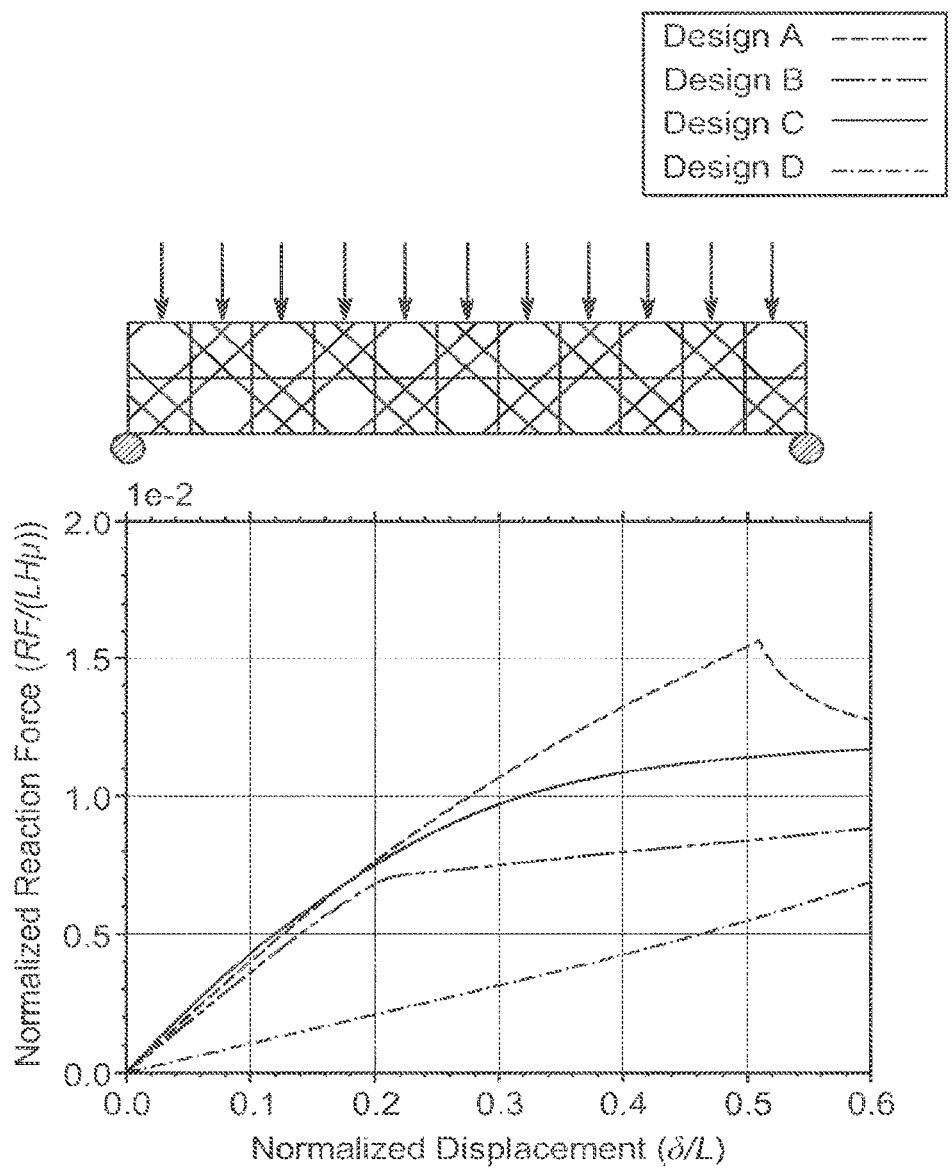
FIG. 19C shows simulation results of a distributed load test.

Referring generally to FIGS. 19A-19D, results illustrate a bridge setting with finite element non-linear large scale simulation. For all cases presented in FIGS. 19A-19D, consideration is made to a long realization of each design consisting of 11 cells (5.5 unit cells). FIG. 19A shows quantitative results for a 3-point bend test. In this case a point displacement is applied to the top center of the structure while the bottom outside corners have constrained horizontal (x) and vertical (y) displacements. The normalized reaction force is plotted as a function of the displacement for the different geometries. FIG. 19B shows the deformation of each geometry at the displacement provided at the end of the plot. The lines in this plot provide a measure of the normalized Von Misses stress of the structure. FIG. 19C shows quantitative results of a distributed load test. In this case a distributed load is applied across the top of the structure while the bottom outside corners have constrained x and y displacements. The normalized total reaction force is plotted as a function of the displacement for the different geometries. FIG. 19D shows the deformation of each geometry at the displacement provided at the end of the plot. The lines in this plot provide a measure of the normalized Von Misses stress of the structure.

Figure 20A:
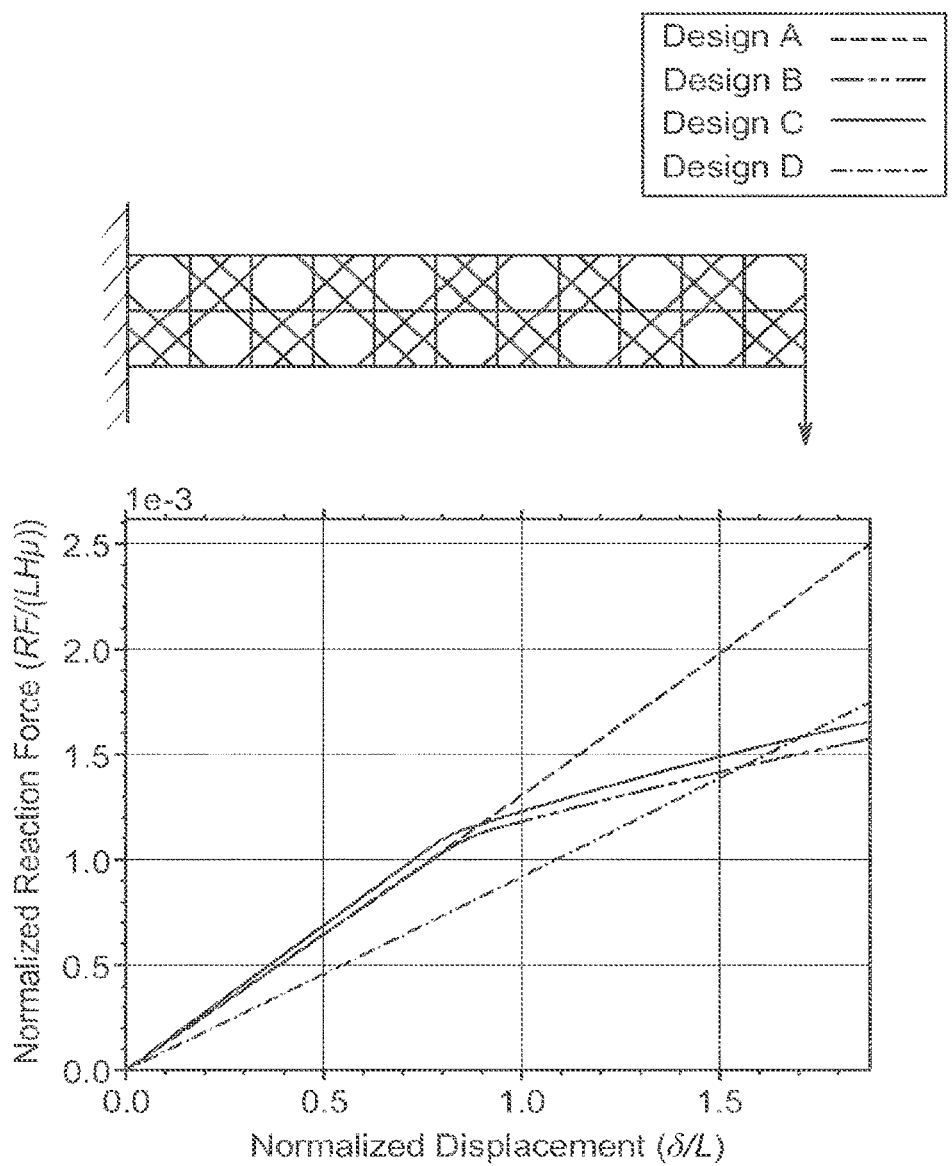
FIG. 20A shows a chart with simulation results for a simple cantilever beam point bend test.
Figure 20B:
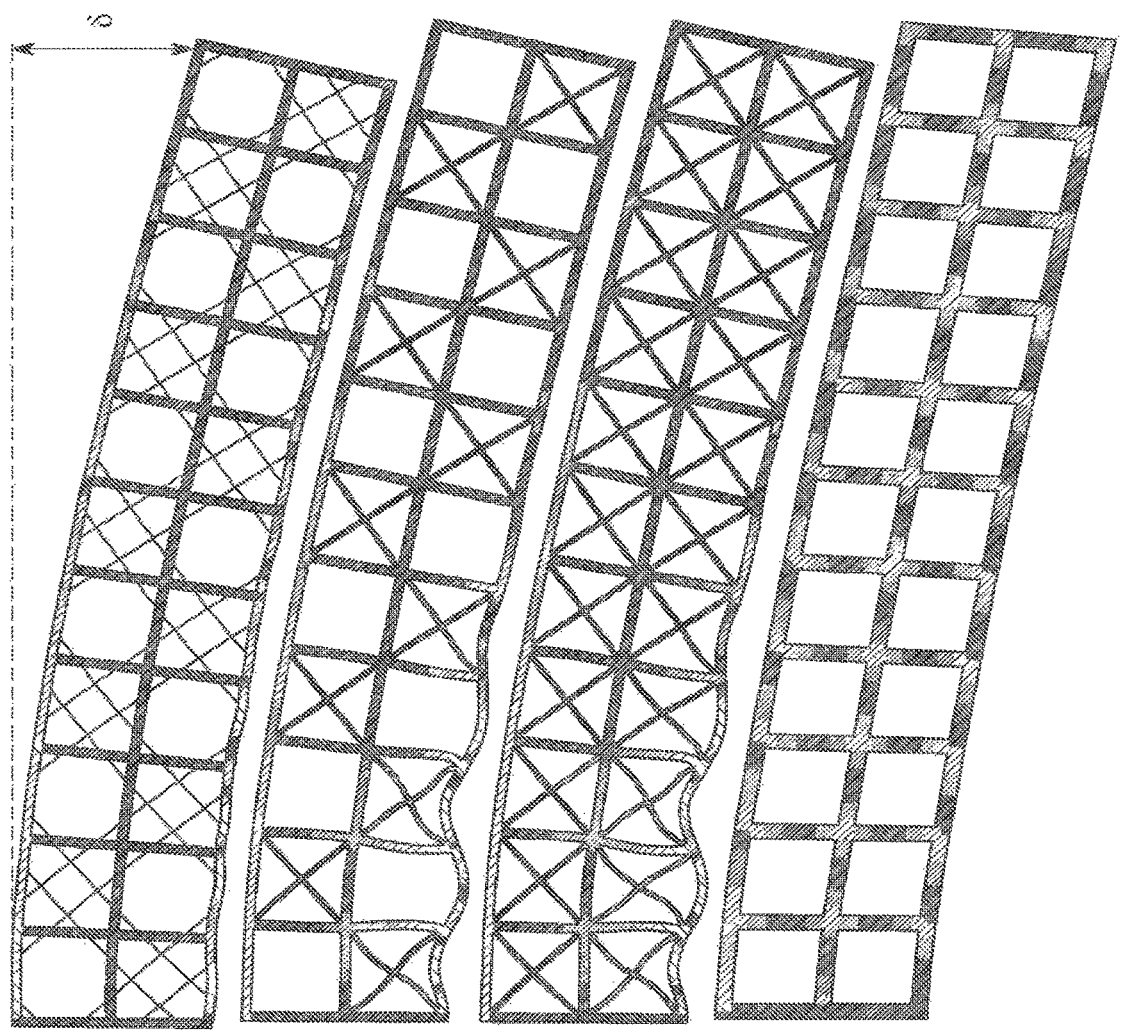
FIG. 20B shows a schematic illustrating deformation of each geometry at a displacement provided at the end of the plot illustrated in FIG. 20A.
Figure 20C:
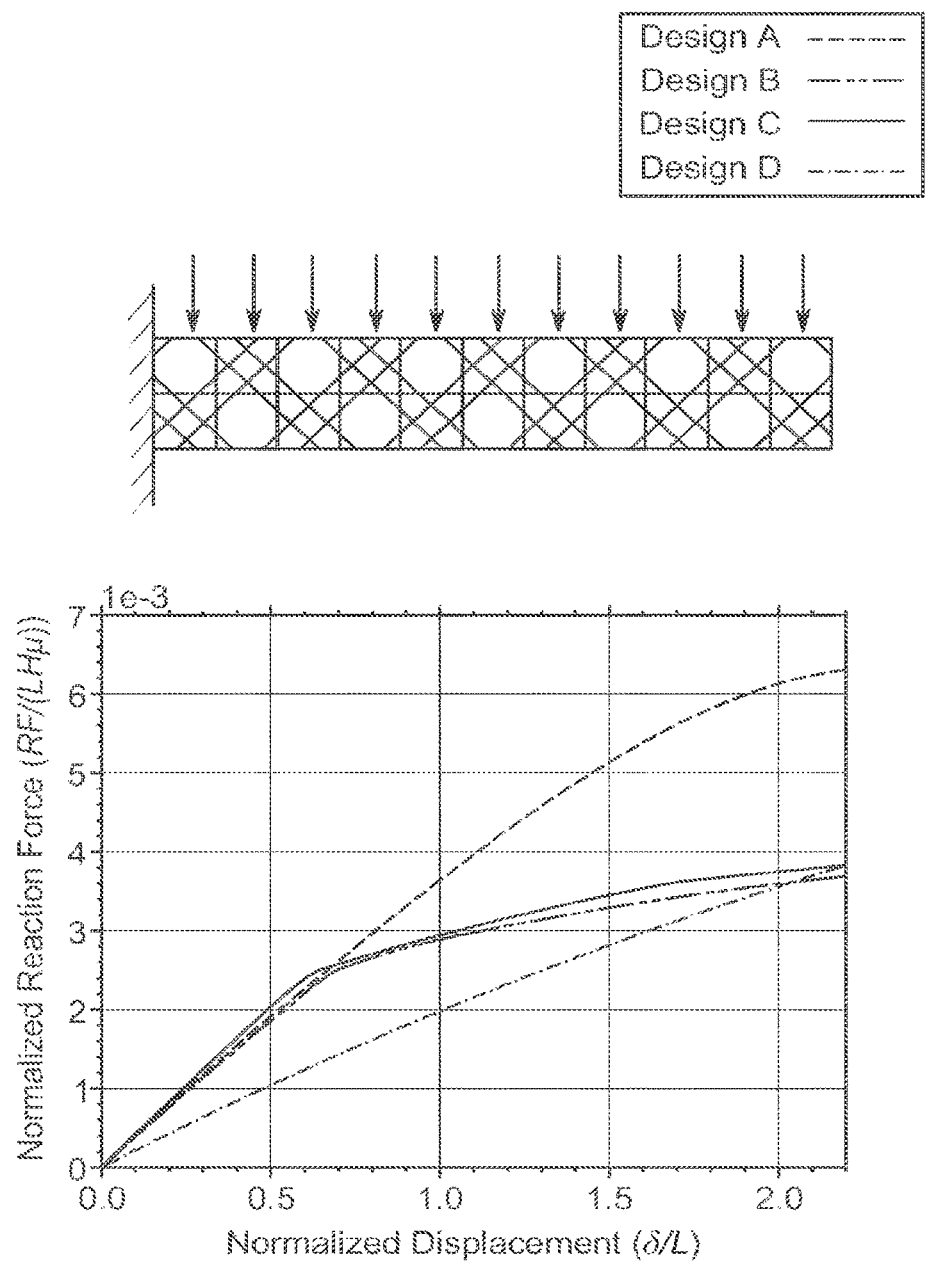
FIG. 20C shows a chart with simulation results of a distributed load cantilever beam test.

Referring generally to FIGS. 20A-20D, results illustrate a cantilever beam setting with finite element non-linear large scale simulations. For all cases presented FIGS. 20A-20D, consideration is made to a long realization of each design consisting of 11 cells (5.5 unit cells). FIG. 20A shows quantitative results for a simple cantilever beam point bend test. In this case a point displacement is applied to the bottom right of the structure while the left edge of the structure is fixed. The normalized total reaction force is plotted as a function of the displacement for the different geometries. FIG. 20B shows the deformation of each geometry at the displacement provided at the end of the plot. The lines in this plot provide a measure of the normalized Von Misses stress of the structure. FIG. 20C shows quantitative results of a distributed load cantilever beam test. In this case a distributed load is applied across the top of the structure while the left edge of the structure is fixed. The normalized total reaction force is plotted as a function of the displacement for the different geometries. FIG. 20D shows the deformation of each geometry at the displacement provided at the end of the plot. This plot provides a measure of the normalized Von Misses stress of the structure.

Figure 21A:
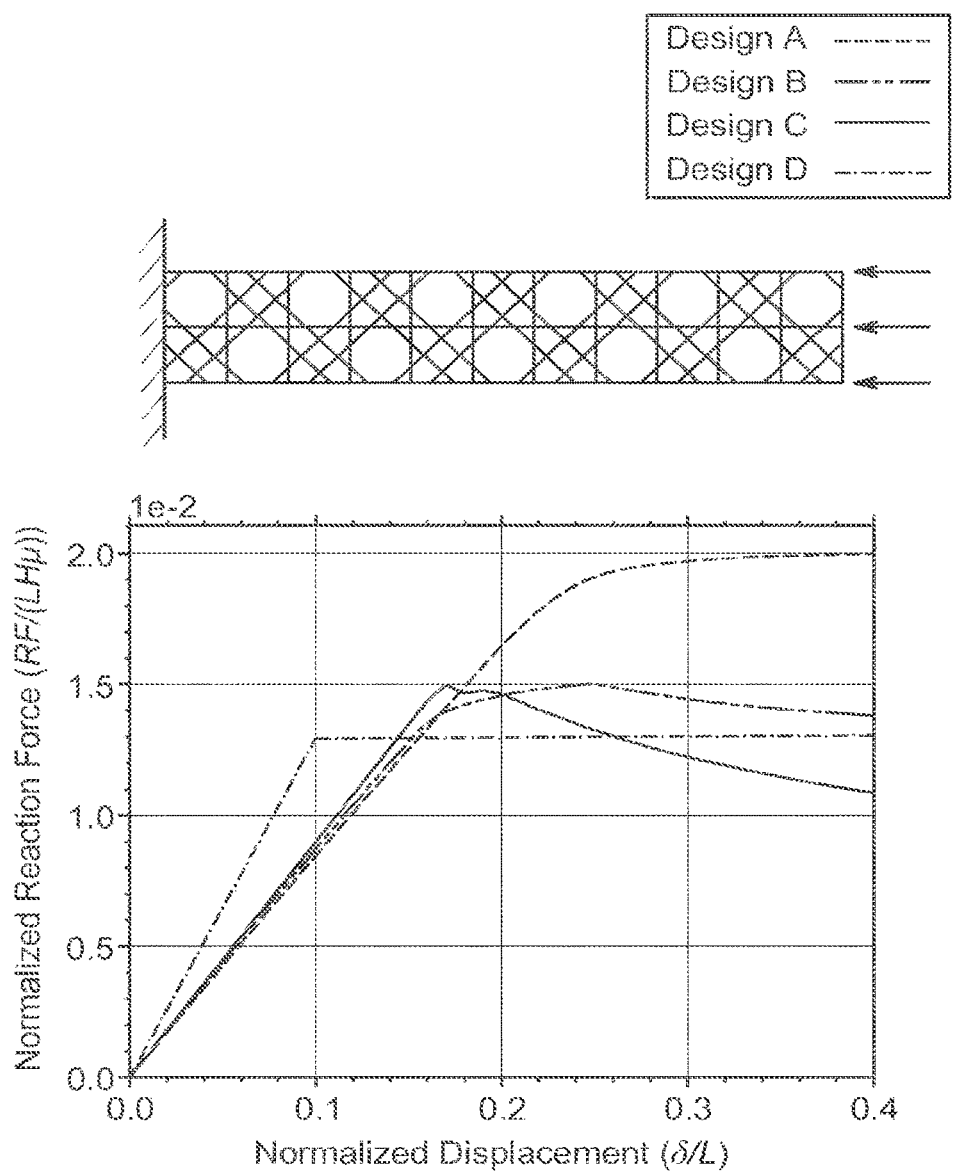
FIG. 21A shows a chart with simulation results for a simple slender structure compression test.
Figure 21C:
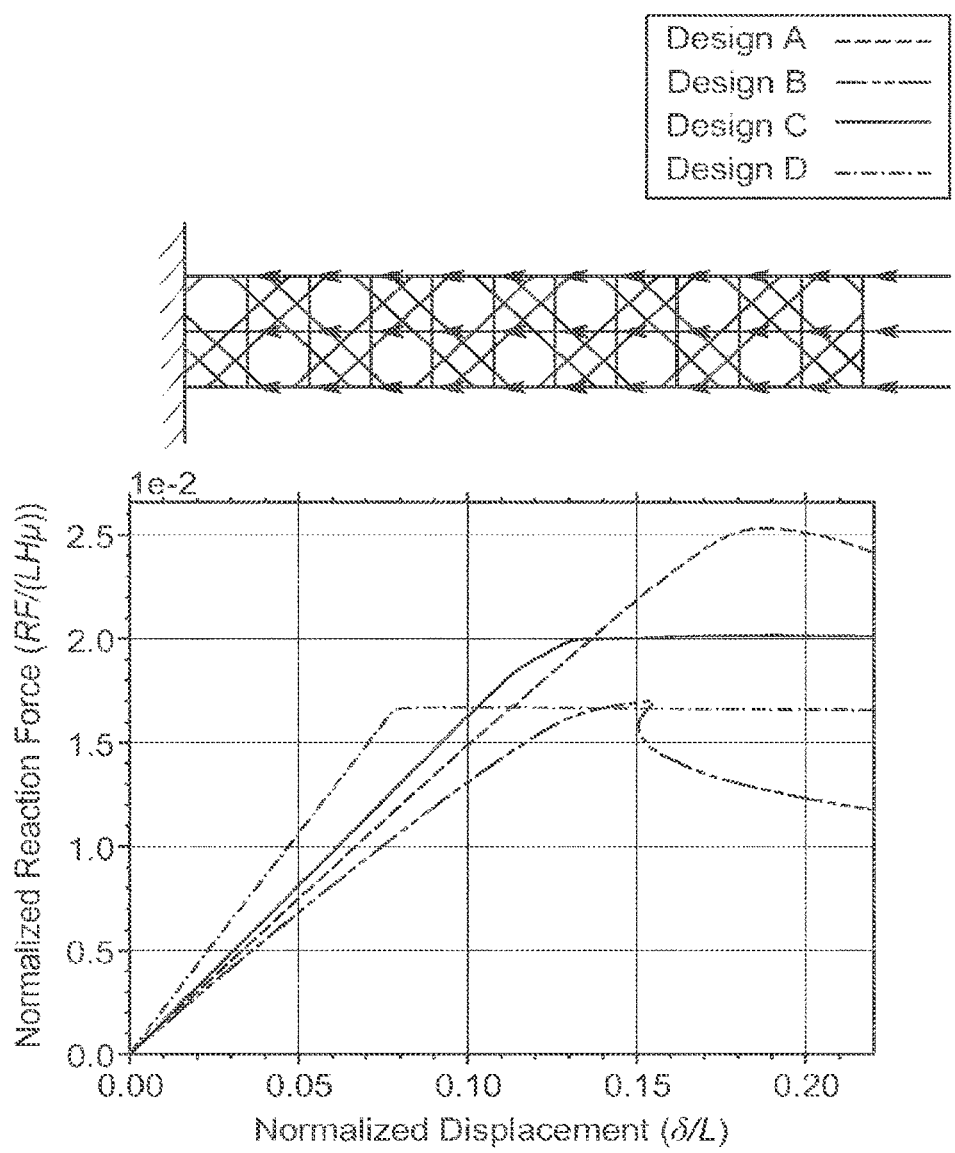
FIG. 21C shows a chart with plot quantitative results of a distributed load throughout every level of the structure associated with FIG. 21B.
Figure 22:
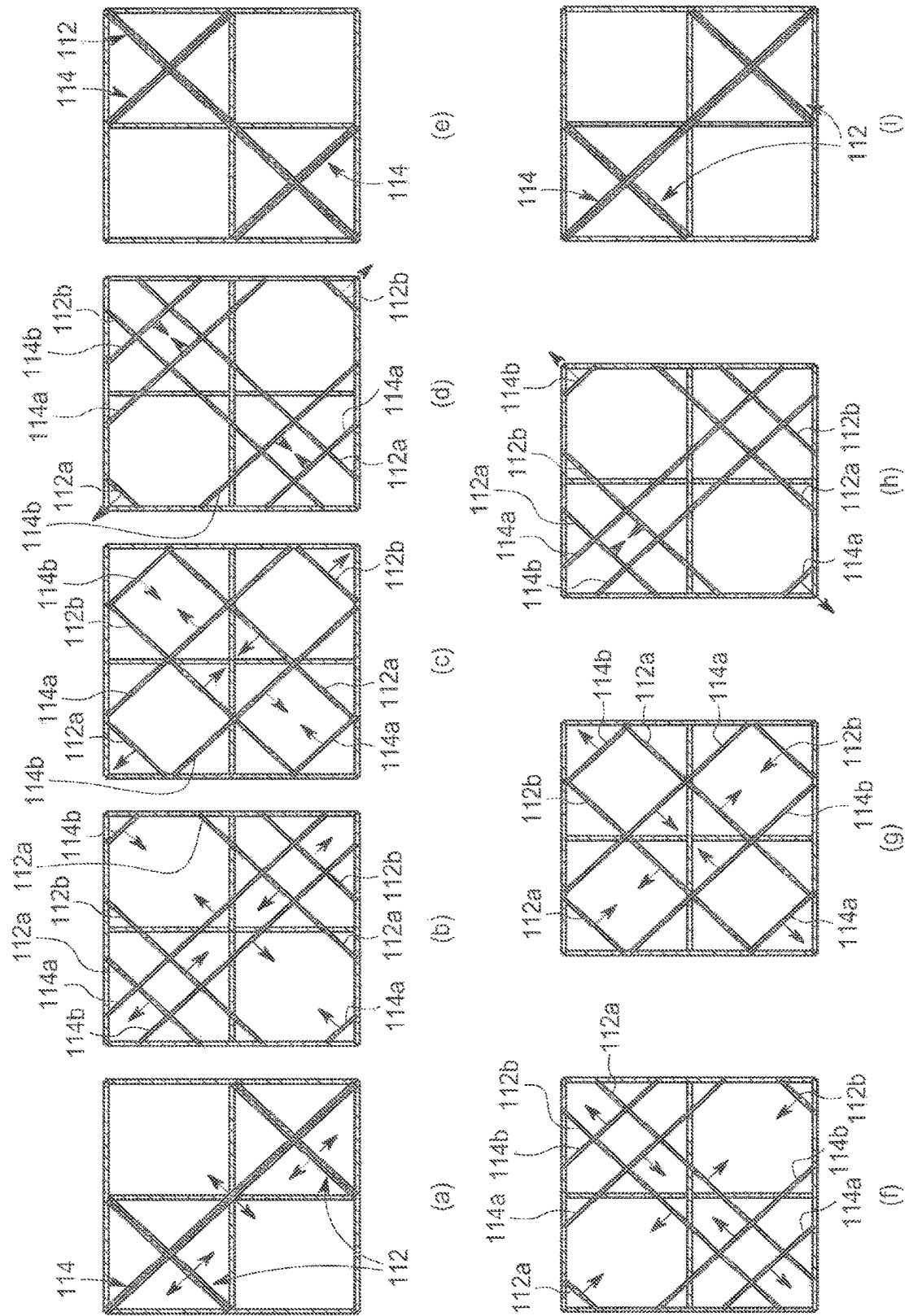
FIG. 22A is a schematic illustrating a first instance of a diagonal spacing variance surveyed during an optimization for a lattice design.
FIG. 22B is a schematic illustrating a second instance of a diagonal spacing variance surveyed during the optimization of the lattice design of FIG. 22A.
FIG. 22C is a schematic illustrating a third instance of a diagonal spacing variance surveyed during the optimization of the lattice design of FIG. 22A.
FIG. 22D is a schematic illustrating a fourth instance of a diagonal spacing variance surveyed during the optimization of the lattice design of FIG. 22A.
FIG. 22E is a schematic illustrating a fifth instance of a diagonal spacing variance surveyed during the optimization of the lattice design of FIG. 22A.
FIG. 22F is a schematic illustrating a sixth instance of a diagonal spacing variance surveyed during the optimization of the lattice design of FIG. 22A.
FIG. 22G is a schematic illustrating a seventh instance of a diagonal spacing variance surveyed during the optimization of the lattice design of FIG. 22A.
FIG. 22H is a schematic illustrating an eighth instance of a diagonal spacing variance surveyed during the optimization of the lattice design of FIG. 22A.
FIG. 22I is a schematic illustrating a ninth instance of a diagonal spacing variance surveyed during the optimization of the lattice design of FIG. 22A.
Figure 23:
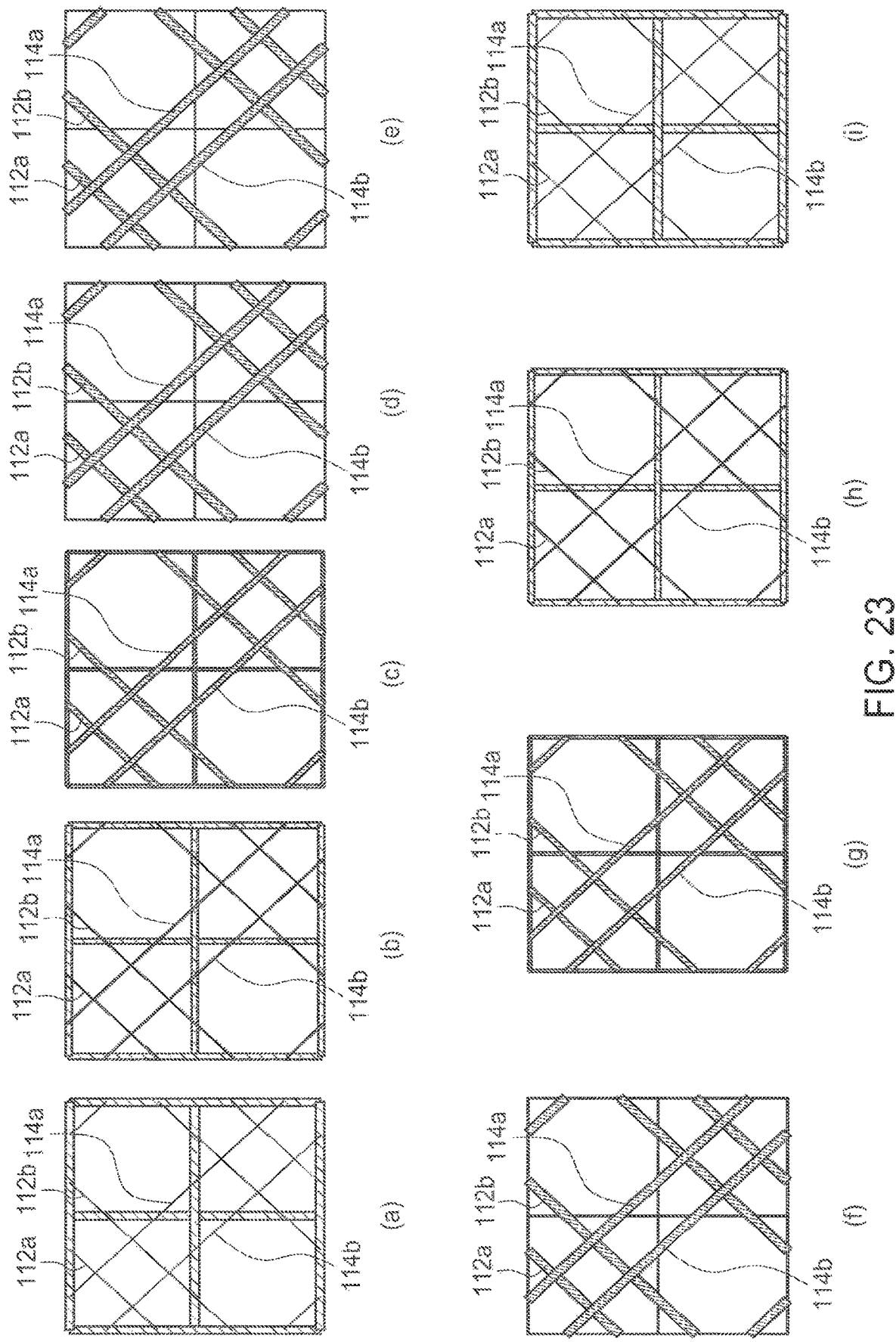
FIG. 23A is a schematic illustrating a first instance of a mass ratio variance surveyed during the optimization of the lattice design of FIG. 22A.
FIG. 23B is a schematic illustrating a second instance of a mass ratio variance surveyed during the optimization of the lattice design of FIG. 22A.
FIG. 23C is a schematic illustrating a third instance of a mass ratio variance surveyed during the optimization of the lattice design of FIG. 22A.
FIG. 23D is a schematic illustrating a fourth instance of a mass ratio variance surveyed during the optimization of the lattice design of FIG. 22A.
FIG. 23E is a schematic illustrating a fifth instance of a mass ratio variance surveyed during the optimization of the lattice design of FIG. 22A.
FIG. 23F is a schematic illustrating a sixth instance of a mass ratio variance surveyed during the optimization of the lattice design of FIG. 22A.
FIG. 23G is a schematic illustrating a seventh instance of a mass ratio variance surveyed during the optimization of the lattice design of FIG. 22A.
FIG. 23H is a schematic illustrating an eighth instance of a mass ratio variance surveyed during the optimization of the lattice design of FIG. 22A.
FIG. 23I is a schematic illustrating a ninth instance of a mass ratio variance surveyed during the optimization of the lattice design of FIG. 22A.
Figure 24:
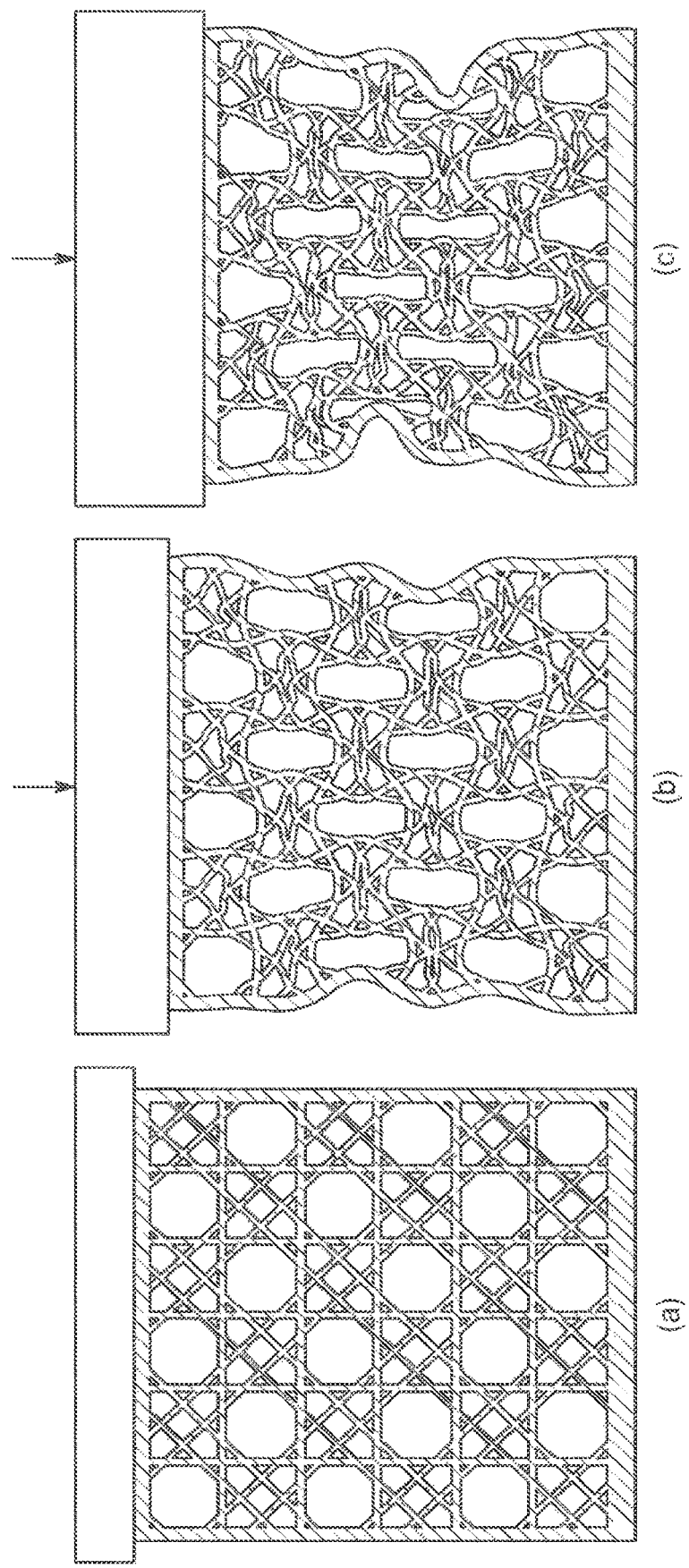
FIG. 24A is a schematic showing a first compression of a first lattice design.
FIG. 24B is a schematic showing a second compression of the first lattice design of FIG. 24A.
FIG. 24C is a schematic showing a third compression of the first lattice design of FIG. 24A.
Figure 25:
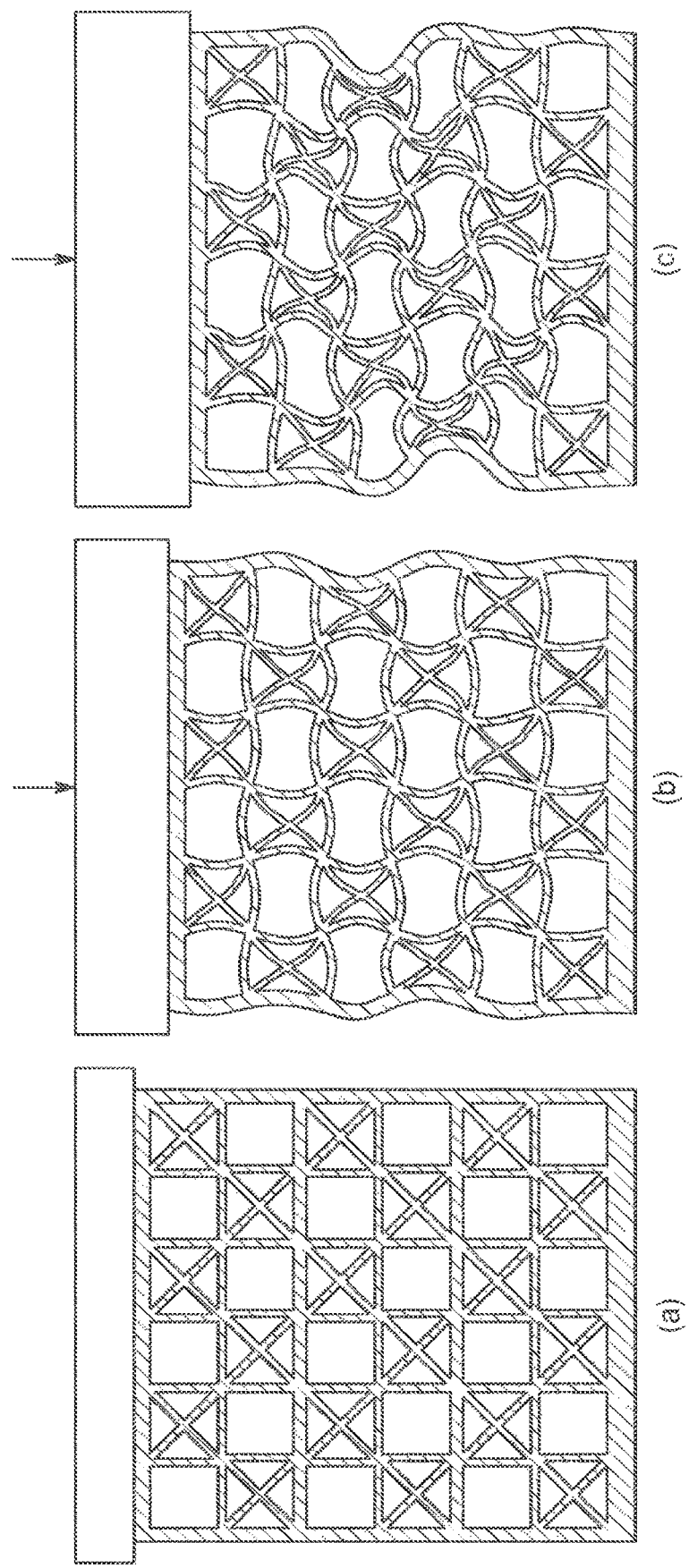
FIG. 25A is a schematic showing a first compression of a second lattice design.
FIG. 25B is a schematic showing a second compression of the second lattice design of FIG. 25A.
FIG. 25C is a schematic showing a third compression of the second lattice design of FIG. 25A.
Figure 26:
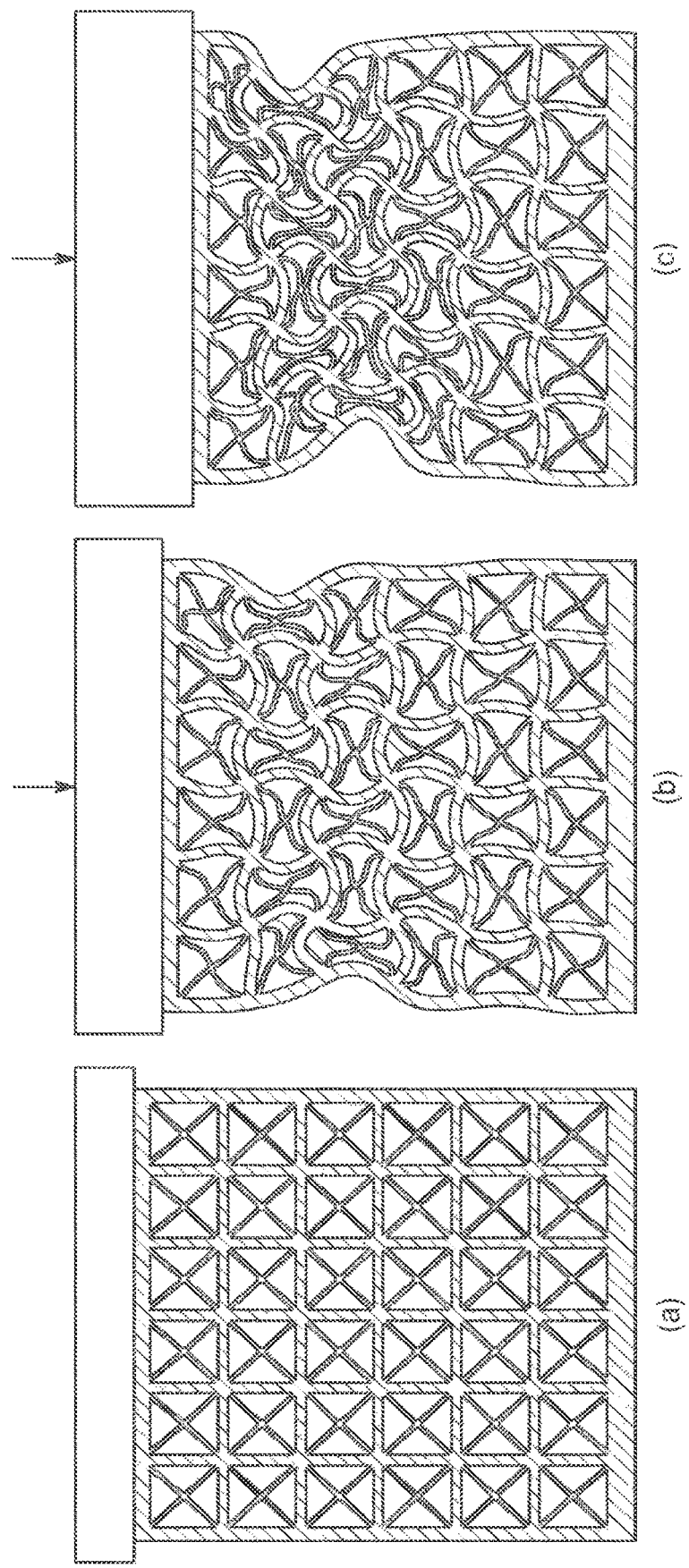
FIG. 26A is a schematic showing a first compression of a third lattice design.
FIG. 26B is a schematic showing a second compression of the third lattice design of FIG. 26A.
FIG. 26C is a schematic showing a third compression of the third lattice design of FIG. 26A.
Figure 27:
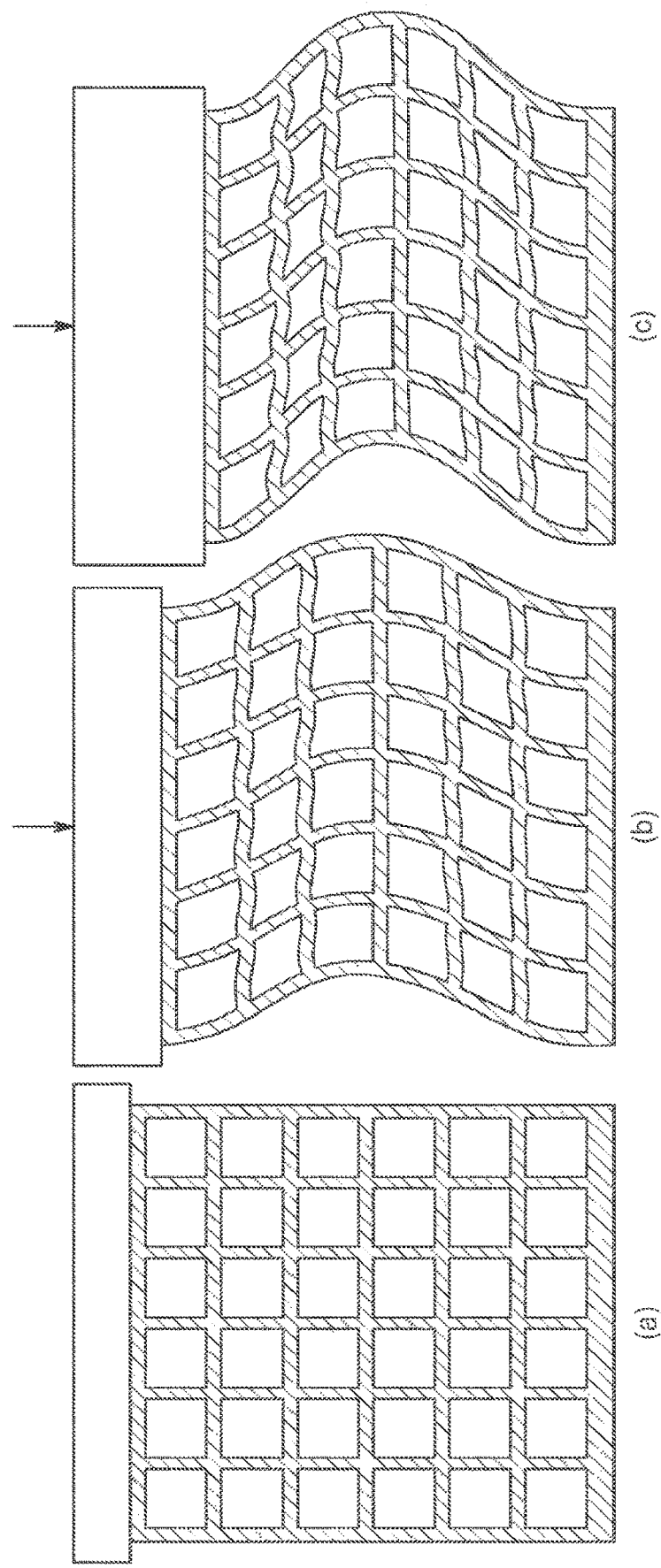
FIG. 27A is a schematic showing a first compression of a fourth lattice design.
FIG. 27B is a schematic showing a second compression of the fourth lattice design of FIG. 27A.
FIG. 27C is a schematic showing a third compression of the fourth lattice design of FIG. 27A.

Referring to FIGS. 21A-21D, results illustrate a slender structure compression setting with finite element non-linear large scale simulations. For all cases presented FIGS. 21A-21D, consideration is made to a long realization of each design consisting of 11 cells (5.5 unit cells). FIG. 21A shows quantitative results for a simple slender structure compression test. In this case a displacement is applied to the right edge of the structure while the left edge of the structure is fixed. The normalized total reaction force is plotted as a function of the displacement for the different geometries. FIG. 21B shows the deformation of each geometry at the displacement provided at the end of the plot. The lines in this plot provide a measure of the normalized Von Misses stress of the structure. FIG. 21C shows quantitative results of a distributed load throughout every level of the structure. In this case a distributed load is applied across each level of the structure while the left edge of the structure is fixed. The normalized total reaction force is plotted as a function of the displacement for the different geometries. FIG. 21D shows the deformation of each geometry at the displacement provided at the end of the plot. The lines in this plot provide a measure of the normalized Von Misses stress of the structure.

Further Optimization Aspects

Referring to FIGS. 22A-22I and 23A-23I, results are illustrated based on an optimization algorithm that surveys multi-dimensional design space and that chooses which set of parameters creates the strongest design. The optimization algorithm decides where to place each set of diagonal lines and how much material should be allocated to the diagonal lines and to the non-diagonal lines.

In FIGS. 22A-22I, the optimization analysis moves sets of diagonal beams 112, 114 apart and then back together to show various exemplary design configurations. Specifically, respective beams 112a, 112b of two sets of first diagonal beams and respective beams 114a, 114b of two sets of second diagonal beams move away from each other to show various sizes of open spaces for a respective design configuration. The change in position of the beams is helpful in providing an optimal configuration for a desired application, as a function of at least strength and weight.

In FIGS. 23A-23I, instead of movement, each of a first pair of parallel beams 112a, 112b and a second pair of parallel beams has a varying thickness that progressively increases and then decreases. For brevity and clarity, reference numerals are only used in FIGS. 23A-23I for two of the respective pairs, but it is understood that other pairs also have a varying thickness, as illustrated. The change in thickness of the beams is helpful in providing an optimal configuration for a desired application, as a function of at least strength and weight.

The analysis provided by the optimization algorithm also increases the number of beams. The illustrated results show that by having two diagonals, the strongest practical structure is achieved. Therefore, using this type of design is helpful for engineers to sustainably construct taller buildings and longer bridges without having to use additional resources.

Referring to FIGS. 24A-24C, 25A-25C, 26A-26C, and 27A-27C, results from four different geometries are illustrated. Each of the geometries is constructed with a 3×3 network, and then extruded to form a finite size structure. Using rapid prototyping technology, such as three-dimensional (3D) printing and laser cutting, realistic and precise physical models are build resembling each of the geometries. After building the physical models, a mechanical compression device is placed on each physical model. As the physical models are compressed, the resulting deformation provide a way to measure the amount of weight that each structure can handle before failure.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A structural lattice comprising:
  a rectangular base defined by four periphery beams and including two non-diagonal beams that divide the rectangular base into four quadrants; and
  a diagonal reinforcement strut system overlaid on the rectangular base and having at least two intersecting sets of diagonal beams forming an open-and-closed cell architecture;
  wherein one of the two intersecting sets of diagonal beams is a first set of diagonal beams, the first set of diagonal beams including a first beam that is parallel to a second beam;
  wherein another one of the two intersecting sets of diagonal beams is a second set of diagonal beams, the second set of diagonal beams including a respective first beam that is parallel to a respective second beam;
  wherein the respective first beam and the respective second beam are symmetrically positioned over one of the four quadrants; and
  wherein the first beam and the second beam of the first set of diagonal beams are symmetrically positioned over a same one of the four quadrants as the respective first beam and the respective second beam of the second set of diagonal beams.

2. The structural lattice of claim 1, wherein the first set of diagonal beams intersects the second set of diagonal beams at a perpendicular angle.

3. The structural lattice of claim 1, wherein the rectangular base and the diagonal reinforcement strut system form a repeating sub-unit of at least a structural portion of a building, a bridge, an aerospace structure, an automotive structure, or a power transmission structure.

4. The structural lattice of claim 1, wherein the diagonal reinforcement strut system is welded to the rectangular base.

5. The structural lattice of claim 1, wherein the four periphery beams have a square cross-section.

6. A structural lattice comprising:
a rectangular base defined by four periphery beams and including two non-diagonal beams that divide the rectangular base into four quadrants; and
a diagonal reinforcement strut system overlaid on the rectangular base and having at least two intersecting sets of diagonal beams forming an open-and-closed cell architecture;
wherein at least one of the four quadrants is an open cell having an equilateral octagon shape, the equilateral octagon shape being defined by two of the four periphery beams, the two non-diagonal beams, and four beams of the at least two intersecting sets of diagonal beams.

7. The structural lattice of claim 6, wherein one of the two intersecting sets of diagonal beams is a first set of diagonal beams, the first set of diagonal beams including a first beam that is parallel to a second beam.

8. The structural lattice of claim 7, wherein the first beam and the second beam are symmetrically positioned over one of the four quadrants.

9. The structural lattice of claim 7, wherein another one of the two intersecting sets of diagonal beams is a second set of diagonal beams, the second set of diagonal beams including a respective first beam that is parallel to a respective second beam.

10. The structural lattice of claim 9, wherein the first set of diagonal beams intersects the second set of diagonal beams at a perpendicular angle.

11. The structural lattice of claim 9, wherein the respective first beam and the respective second beam are symmetrically positioned over one of the four quadrants.

12. The structural lattice of claim 6, wherein the diagonal reinforcement strut system is welded to the rectangular base.

13. The structural lattice of claim 6, wherein the four periphery beams have a square cross-section.

14. The structural lattice of claim 6, wherein the rectangular base and the diagonal reinforcement strut system form a repeating sub-unit of at least a structural portion of a building, a bridge, an aerospace structure, an automotive structure, or a power transmission structure.

* * * * *